PULLING OVER AND LASTING OF SHOES

Original Filed July 16, 1965 17 Sheets-Sheet 1

INVENTORS
Jacob S. Kamborian
Walter A. Vornberger
James H. Arsenault
BY Albert Gordon
ATTORNEY

PULLING OVER AND LASTING OF SHOES

Original Filed July 16, 1965 17 Sheets-Sheet 4

PULLING OVER AND LASTING OF SHOES

Original Filed July 16, 1965 17 Sheets-Sheet 15

United States Patent Office

Re. 26,738
Reissued Dec. 23, 1969

26,738

PULLING OVER AND LASTING OF SHOES

Jacob S. Kamborian, 70 Crestwood Road, West Newton, Mass. 02165, Walter A. Vorn Berger, Medford, and James H. Arsenault, Whitinsville, Mass.; said Arsenault and said Vorn Berger assignors to said Kamborian Original No. 3,397,417, dated Aug. 20, 1968, Ser. No. 472,525, July 16, 1965. Application for reissue Sept. 20, 1968, Ser. No. 771,675

Int. Cl. A43d *21/08, 23/02, 25/10*

U.S. Cl. 12—145 36 Claims

Matter enclosed in heavy brackets [ ] appears in the original patent but forms no part of this reissue specification; matter printed in italics indicates the additions made by reissue.

ABSTRACT OF THE DISCLOSURE

There is disclosed herein a machine for pulling and stretching the toe and forepart portions of a shoe upper about the corresponding portion of a last while the last and an insole secured to the last bottom are supported bottom-down, for applying cement to the insole and for wiping the margin of the stretched upper portions against the insole to adhesively attach the upper margin to the insole.

This invention is concerned with the manufacture of shoes and is an improvement over the invention having a similar purpose disclosed in pending application Ser. No. 340,411 filed Jan. 27, 1964, and now Patent No. 3,332,096.

One aspect of the invention is concerned with a support arrangement for supporting bottom-down a last having an upper mounted thereon and an insole located on its bottom so that a selected portion of the upper margin may be wiped against the corresponding portion of the insole. The support arrangement includes an outer support section for supporting the margin of the insole portion and insole rests located inwardly of the outer support section. The support section is mounted so as to be yieldably urged upwardly to a level above the insole rests and to be capable of universal tilting movement. The support section extends upwardly from a base section that underlies the insole rests, and the insole rests are movable from their normal prone positions to an upright position to porvide access to the base section and enable the base section to be removed from the machine. The insole rests are spring urged downwardly against stop members, and one stop member is adjustable heightwise to thereby adjust the relative heightwise positions of the insole rests.

Another aspect of the invention is concerned with the stretching of the selected portion of the upper margin about the corresponding portion of the last prior to wiping the upper portion against the insole portion. A shoe assembly comprising the last having the upper mounted on it and the insole located on its bottom is supported bottom-down on a shoe support. A retarder is engageable with the last portion and extends upwardly of the support and a gripping means is located outwardly of the last portion. The parts are so constructed that the gripping means is caused to grip the upper margin portion and then move downwardly from an upper position with the gripped margin portion dragging about the retarder. The horizontal spacing between the gripping means in its upper position and the retarder is adjustable to accommodate the gripping means to the particular thickness and resistance to sliding of the upper material utilized.

Another aspect of the invention is concerned with a mechanism for stopping the upward movement of the shoe support from a lower position wherein the insole is below the tops of wipers that are intended to wipe the margin portion against the insole portion to an upper position wherein the insole bottom is at least as high as the tops of the wipers. The shoe support is on a last that can be raised to raise the shoe support. A tang on the post is in registry with a lug whose heightwise position is adjustable, and the engagement of the tang with the lug terminates the upward movement of the post.

In another aspect of the invention, the shoes support is mounted for relative heightwise movement with respect to a shoe conforming means which engages the shoe assembly and snugly conforms the upper portion to the shape of the last during a rise of the shoe support to bring the insole bottom to a level that is at least as high as the level of the tops of wipers that are located below the conforming means. A hold-down is constructed to bear against the top of the shoe assembly under a yieldable force during this rise of the shoe assembly to prevent the shoe assembly from shifting with respect to the support under the influence of the action of the conforming means on the shoe assembly during the rise of the shoe assembly.

Another aspect of the invention is concerned with the pressure exerted by the retarder against the wiper bottom during the rise of the shoe assembly. An arrangement is provided that enables the retarder to press the upper margin portion against the wiper bottom under a relatively low pressure during the rise of the shoe assembly and to press the margin portion against the wiper bottom under a higher pressure after the shoe assembly has completed its rise and prior to movement of the wiper in a direction to wipe the margin portion against the insole portion.

Another aspect of the invention is concerned with a bumper located alongside the shoe conforming means. The shoe conforming means takes the form of a pad that is yieldably urged inwardly against the shoe assembly during the rise of the shoe assembly under relatively light pressure. An arrangement is provided, operative after the completion of the rise of the shoe assembly and prior to the wiping of the margin portion against the insole portion, to concomitantly force the pad against the shoe assembly under relatively heavy pressure and bring the bumpers to bear against the shoe assembly.

The wiping means utilized are mounted for movement in a wiping stroke from a retracted to an advanced position to thereby wipe the margin portion against the insole portion. Just prior to the wiping stroke a plurality of instrumentalities, that include insole supporting members, retarders and a hold-down, are in engagement with the shoe assembly. During the wiping stroke the relationship of these instrumentalities with respect to the shoe assembly is changed. Another aspect of the invention is concerned with the mechanism for changing these relationships. This mechanism includes a shaft that is movable in response to actuation of a wiper drive means to impart a wiping stroke, with actuating members on the shaft actuating a plurality of control members in a predetermined sequence during the movement of the shaft.

In the retracted position of the wiping means, a retarder is in vertical registry with an area of the bottom of a wiper that is adjacent to an inner edge of the wiper so that the retarder will press the upper margin portion against the wiper bottom during the rise of the shoe assembly. Another aspect of the invention is concerned with an arrangement for horizontally adjusting said area of the wiper when the wiper is in its retracted position with respect to the retarder.

Although the particular portion of the shoe being operated on is immaterial, in its broadest aspects, to the facets of the invention described above, the illustrative embodiment of the invention discloses the operation as taking place at the toe portion of the shoe including the toe and extremity and the forepart portions adjacent the toe end extremity. The toe and forepart portions of the upper margin are stretched about the last by front pincers and side pincers and these margin portions are pressed against wiper bottoms by front and side retarders during the rise of the shoe assembly. The wipers are caused to move through their wiping stroke to wipe the toe and forepart portions of the upper margin against the insole after the completion of the rise of the shoe assembly. Another aspect of the invention is concerned with an arrangement for releasing the pincers from the upper margin and moving the pincers downwardly out of the way of the wipers prior to the commencement of the wiping stroke.

In the illustrative embodiment of the invention, the shoe conforming means takes the form of a yoke located above the wipers that conforms the toe and forepart portions of the upper to the shape of the last during the rise of the shoe assembly. Another aspect of the invention is concerned with an arrangement wherein the front and side gripping means grip the toe end and forepart portions of the upper margin and then move downwardly to stretch the toe and forepart of the upper about the last, the shoe assembly is then raised through the yoke to bring the insole bottom to a level at least as high as the level of the tops of the wipers, the toe and forepart portions of the upper margin are pressed against the wiper bottoms during the rise of the shoe assembly, the front gripping means releases the upper margin during the rise of the shoe assembly and moves downwardly out of the way of the wipers, the bumpers are forced inwardly against the shoe assembly after the completion of the rise of the shoe assembly, the side gripping means are disengaged from the upper margin and are moved downwardly out of the way of the wipers after the bumpers have engaged the shoe assembly, and the wipers are then caused to move through their wiping stroke to wipe the toe end and forepart portions of the upper margin against the insole.

Figure 1:
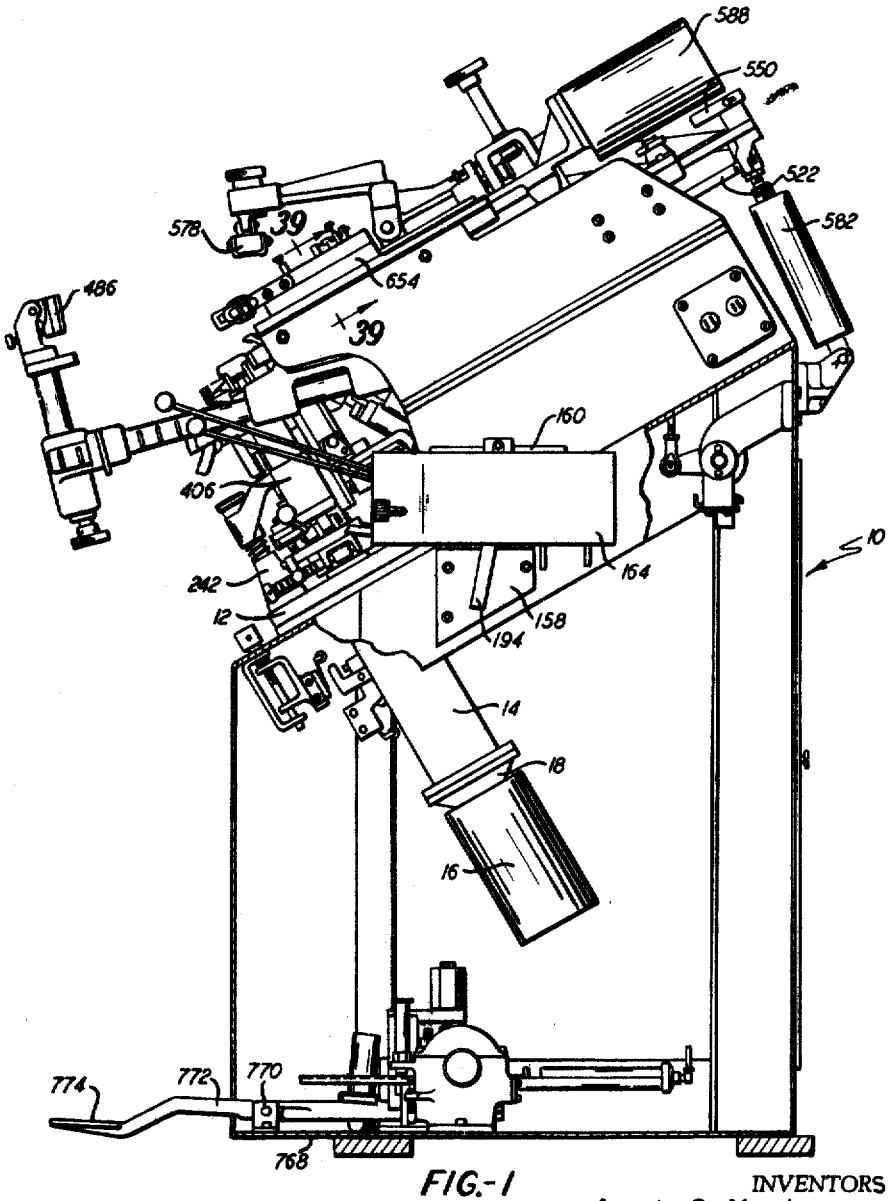
FIGURE 1 is a side elevation of a machine that forms an illustrative embodiment of the invention.
Figure 2:
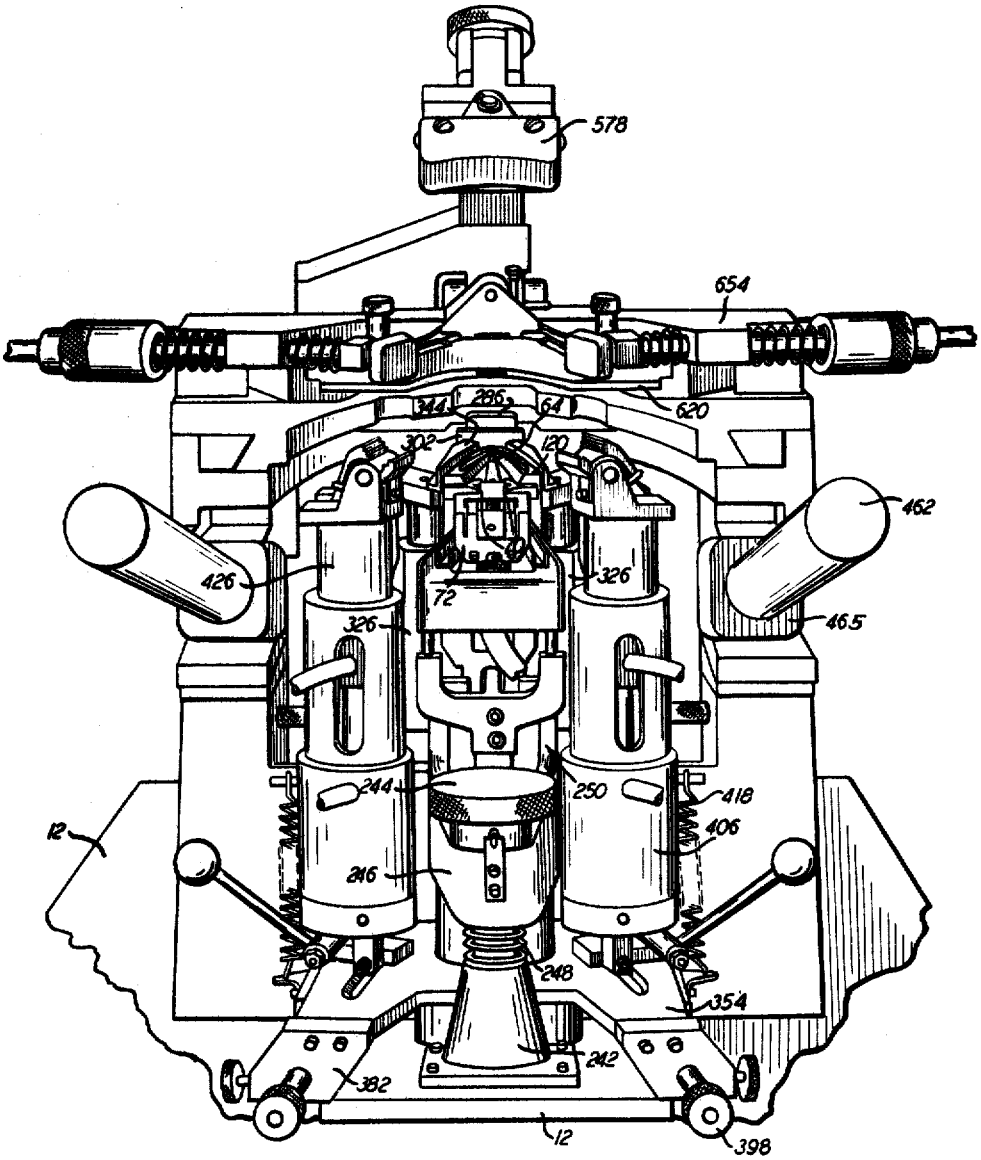
FIGURE 2 is a front elevation of the upper portion of the machine.
Figure 3:
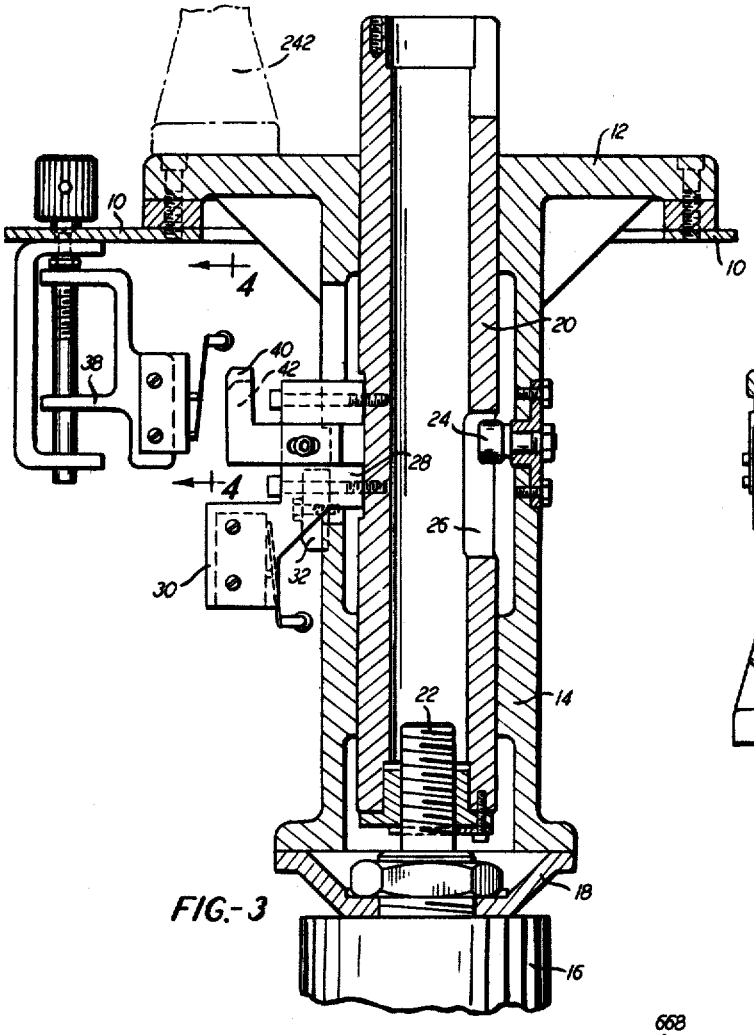
FIGURE 3 is a vertical section of a portion of the machine including a toe post on which the support for the shoe assembly is mounted.
Figure 15:
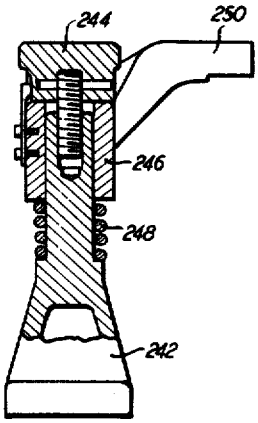
FIGURE 15 is an elevation, partly in section, of the lug and a column on which the lug is mounted for stopping the upward movement of the post when the post has raised the shoe assembly to the desired level.

Referring to FIGURES 1–3, the machine includes a frame 10 that incorporates a base plate 12 that has a sleeve 14 extending downwardly therefrom. For convenience of operation, the machine is inclined about 30 degrees from the horizontal. However, parts extending in the direction of the plate 12 will hereafter be referred to as extending horizontally and parts extending in the direction of the sleeve 14 will hereafter be referred to as extending vertically. The operator is intended to be located to the left of the machine as seen in FIGURE 1, and a direction extending toward the operator (right to left in FIGURE 1) will be referred to as "forward" while a direction extending away from the operator (left to right in FIGURE 1) will be referred to as "rearward."

An air operated motor 16 is secured to a cap 18 at the bottom of the sleeve 14, and a toe post 20 is secured to the piston rod 22 of the motor 16 to extend vertically and be slidable within the sleeve 14. A roller 24, bolted to the sleeve 14, is received in a vertical slot 26 in the post 20 to preclude rotation of the post about the axis of the sleeve.

Figure 4:
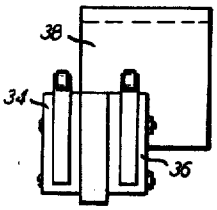
FIGURE 4 is a view taken on the line 4—4 of FIGURE 3.

A bracket 28, bolted to the post 20, has a normally closed valve 30 secured thereto whose actuator is in alignment with a cam 32 that is bolted to the sleeve 14. A pair of valves 34 and 36 are bolted on a bracket 38 that depends from the frame 10, see FIGURES 3 and 4. The actuators of the valves 34 and 36 are respectively in alignment with cams 40 and 42 that are secured to the bracket 28.

Figure 5:
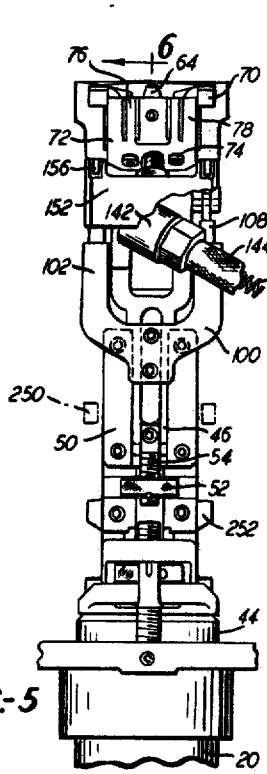
FIGURE 5 is a front elevation of a portion of the machine including the arrangement for supporting the shoe assembly.
Figure 6:
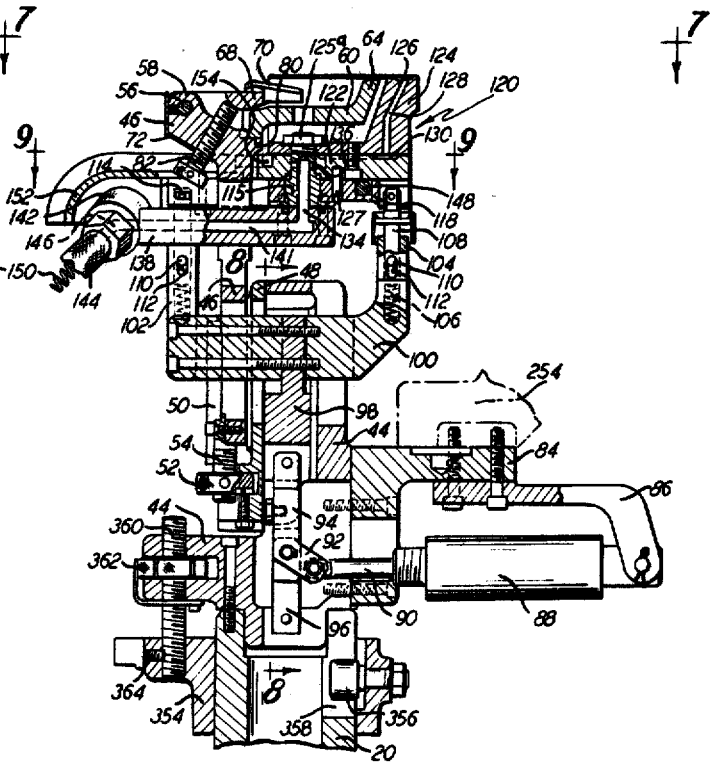
FIGURE 6 is a section taken on the line 6—6 of FIGURE 5.
Figure 8:
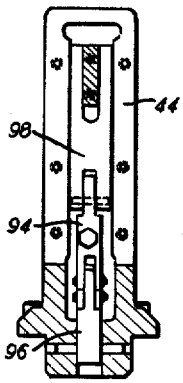
FIGURE 8 is a view taken on the line 8—8 of FIGURE 6.

A toe post extension 44 (FIGURES 5 and 6) is secured to the upper end of the post 20. A bar 46, which serves as an insole rest mount, is slidably mounted for vertical movement between a bearing plate 48 and gibs 50 that are secured to the post extension 44. A nut 52, rotatably mounted in the post extension 44, is in threaded engagement with a screw 54 that is fastened to the bar 46 whereby rotation of the nut affects vertical adjustment of the bar and the below described insole rests mounted on the bar. A pivot pin 56, located at the top of the bar 46, extends through a prong 58 at the top of the bar. A lug 60 extending rearwardly of the pin 56 has forwardly directed legs 62 that straddle the prong 58 and are pivoted on the pin 56. A toe insole rest 64 extends upwardly of the rear end of the lug 60. A pair of legs 66 are pivoted on the pin 56 outwardly of the legs 62. A cross-beam 68, extending between the legs 66, has a pair of forepart insole rests 70 extending upwardly thereof. A leaf spring 72, secured to the front of the top of the bar 46 by screws 74, has upwardly extending limbs 76 and 78 that respectively bear against the legs 62 and 66 to yieldably urge them clockwise (FIG. 6) about the pin 56 to hereby yieldably urge the insole rests 64 and 70 downwardly. A stop ledge 80 on the bar 46 bearing against the lug 60 limits the downward movement of the insole rest 64. A stop bolt 82, threaded into the bar 46 and bearing against the cross-beam 68, limits the downward movement of the insole rests 70. By operating the bolt 82 the elevation of the insole rests 70 may be vertically adjusted to accommodate the insole rests to the style and size of the the shoe being operated on. The insole rests 64 and 70 may be swung upwardly about the pivot 56 from their normal prone position against the force of the spring 72 until the spring limbs 76 and 78 bear against what are the upper surfaces of the legs 62 and 66 as seen in FIGURE 6 to thereby maintain these legs and the insole rests 64, 70 in an upright position for the reasons given below.

A rearwardly extending ledge 84 of the post extension 44 has a hanger 86 depending therefrom. An air operated motor 88 is pivoted to the hanger 86. The piston rod 90 of the motor 88 is pivoted to a link 92, and the link 92 is pivoted to a pair of toggle links 94 and 96. The link 96 extends downwardly of the link 92 and is pivoted to the post extension 44 while the link 94 extends upwardly of the link 92 and is pivoted to a slide 98 that is guided for vertical sliding movement by the post extension 44 and the bearing plate 48. A mount 100 is secured to the slide 98 and has a pair of front prongs 102 and a rear prong 104 extending upwardly thereof, the prongs 102 and 104 being laterally offset from each other as indicated in FIGURES 5 and 6. Upwardly extending compression springs 106 are seated in each of the prongs 102, 104. Each of the springs 106 bears against a rod 108 to yieldably urge the rods upwardly. Pins 110 in the rods 108 ride in slots 112 in the prongs 102, 104 and normally bear against the tops of the slots to limit the extent of upward movement of the rods 108.

Figure 9:
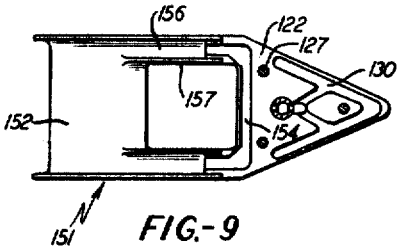
FIGURE 9 is a view taken on the line 9—9 of FIGURE 6.
Figure 10:
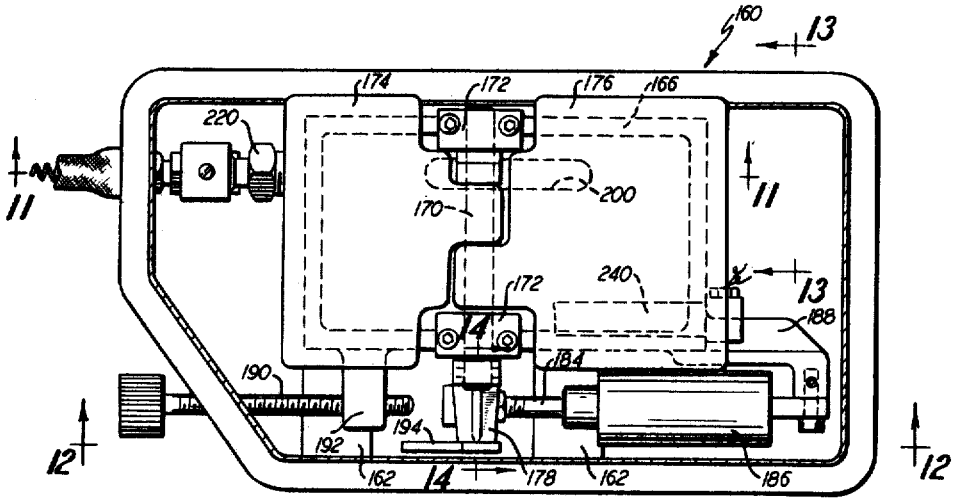
FIGURE 10 is a plan view of the cement extruding mechanism.
Figure 12:
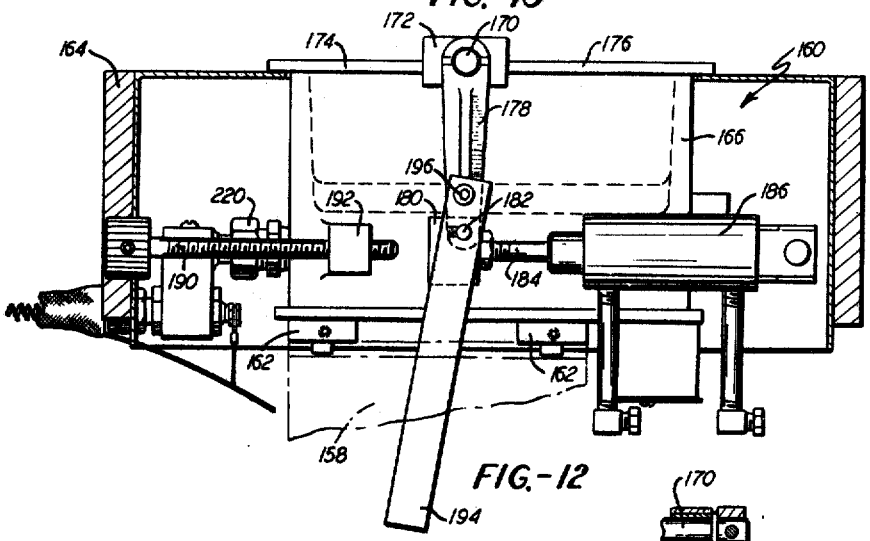
FIGURE 12 is a view taken on the line 12—12 of FIGURE 10.
Figure 13:
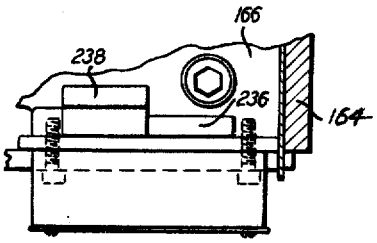
FIGURE 13 is a view taken on the line 13—13 of FIGURE 10.
Figure 14:
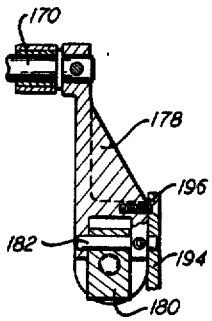
FIGURE 14 is a view taken on the line 14—14 of FIGURE 10.

The pins 110 are connected by way of pin and slot connections 114 (FIGURE 6) to a bracket 118. A ferrule 115 extends through and is secured to the bracket 118 and extends through an applicator-support 120 that rests on the bracket 118. The applicator-support 120 comprises a base section 122 that lies beneath the lug 60 and an upwardly extending and forked extruding and support section 124 that has a pair of legs 125 diverging forwardly and downwardly from an apex. The extruding section 124 lies outwardly of the lug 60 and insole rest 64. The section 124, which has a configuration corresponding to the margin of the toe portion of the insole of the shoe to be toe lasted, is secured to the bracket 118 by a fastening member such as a nut 125a threaded onto the ferrule 115 and by aligning pins 127. If it is desired to replace the applicator-support section 120 with one having a different configuration, the insole rests 64, 70 are raised to an upright position in the manner described above to provide access to the nut 125 and the nut 125 is removed to enable the member 120 to be removed and replaced with another member 120 having the desired configuration. A groove 126 is provided in the top of the extruding-support section 124 and a plurality of holes 128 intersect the groove 126 and extend downwardly therefrom. The holes 128 intersect channels 130 (FIGURE 9) in the top of the base section 122. The ferrule 115 has holes 134 and 136 therein that are in communication with the channels 130. A strut 138, secured to the undersurface of the bracket 118, has a passage 141 therein that is in communication with the hole 134. An adapter 142 on the forward end of the strut 138 has a hollow, flexible conduit 144 secured thereto. A passage 146 in the adapter 142 provides communication between the passage 141 and the conduit 144. An electric heating element 148 in the bracket 118 is provided to heat the applicator-support 120. The conduit 144 is made of a tube that is thermally and electrically insulative and has an electric resistor wire 150 running therethrough that is connected to a source of electrical energy.

Figure 7:
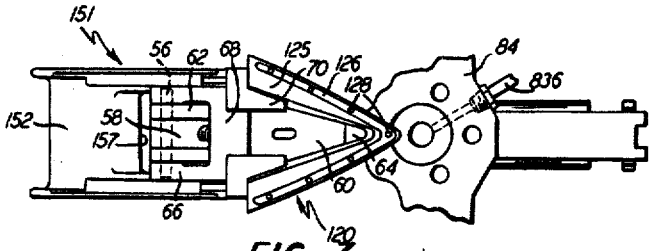
FIGURE 7 is a plain view taken on the line 7—7 of FIGURE 6.

A deflector arrangement 151 (FIGURES 6, 7 and 9) is secured to the base section 122 and extends forwardly thereof. The deflector arrangement comprises longitudinally extending gutters 156 positioned below the forward ends of the applicator legs 125 below and immediately to the front of the extruding section 124 and a transverse gutter 154 connecting the gutters 156. A deflector plate 152, having a relatively large bearing area, is in communication with the forward ends of the gutters 156. A cutout 157, bounded by the gutters 154 and 156 and the plate 152, accommodates the insole rest mount plate 46.

Referring to FIGURES 1 and 10–14, a bracket 158 is secured to the frame 10 and supports a source of cement in the form of a cement pot 160, the cement pot being secured to straps 162 that are mounted on the bracket 158. A heat insulative cover 164 is secured to the straps 162 and encompasses the cement pot. The cement pot includes upstanding walls 166 that bound a well 163 (see FIGURE 11). A shaft 170, extending transversely over the well, is rotatably mounted in a pair of hangers 172 that are secured to the walls 166. A pair of cover plates 174 and 176 are pivotally mounted on the shaft 170 to overlie the well 168. A lever 178, secured to the shaft 170 to extend downwardly of the exterior of the cement pot, is pivoted to a block 180 by a pin 182. The block 180 is secured to the piston rod 184 of an air operated motor 186 and the motor 186 is pivoted to a flange 188 that is secured to the cement pot. A stop stud 190, that is threaded into a lug 192 of the cement pot, is in alignment with the block 180. A handle 194, that is mounted on the pin 182 and is secured to the lever 178 by a screw 196, extends downwardly of the block 180. A lever 198 is pinned to the shaft 170 and extends downwardly thereof into the well 168 through a slot 200 in the floor of the well. A prong 202 at the bottom of the lever 198 extends a into a clevis 204 formed in a plunger 206 and the plunger is slidably mounted in a bore 208 located in the cement pot below the well 168. A ferrule 210 is threaded in a hole in the floor of the well forwardly of the lever 198. The ferrule has radial passages 211 that intersect a centrally located small diameter passage 212. The passage 212 opens into a large diameter passage 214, the passage 214 intersecting the bore 208. A ball 216, resting on a pin 218 extending across the passage 214, is cooperative with the passage 212 to act as a valve in the manner described below. An adapter 220 is threaded into the cement pot at the forward end of the bore 208. A passage 222 extending through the adapter 220 is normally blocked by a spring pressed ball valve 224. A coupling 226 is secured to the adapter 220 and the end of the conduit 144 remote from the applicator 120 is secured to the coupling 226. A passage through the coupling 226 provides communication between the conduit 144 and the passage 222. A baffle plate 228 (FIGURE 11) extends downwardly into the well 168 from the cover plate 176 to separate the well into two compartments 230 and 232. Cutouts 234 in the bottom of the baffle plate 228 provide communication between the well compartments 230 and 232. Electrical heating elements 236 and 238 (FIGURE 13) are secured to the cement pot 160 and are controlled by a thermostat 240 (FIGURE 10) that extends beneath the well 168.

Referring to FIGURES 1, 2, 3 and 15, a column 242 is secured to and rises upwardly of the base plate 12 forwardly of the post 20. A knob 244 is threaded into the column 242 and bears against a sleeve 246 that is yieldably urged upwardly against the knob by a compression spring 248, a pair of lugs 250 are integral with and extend forwardly of the collar 246. The vertical position of the lugs 250 may be adjusted by rotating the knob 244 to thereby lower or raise the collar 246 on the column 242. The lugs 250 are in vertical alignment with a pair of tangs 252 extending outwardly of the post extension 44 (see FIGURE 5).

Figure 16:
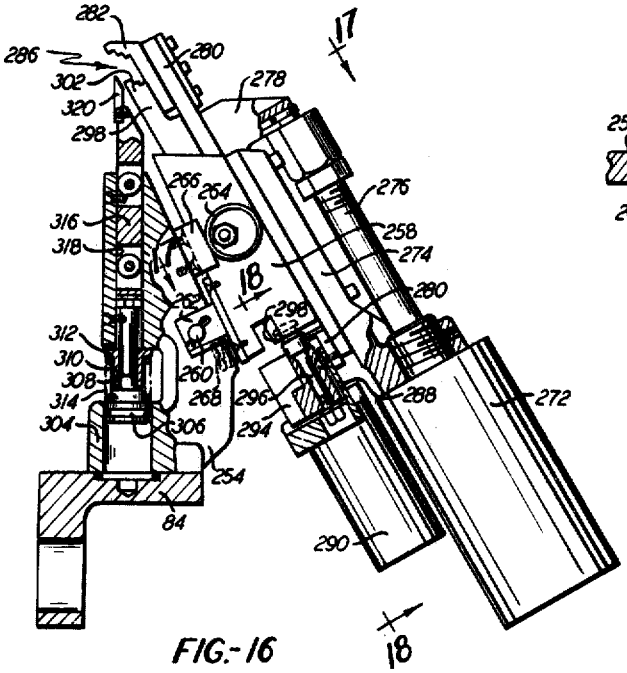
FIGURE 16 is an elevation, partly in section, of the front pincers and front retarder.
Figure 17:
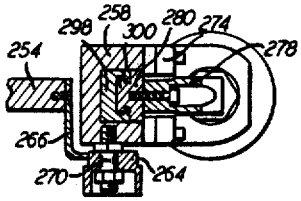
FIGURE 17 is a view taken on the line 17—17 of FIGURE 16.
Figure 18:
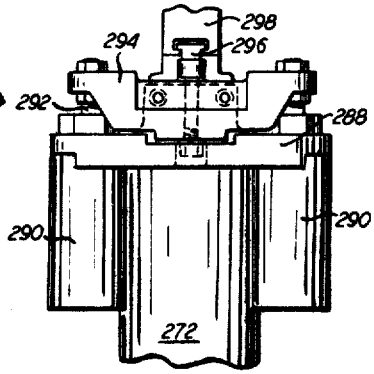
FIGURE 18 is a view taken on the line 18—18 of FIGURE 16.

Referring to FIGURES 16, 17 and 18, a housing 254 is secured to and extends upwardly of the ledge 84. A bracket 258, located rearwardly of the housing 254, has an extension 262 secured thereto that is pivoted on a pin 260 extending outwardly of the housing 254. A rotary cam or stop element 264 is eccentrically mounted on the bracket 258. A compression spring 268 interposed between the bracket 258 and the housing 254 serves to swing the bracket about the axis of the pin 260 and cause the cam 264 to bear against a stop element 266 that is secured to the housing 254. By adjusting the cam 264 about the axis of its eccentric mounting 270 the inclination of the bracket 258 and the members carried thereby can be adjusted for the reasons given below. An air operated motor 272 is secured to a block 274 that is secured to the bracket 258. The motor 272 has a piston rod 276 extending upwardly and forwardly thereof. A block 278 is secured to the piston rod 276, and a bar 280 is rigidly connected to the block 278. The bar 280 is slidably mounted in a guideway in the bracket 258. The upper jaw 282 of a front pincers 286 is secured to the upper end of the bar 280. The lower end of the bar 280 is secured to a bracket 288 on which a pair of air operated motors 290 are mounted. The piston rods 292 of the motors 290 are connected to a hanger 294, and a pin 296 is threaded into the hanger to extend upwardly thereof. The pin 296 is connected to a bar 298 that in slidable in ways 300 formed in the bar 280. The lower jaw 302 of the pincers 286 is mounted on the upper end of the bar 298. Above the ledge 84, the housing 254 is formed into a cylinder 304 in which a piston 306 is vertically movable. A piston rod 308, extending upwardly of the piston 306, is slidable in a bushing 310 that in turn is slidably mounted on the piston rod 308. A shoulder 312 is provided at the upper end of the bushing 310 and bears against the housing 254. A compression spring 314, interposed between the shoulder 312 and the pison 306, yieldably seats the shoulder against the housing bottom and yieldably urges the piston downwardly against the force of the pressurized air that is normally in the cylinder 304. A bar 316, connected to and extending upwardly of the rod 208, is slidable in a vertical guideway 318 formed at the front end of the housing 254 above the cylinder 304, and a front retarder blade 320 is affixed to the top of the bar 316. The pincers 286 and the retarder blade 320 are both positioned rearwardly of the applicator 120 and insole rests 64, 70.

Referring to FIGURES 2 and 19–22, a gib 322 is bolted to the ledge 84 forwardly of the housing 254 on each side of the applicator 120 and insole rests 64, 70 by means of headed bolts 324. A column 326 is slidably mounted on each gib 322 for inward and outward movement. Struts 328 are secured to the ledge 84 outwardly of each column 326. A knob 330, rotatably mounted in each strut 328, has an inwardly directed screw 332 secured thereto that is threaded to a column 326, whereby the position of each column on its gib 322 may be adjusted by rotating its associated knob 330. A cavity 334 is provided in each column 326 and an upwardly extending air actuated motor 336 is mounted in each cavity. A line 338 is connected to the bottom of each motor 336 to thereby enable pressurized air to force the piston rods 340 of the motors 336 upwardly. Each of the piston rods 340 is pinned to a block 342 and a side retarder blade 344 is secured in each block 342 to extend upwardly thereof by a spring pressed detent 346. A sleeve 348 is welded to each block 342. Each sleeve 348 extends downwardly of a block 342 into a cavity 334 between a motor 336 and a column 326. A spline 350, secured to each sleeve 348, extends into a vertical groove 352 provided in each of the columns 326 whereby the blocks 342 and retarder blades 344 are precluded from movement about the vertical axes of the sleeves 348 during their vertical movements in response to actuations of the motors 336.

A base 354 (FIGURE 6) is slidably mounted on the toe post 20 below the toe post extension 44 and above the plate 12 by way of a roller 356 secured to the base and extending into a vertically extending slot 358 in the post. A bolt 360, extending through a flange on the toe post extension 44, is threaded into a nut 362, that is rotatably mounted in the flange. The bottom of the bolt 360 is threaded into the base 354 and is locked thereto by a set screw 364. Thus, rotation of the nut 362 causes vertical adjustment of the base 354 on the post 20.

Referring to FIGURES 2 and 23–27, the base 354 has a pair of rearwardly convergent slots 366 extending therethrough on opposite sides of the post 20. A U-shaped block 368 is located below the base 354 straddling each slot 366. A pin 370 extends through each block 368 and slot 366. A worm gear 372 is keyed to each pin 370 to rotate therewith by a key 374, and each worm gear 372 is interposed between a block 368 and a nut 375 threaded onto the bottom of each pin 370. A sleeve 376, extending through each slot 366, embraces each pin 370 with the bottoms of the sleeves lying on the blocks 368. A stop plate 378 is located above the base 354 to straddle each slot 366 on opposite sides of each pin 370 and sleeve 376. A cross-pin 380 extends through each associated plate 378, sleeve 376 and pin 370 to connect these members for movement in unison about the axes of the pins 370. A flange 382 extends downwardly of the plate 354 forwardly of each slot 366. A hollow stud 384 is located within a cut-out in each flange 382 and extends rearwardly thereof through a downwardly extending leg 386 of its associated block 368 where it is secured to the leg 386 by a stud 388. A worm 390, that is in mesh with its associated worm gear 372, is located between each block leg 386 and another downwardly extending block leg 392 with the forward end of each worm bearing against the rear end of a stud 384 and the rear end of each worm bearing against a block leg 392. A rod 394 extends through each stud 384 and worm 390 with the rear end of each rod rotatable in a block leg 392. The rods 394 are pinned to the worms 390 by studs 396 to rotate in unison therewith. A knob 398 is pinned to each rod 394. A spring-pressed detent 400 is mounted in each flange 382 and is yieldably urged towards a selected one of a plurality of teeth 402 formed in the studs 384 to thereby lock the studs in position. An axial shifting of a stud 384, after disengagement of the detent 400 with a tooth 402, causes the associated block 368 to shift lengthwise of a slot 366 to thereby adjust the position of each pin 370 and the members carried thereby lengthwise of the slot. Rotation of a knob 398 will rotate its associated worm 390 to thereby rotate the worm gear 372 in mesh therewith thus swinging the associated pin 370 about its axis. A universal joint 404 is connected, as by welding, to the upper ends of each pin 370 and sleeve 376 and an air actuated motor 406, which acts as a side pincers carrier, is connected to and extends upwardly of the top of each universal joint 404. A lug 408 extending downwardly of each motor 406 has a stop member in the form of a set screw 410 threaded thereon that is adapted to bear against its associated stop plate 378. A shaft 412, rotatably mounted in each stop plate 378, has an eccentric cam 414 and a handle 416 secured thereto. A tension spring 418 extending between each motor 406 and a bracket 420 secured to the base 354 serves to yieldably urge the base 422 of each motor 406 against a cam 414.

Figures 28, 28A:
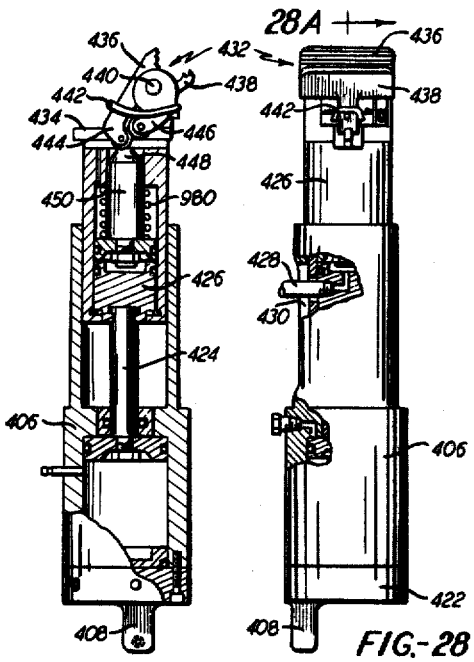
FIGURE 28 is an elevation of a side pincers.
FIGURE 28A is a view taken on the line 28A—28A of FIGURE 28.

Referring to FIGURES 28 and 28A, the piston rod 424 of each motor 406 has a spring return air actuated motor 426 connected thereto that is slidably mounted in the motor 406. The inlet pipe 428 of each motor 426 rides in a slot 430 formed in the motors 406 to preclude rotation of the motors 426 with respect to the motors 406. A side pincers 432 is mounted on a bracket 434 that is affixed to the top of each motor 426. Each pincers 432 comprises an upper jaw 436 and a lower jaw 438 that are swingable about a pin 440 mounted in the bracket 434. Elastic bands 442 extending about the jaws 436 and 438 serve to yieldably urge the jaws to open position. The jaws 436 and 438 respectively have downwardly extending legs 444 and 446 having rollers thereon that are positioned above a cone-shaped cam 448 formed at the top of the piston rod 450 of each motor 426. The legs 444 extend downwardly of the legs 446 so that the rollers of the legs 446 are at a higher elevation than the rollers of the legs 444.

The frame 10 includes a head 452 (FIGURE 29) located rearwardly of the aforementioned parts. An air actuated motor 454 is secured to a hanger 456 depending from the head 452. The piston rod 458 of the motor 454 is connected by way of a plate 460 to a pair of bars 462 (FIGURE 2) that are slidably guided in bosses 464 and 465 affixed to the frame 10. Referring to FIGURES 31–34, a plurality of notches 466 are provided at spaced intervals at the forward ends of the bars 462. A yoke 468, straddling the bars 462, has catches 470 pivoted thereon that are yieldably urged into a selected notch 466 by tension springs 472 extending between the yoke and the catches. A post 474 is slidably mounted for heightwise movement in a bore 476 in the center of the yoke 468. The post 474 is locked in adjusted position in the bore 476 by a radially movable plunger 478 in the post that can be forced radially outwardly against the wall of the bore 476 by way of the cone-shaped end of an axially extending stud 480 in the post 474. The stud can be raised to effect the outward movement of the plunger 478 by a handle 482 that is threaded into the post 474 and connected to the stud 480. A heel clamp mount 484 is secured to the top of the post 474 and a heel clamp 486 is pivotally mounted for swinging movement about the horizontal axis of a pin 488 in the heel clamp mount 484. A clamping pad 490, made of a flexible material, is secured to the rear face of the heel clamp 486. The position of the heel clamp with respect to the axis of the pin 488 may be adjusted by manipulation of a screw 492 that is threaded into the clamp mount 484 and is rotatably mounted in the clamp 486.

Figure 29:
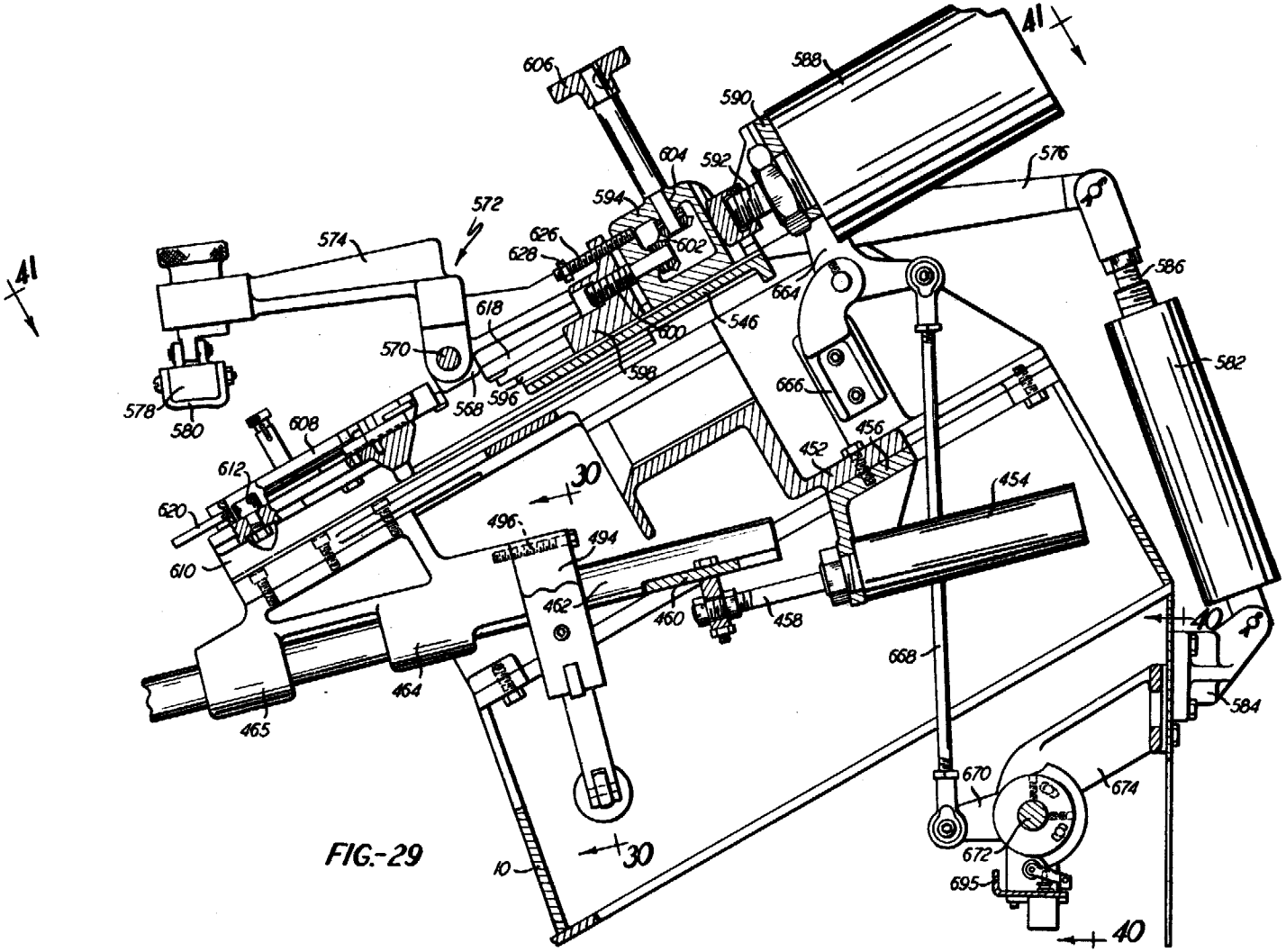
FIGURE 29 is a side elevation of a portion of the machine showing the hold-down and wiper operating mechanisms and also showing a heel clamp operating mechanism.
Figure 31:
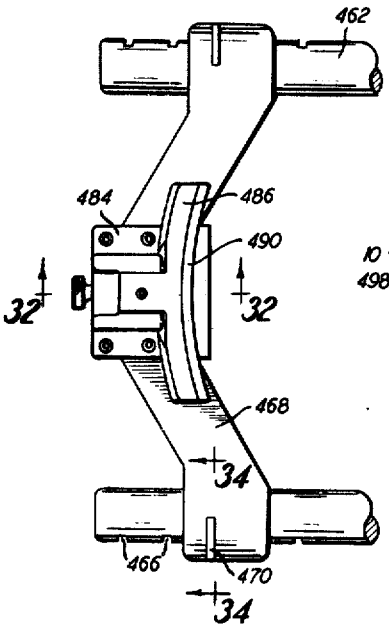
FIGURE 31 is a plan view of the heel clamp.
Figure 30:
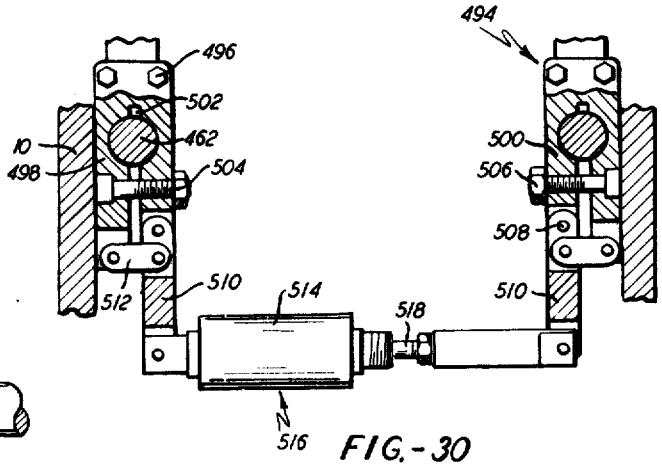
FIGURE 30 is a section showing a heel clamp braking mechanism taken on the line 30—30 of FIGURE 29.
Figure 32:
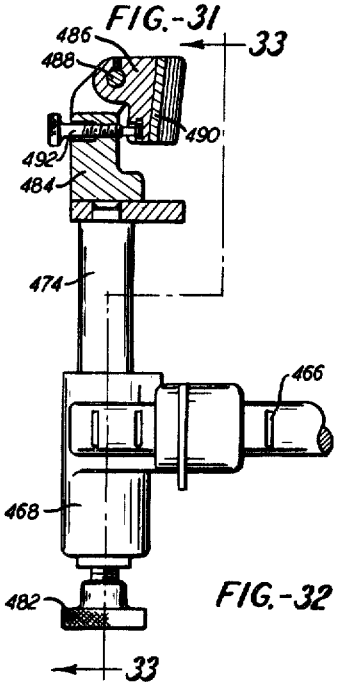
FIGURE 32 is a view taken on the line 32—32 of FIGURE 31.
Figure 33:
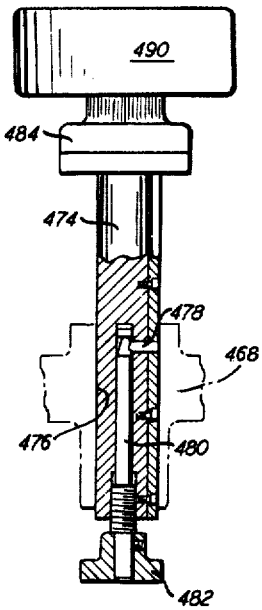
FIGURE 33 is a view taken on the line 33—33 of FIGURE 32.
Figure 34:
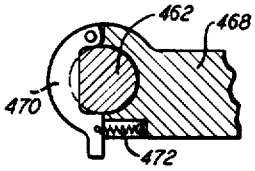
FIGURE 34 is a view taken on the line 34—34 of FIGURE 31.

Referring to FIGURES 29 and 30, the bars 462 extend through brakes 494 that are bolted to the bosses 464 by fasteners 496. Each brake 494 is formed of an outer leg 498 bearing against the frame 10 and an inner leg 500 with the legs embracing the bars 462. The legs 498 and 500 are separated by a kerf 502 above the bars 462 which provides sufficient flexibility as to enable the legs 500 to be moved toward and away from the legs 498. A bolt 504, seated in each leg 498 and extending through its associated leg 500, has a nut 506 threaded thereon to limit the extent of inward movement of the legs 500 away from the legs 498. The lower ends of the legs 500 are pivotally connected by pins 508 to limbs 510. A link 512 is pivoted at one end to each limb 510 below the pins 508 and is pivoted at its other end to each leg 498. The lowermost end of one of the limbs 510 is pivotally connected to the cylinder 514 of an air actuated motor 516 and the lowermost end of the other limb 510 is pivotally connected to the piston rod 518 of the motor 516.

Figure 39:
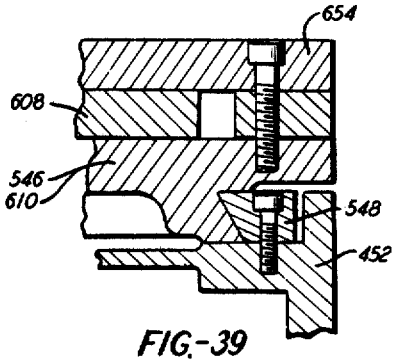
FIGURE 39 is a section taken on the line 39—39 of FIGURE 1.
Figure 22:
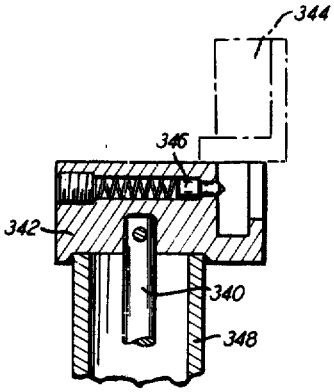
FIGURE 22 is a view taken on the line 22—22 of FIGURE 19.
Figure 35:
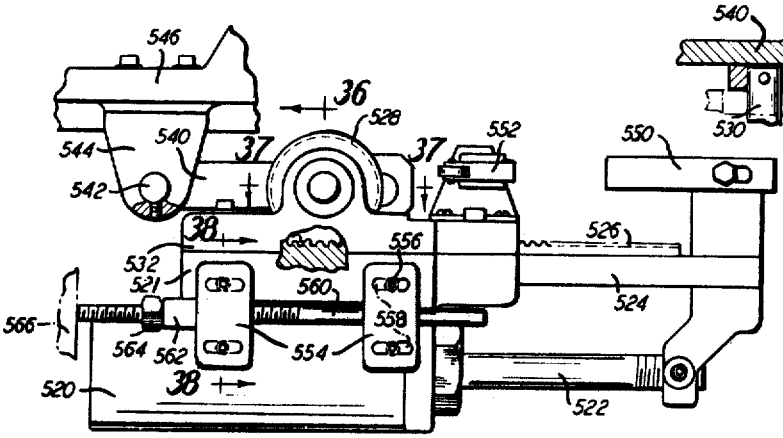
FIGURE 35 is a side elevation of a portion of the machine showing an arrangement for moving the wipers from an out-of-the-way position to a working position.
Figure 37:
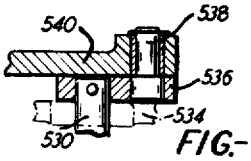
FIGURE 37 is a view taken on the line 37—37 of FIGURE 35.
Figure 36:
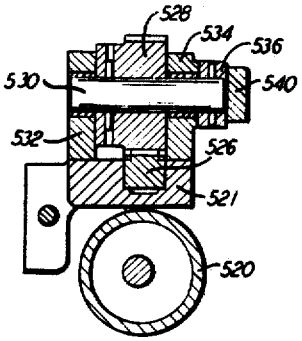
FIGURE 36 is a view taken on the line 36—36 of FIGURE 35.

Referring to FIGURES 35–37, an air actuated motor 520, that is secured to a block 521, has a piston rod 522 extending rearwardly thereof. The block 521 is secured to the frame 10 in the manner described below. The piston rod 522 is secured to a bar 524 that is slidably mounted in the block 521 above the piston rod. A rack 526 mounted on the bar 524 is in mesh with a pinion 528 that is pinned to a shaft 50 and the shaft is rotatable in a pair of trunnions 532 and 534 affixed to the block 521. A crank 536, pinned to the shaft 530, is pivotally connected by a pin 538 to a pitman 540, and the pitman 540 is pivotally connected by a pin 542 to a lug 544 that depends from a slide plate 546. The slide plate 546 is slidably mounted for forward and rearward movement in the head 452 on gibs 548 (FIGURE 39). A cam 550 mounted on the bar 524 is in alignment with a normally closed valve 552 mounted on the block 521.

Figure 41:
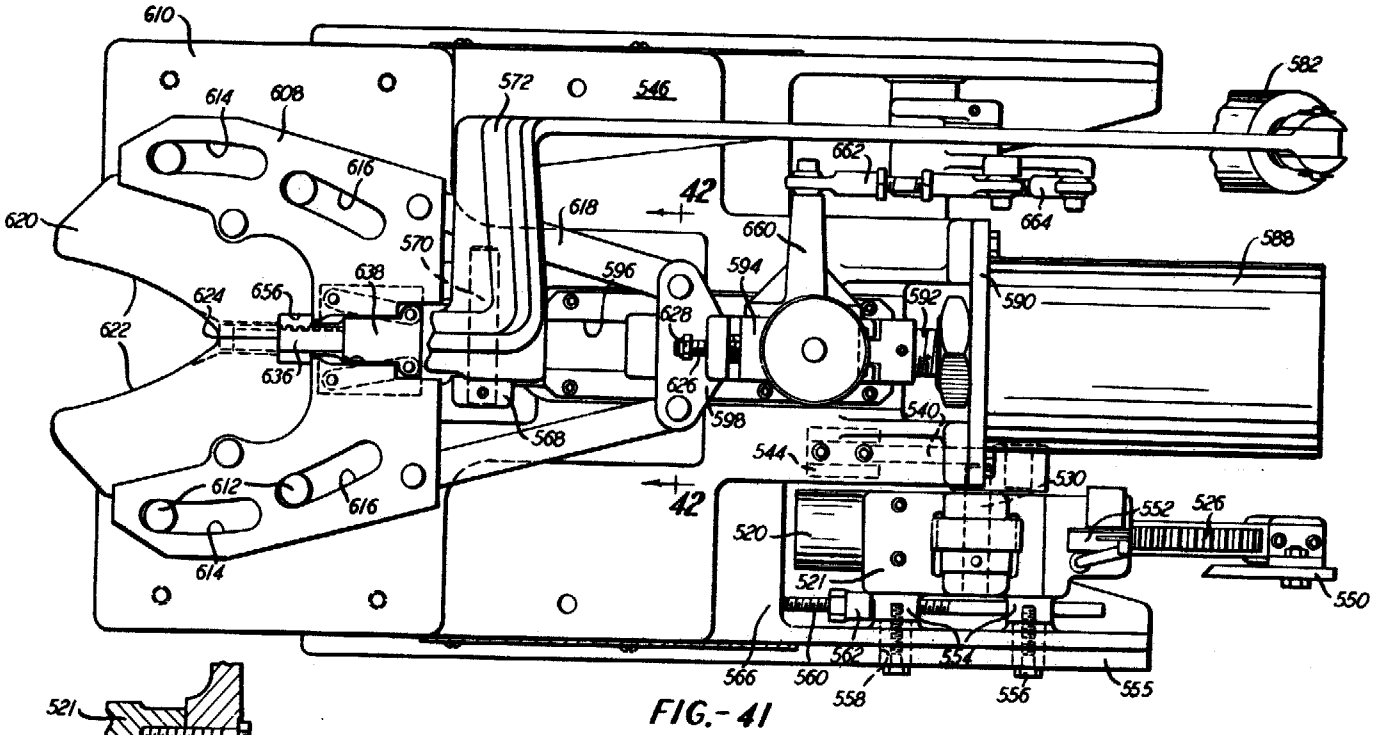
FIGURE 41 is a plain view taken on the line 41—41 of FIGURE 29.
Figure 38:
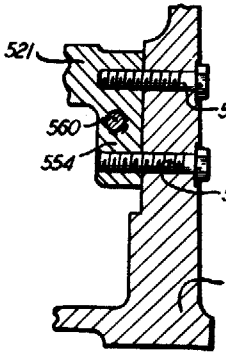
FIGURE 38 is a view taken on the line 38—38 of FIGURE 35.

Referring to FIGURES 35, 38 and 41, the block 521 has a pair of laterally extending flanges 554 that are secured to a side wall 555 of the frame 10 by headed bolts 556 that extend through horizontally elongated slots 558 in the frame wall 555 and are threaded into the flanges 554. A threaded rod 560 is slidably mounted in the flanges 554 and a boss 562 secured to and extending forwardly of the forwardmost flange 54. A lock nut 64, threaded onto the rod 560 and bearing against the boss 562, serves to hold the rod in adjusted position in the flanges 554 with the front end of the rod bearing against a transverse wall 566 of the frame 10. With this arrangement, the position of the block 521, the slide plate 546 and the parts carried thereby may be adjusted forwardly and rearwardly of the machine frame to the extend permitted by the slots 558 by loosening the bolts 556 and 560, repositioning the rod 560 in the flanges 554 with the front of the rod bearing against the frame wall 566 in its new position and retightening the bolts 556 and 560.

Referring to FIGURES 29 and 41, trunnions 568 upstanding from the slide plate 546 mount a pin 570 on which is swingably mounted a hold-down lever 572. The lever 572 has a front leg 574 extending forwardly of the pin 570 and a rear leg 576 extending rearwardly of the pin 570. A toe hold-down 578, having a flexible hold-down pad 580 thereon, is secured to the front end of the lever leg 574. An air actuated motor 582, pivoted to a bracket 584 secured to the frame 10, has a piston rod 586 that is pivoted to the rear end of the lever leg 576.

Figure 43:
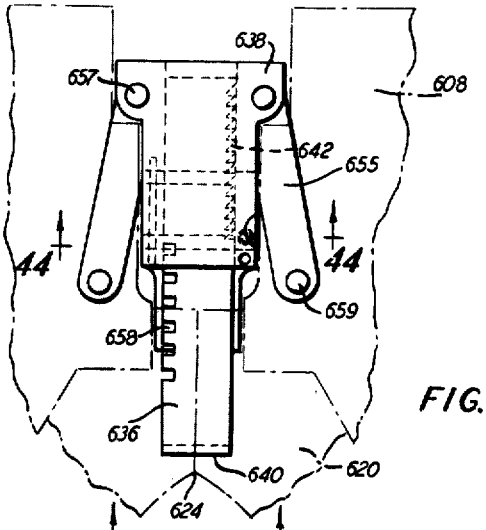
FIGURE 43 is a fragmentary view to an enlarged scale showing a knife mounted for movement in the wipers.
Figure 45:
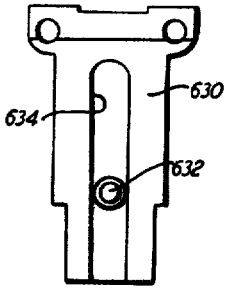
FIGURE 45 is a detail showing a knife guiding arrangement.
Figure 44:
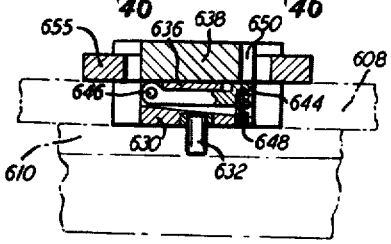
FIGURE 44 is a view taken on the line 44—44 of FIGURE 43.
Figure 42:
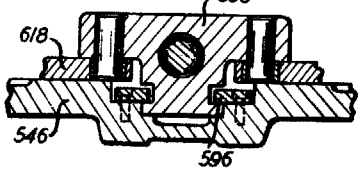
FIGURE 42 is a section taken on the line 42—42 of FIGURE 41.
Figure 59:
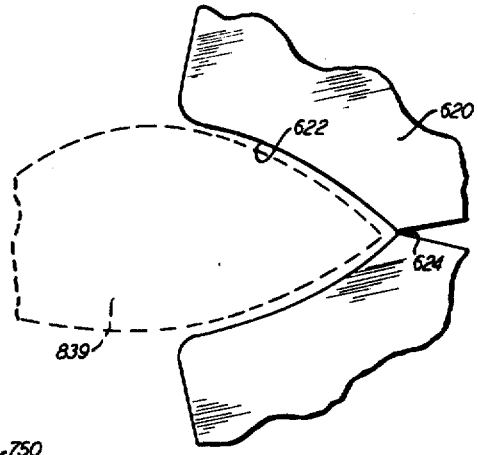
FIGURE 59 is a representation of the last and wipers at the beginning of the wiping stroke.

Referring to FIGURES 29, 41 and 42, an air actuated motor 588 is fastened to flange 590 secured to the rear of the slide plate 546. The piston rod 592 of the motor 588 is connected to a housing 594 that is slidably mounted in gibs 596 formed in the slide plate 546. A block 598 is slidably mounted in the gibs 596 forwardly of the housing 594 and is connected to the housing by a bolt 600 that is threaded into the block and extends rearwardly therefrom into the housing. The bolt 600 is connected by bevel gears 602 within the housing 594 to a pin 604 that extends upwardly of the housing. A knob 606 is secured to the pin 604. A pair of symmetrically disposed wiper cams 608 are slidably supported on a thickened block 610 that forms the forward end of the slide plate 546. The block 610 has pins 612 upstanding therefrom that extend into slots or cam tracks 614 and 616 formed in the wiper cams 608. Forwardly diverging links 618 are pivotally connected at their rear ends to the block 598 and at their forward ends to the wiper cams 608. Wipers 620 are connected to and extend forwardly of the wiper cams 608. The wipers, as in conventional, are flat plates having forwardly divergent edges 622 that diverge from a vertex 624 (FIGURES 41, 43 and 59). A bolt 626 is threaded into the housing 594 and extends forwardly thereof slidably through the block 598. A stop nut 628 is threaded onto the front end of the bolt 626.

Figure 46:
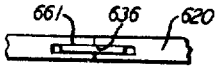
FIGURE 46 is a view taken on the line 46—46 of FIGURE 43.

Referring to FIGURES 43, 46, the contiguous faces of the wiper cams 608 are spaced to accommodate a bracket 630 that rests on the block 610. A pin 632 is fitted into and extends upwardly of the block 610 and is received in a forwardly and rearwardly extended slot 634 formed in the bottom of the bracket 630. A knife 636 is received between the bracket 630 and a cap 638 that overlies and is secured to the bracket. The knife has a sharpened edge 640 at its forward end and a plurality of ratchet teeth 642 at one of its sides that are engageable by a pawl 644. The pawl is pivotally mounted by a pin 646 to the bracket 630 and is resiliently urged upwardly into locking engagement with a selected ratchet tooth 642 by a compression spring 648. A cut-out 650 is provided in the cap 638 above the pawl 644 that is in alignment with a spring pressed plunger 652 (FIGURE 50) mounted on a cover block 654 located above the cap 638. By lowering the plunger 652 against the force of its spring 656, the pawl and ratchet teeth are disengaged, at which time the position of the knife lengthwise of the bracket 630 may be adjusted by the engagement of a screw driver bit through an opening 656 (FIGURE 41) and the wiper 620 with notches 658 on the knife 636. A pair of links 655 are pivotally connected to the rear of the cap 638 at each side thereof by pivots 657 and extend forwardly and divergently therefrom. The forward ends of the links 655 are pivotally connected to the wiper cams 608 by pivots 659. The knife 636 extends into cut-outs 661 provided in the adjoining surfaces of the wipers 620 rearwardly of the vertex 624.

Figure 40:
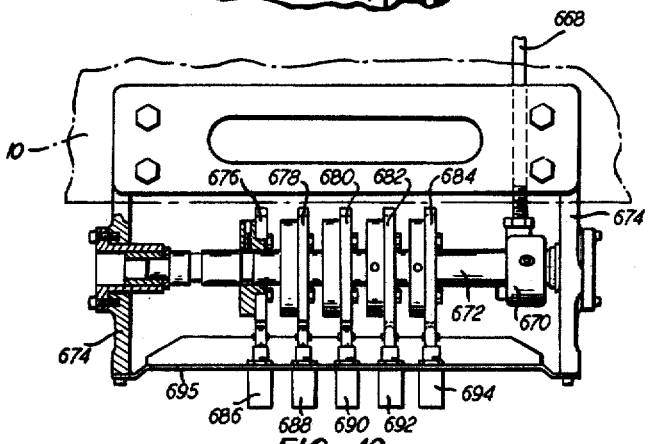
FIGURE 40 is a view taken on the line 40—40 of FIGURE 29.

Referring to FIGURES 29, 40 and 41, the housing 594 has a laterally projecting limb 660 to which is pivoted a link 662. The link 662 is pivoted to one end of a bell crank 664, and the bell crank is pivoted intermediate its ends to a bracket 666 secured to the head 452. The other end of the bell crank is pivoted to the top of a rod 668, and the lower end of the rod 668 is pivoted to a sleeve 670. The sleeve 670 is secured to a shaft 672 that is rotatably mounted in a pair of hangers 674 secured to the frame 10. Five cams 676, 678, 680, 682 and 684, secured to the shaft 672, have cam lobes extending partly about their peripheries that are respectively positioned to engage valves 686, 688, 690, 692 and 694 in response to rotation of the shaft 672, the valves being mounted on a strap 695 secured to the hangers 674.

Figure 47:
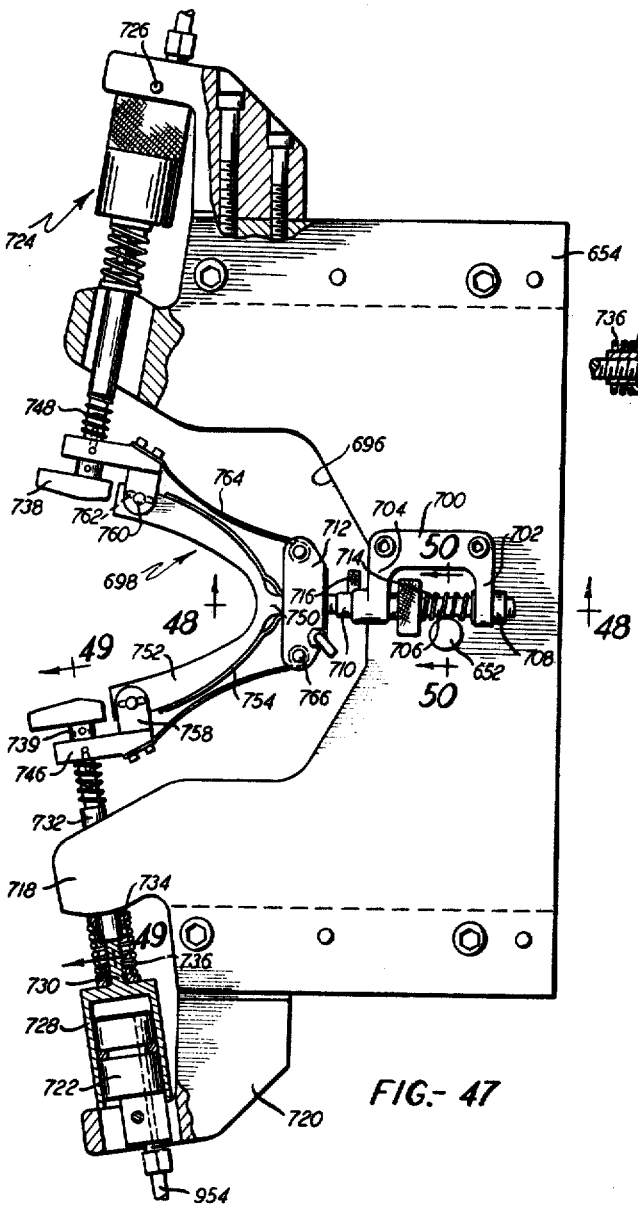
FIGURE 47 is a plan view of the shoe conforming yoke and the bumpers.
Figure 49:
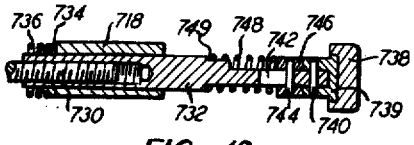
FIGURE 49 is a view taken on the line 49—49 of FIGURE 47.
Figure 50:
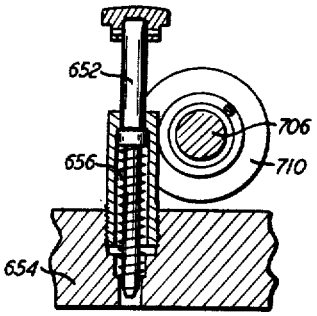
FIGURE 50 is a view taken on the line 50—50 of FIGURE 47.
Figure 48:
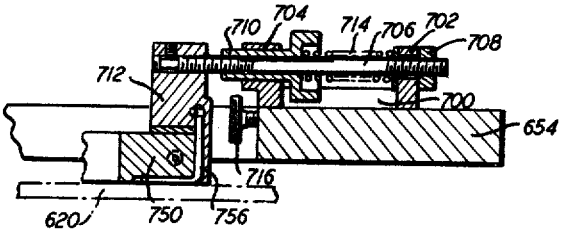
FIGURE 48 is a view taken on the line 48—48 of FIGURE 47.

The cover block 654 is secured to the block 610 and extends above the wiper cams 608 (FIGURES 1 and 39). Referring to FIGURES 47, 50, the block 654 has a cut-out 696 at its forward end to accommodate a flexible shoe conforming pad or yoke 698. A U-shaped bracket 700, having a rear leg 702 and a front leg 704, is bolted to the block 654. A stud 706 extending through the legs has a stop nut 708 threaded thereon rearwardly of the leg 702. A sleeve, that is formed as a nut 710, is threaded on the stud 706 and is slidably guided in the front leg 704. The forward end of the stud 706 is threaded into and secured to a yoke mounting bracket 712. The rearward end of the nut 710 is formed into a cup that receives a compression spring 714 which is coiled about the stud 706 and extends between the nut 710 and the leg 702. A stop screw 716 is threaded into the block 654 under the stud 706 and rearwardly of the bracket 712. The block 654 is formed into inner flanges 718 at the forward ends of the cut-out 696 and outer flanges 720 that are bolted to the block. The piston 722 of an air actuated motor 724 is pivotally secured to each flange 720 by a pin 726 to extend inwardly thereof and a cylinder 728 is slidable on each piston 722. Each cylinder 728 has a screw 730 extending inwardly thereof that is threaded into a bar 732, the bars 732 being slidably mounted in the inner flanges 718. A sleeve 734 is slidably mounted on each bar 732 to bear against the exterior of an inner flange 718, and compression springs 736 interposed between the sleeves 734 and the cylinders 728 serve to yieldably urge the cylinders and the bars 732 outwardly with the cylinders abutting against the outer flanges 720. A rubber bumper 738 is mounted on a mount 739 that in turn is pivotally secured to the inner end of each bar 732 by a pin 740. Slots 742, formed on the bars 732 outwardly of the bumpers 738 and pins 740, receive pins 744 that are secured to brackets 746.

Compression springs 748, interposed between shoulders 749 on the bars 732 and the brackets 746 serve to yieldably urge the brackets 746 inwardly with the pins 744 engaging the inner ends of the slots 742.

The yoke 698 is of substantially U-shape and has a bight 750 and a pair of legs 752 extending forwardly of the bight on opposite sides of the bight. The yoke is made of a flexible, deformable material such as Teflon and has a pair of bowed springs 754 extending exteriorly of each yoke leg from the bight forwardly thereof. The bight 750 of the yoke is received in a socket 756 in the bracket 712. An inwardly extending support arm 758 on each bracket 746 has a downwardly extending pin 760 that is inserted into a slot 762 in each yoke leg 752. Each bracket 746 has a spring arm 764 secure thereto and extending rearwardly thereof that is entwined at its rear end on a pin 766 located in the mounting bracket 712. The yoke 698 is located in the machine directly above the wipers 620.

Figure 51:
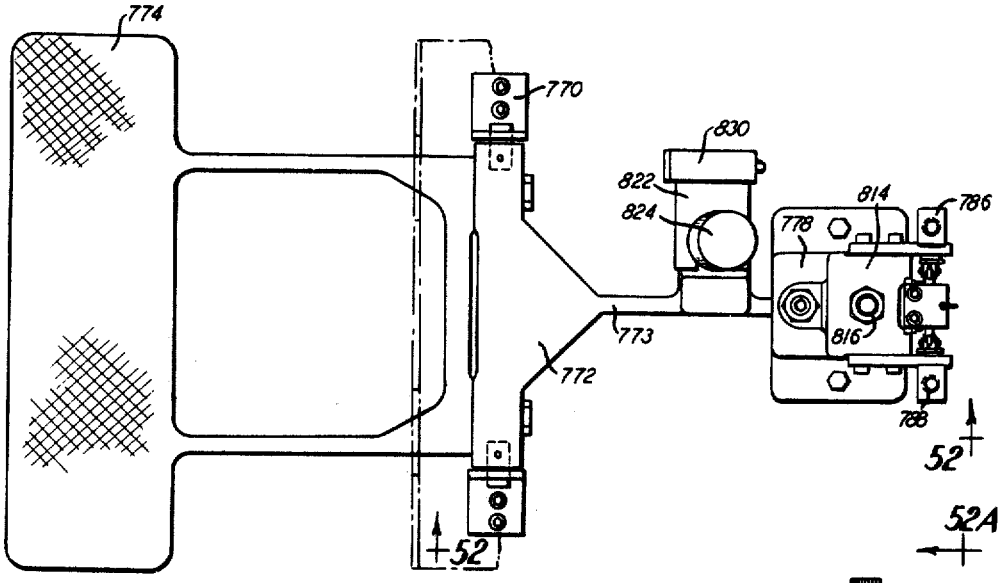
FIGURE 51 is a plan view of a control pedal arrangement for the machine.
Figure 52A:
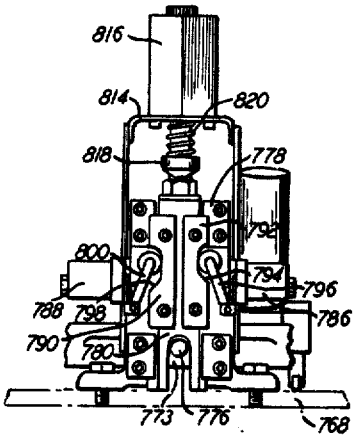
FIGURE 52A is a view taken on the line 52A—52A of FIGURE 52.
Figure 52:
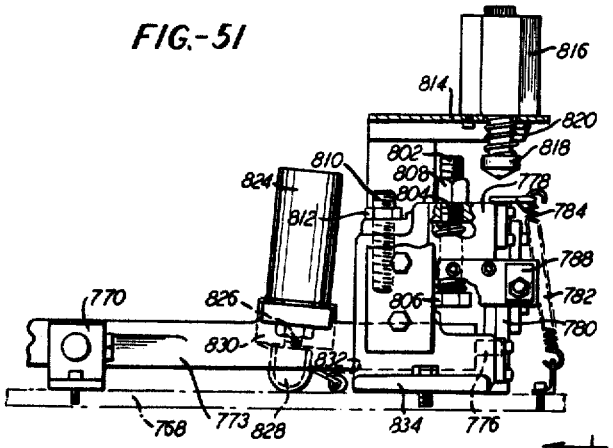
FIGURE 52 is a view taken on the line 52—52 of FIGURE 51.

Referring to FIGURES 1 and 51–52, the frame 10 includes a base 768 having trunnions 770 bolted thereto. A control pedal 772, having an extension bar 773, is pivotally mounted in the trunnions 770. The pedal has a platform 774 at its forward end that can be stepped on by the operator and a boss 776 at its rear end. A housing 778, secured to the base 768, straddles the bar 773 and has a plate 780 slidably mounted therein above the boss 776. The plate 780 is yieldably urged downwardly to the FIGURES 52 and 52A position by a tension spring 782 extending between a cap 784 on top of the plate 780 and the base 768. A pair of valves 786 and 788 are mounted in the housing 778, and a pair of cams 790 and 792 are bolted to the plate 780. A shoulder 794 on the cam 792 is in alignment with the actuating member 796 of the valve 786 and a shoulder 798 on the cam 790 is in alignment with the actuating member 800 of the valve 788. The valves 786 and 788 are positioned at the same elevation, but the shoulder 794 is at a higher elevation than the shoulder 798. A stop member in the form of a bolt 802, extending downwardly through the housing 778 above the bar 773, has a compression spring 804 interposed between the bolt head 806 and the housing 778 whereby the bolt is yieldably urged downwardly to a position determined by a nut 808 threaded onto the stud and engaging the top of the housing. A stud 810 is threaded into the housing 778 to extend downwardly thereof an amount determined by a lock nut 812. A bracket 814, mounted on the housing 778, has a valve 816 mounted thereon that has a downwardly directed valve stem 818 that is yieldably urged downwardly by a compression spring 820. The valve stem 818 is in alignment with the cap 784. A laterally extending flange 822, secured to the bar 773, has an air actuated spring return motor 824 mounted thereon. The motor 824 has a downwardly directed piston rod 826, and the piston rod 826 has a plunger 828 thereon that bears against the base 768. A valve 830 is secured to the flange 822 outwardly of the motor 824. The actuating member 832 of the valve 830 is adapted to bear against the base 768 to maintain the valve in a normally closed position.

In the preparation of the machine, the aforementioned machine parts are adjusted where necessary to accommodate them to the particular size and shape of shoe and last being operated on.

In the idle condition of the machine, the motor 16 and the insole rests 64, 70 carried thereby are in a lowered condition, the motor 88 is in the FIGURE 6 position so that the applicator 120 is in an upper position urged to a level slightly higher than the level of the insole rests 64, 70 by the springs 106, the front pincers 286 are open with the jaw 282 in its uppermost position due to the projection of the piston rod 276 upwardly of the motor 272 and the retraction of the piston rods 292 into the motors 290, pressurized air is entering the cylinder 304 through a line 836 to raise the piston rod 308 and the front retarder 320 with respect to the housing 254 against the resistance of the spring 314, the side retarders 344 are held in a raised position by the motors 336 under relatively low pressure, the motors 406 are held in an outward position against the cams 414 by the springs 418 and are held by gravity in a forward position with the set screws 410 bearings against the stop plates 378 due to the inclination from the vertical of the motors 406 (FIGURE 1), the piston rods 424 of the motors 406 are in an elevated position and the motors 426 are in a lowered position with respect to the piston rods 424 so that the side pincers 432 are in a raised position with their jaws open, the piston rod 458 is projected forwardly of the motor 454 so that the heel clamp 486 is in a forward position, the piston rod 518 is projected outwardly of the cylinder 514 of the motor 516 so that the brakes 494 are in an unlocking position with respect to the bars 462, the piston rod 522 is projected outwardly of the motor 520 so that the slide plate 546 and the parts carried thereby are in a rearward out-of-the-way position, the piston rod 586 is retracted into the motor 582 so that the hold-down 578 is in an elevated position, the piston rod 592 is retracted into the motor 588 so that the wipers 620 are in their rearward open position, the spring 714 yieldably urges the bight 750 of the yoke 698 forwardly with the nut 708 bearing against the rear leg 702, the yoke legs 752 are yieldably urged inwardly with respect to the bars 732 under the influence of the springs 748, and the cylinders 728 of the motors 724 bear against the outer flanges 720 with no pressurized air entering the motors 724 thus maintaining the bumpers 738 outward of the inner peripheral wall of the yoke 698.

Figure 11:
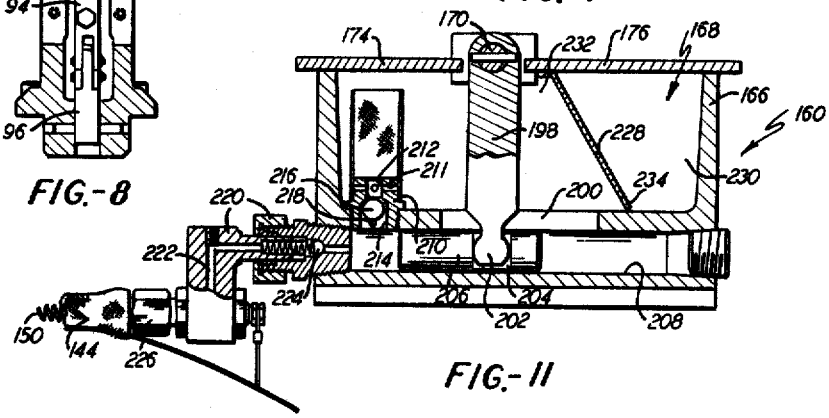
FIGURE 11 is a section taken on the line 11—11 of FIGURE 10.
Figure 23:
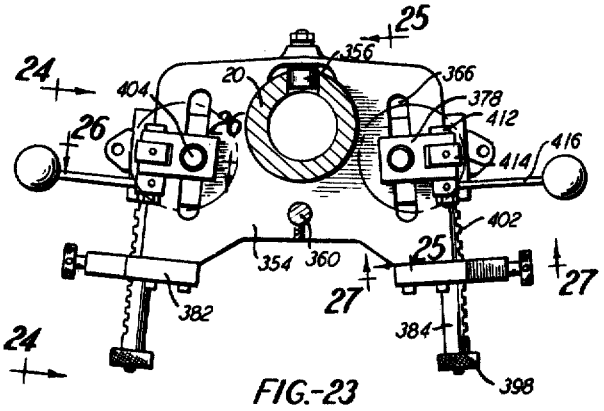
FIGURE 23 is a plan view of a portion of the machine showing the mounting of the side pincers.
Figure 27:
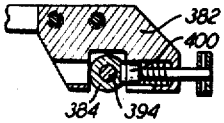
FIGURE 27 is a view taken on the line 27—27 of FIGURE 23.
Figure 26:
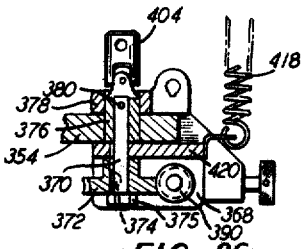
FIGURE 26 is a view taken on the line 26—26 of FIGURE 23.
Figure 25:
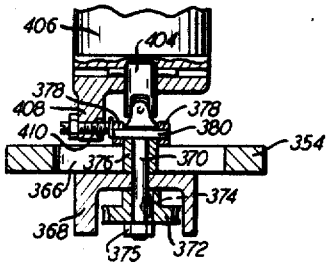
FIGURE 25 is a view taken on the line 25—25 of FIGURE 23.

Before starting the machine, crystals of thermoplastic cement are placed in the compartment 230 of the cement pot 168 wherein they melt and flow through the cutouts 234 into the compartment 232, through the compartments 232 and the passage 211, 212 and 214 into the bore between the plunger 206 and the adapter 220 and into the passage 222 up to the ball valve 224 (FIGURE 11). The handle 194 is then manually oscillated to move the plunger 206 back and forth from the FIGURE 11 position to a forward position determined by the setting of the stud 190 which causes the molten cement to be forced through conduit means that comprise the passage 222, the conduit 144, the passage 141 (FIGURE 6), the holes 134 and 136, the channels 130 (FIGURE 9) and the holes 128 (FIGURE 7) until the molten cement appears at the tops of the holes 128. After this, in the idle condition of the machine, the motor 186 is in such condition that the plunger 206 is in its rearward position.

Figure 54:
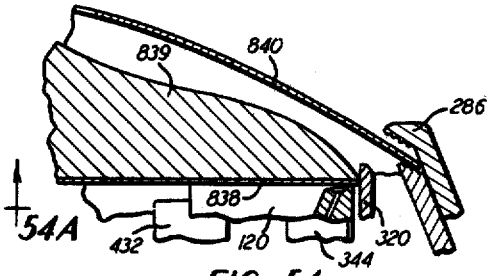
FIGURE 54 is a representation of the shoe assembly as it appears when it is placed in the machine.
Figure 54B:
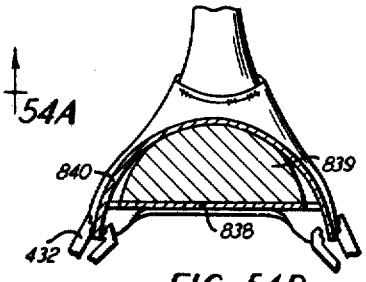
FIGURE 54B is a view taken on the line 54B—54B of FIGURE 54A.
Figure 54A:
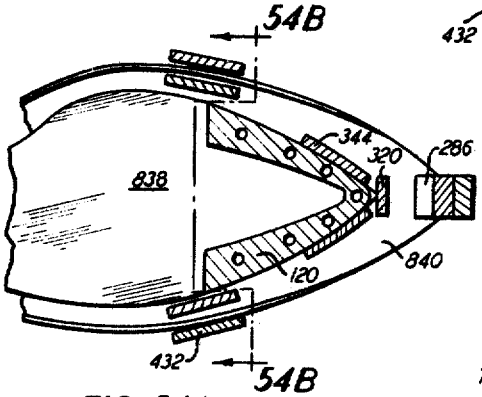
FIGURE 54A is a view taken on the line 54A—54A of FIGURE 54.

Referring to FIGURES 54, 54A and 54B, a shoe assembly is presented bottom-down to the machine to be pulled over and toe lasted. The shoe assembly comprises a shoe insole 838 located on the bottom of a last 839 preferably by being tacked thereto, and a shoe upper 840 draped over the last. The shoe has preferably been heel seat lasted by an apparatus such as that shown [is pending application Ser. No. 353,462, filed Mar. 20, 1964.] *in Patent No. 3,320,626*. The insole is brought to bear against the top of the applicator 120, which at this time is resiliently urged above the level of the insole rests 64, 70 by the springs 106, so that the applicator bears against and supports the margin of the toe portion of the insole. The outer periphery of the last is caused to bear against the front retarder 320 and the side retarders 344 so that the retarders act as gauges to accurately locate the shoe assembly in the machine. The toe end of the upper margin is placed between the open jaws of the front pincers 186 and the forepart portions of the upper marign are inserted between the open jaws of the side pincers 432.

Figure 53A:
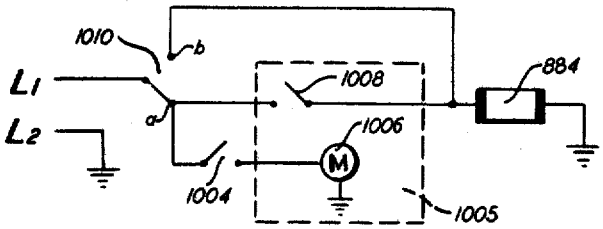
FIGURE 53A is a schematic representation of a time delay mechanism used in operating the machine.
Figure 19:
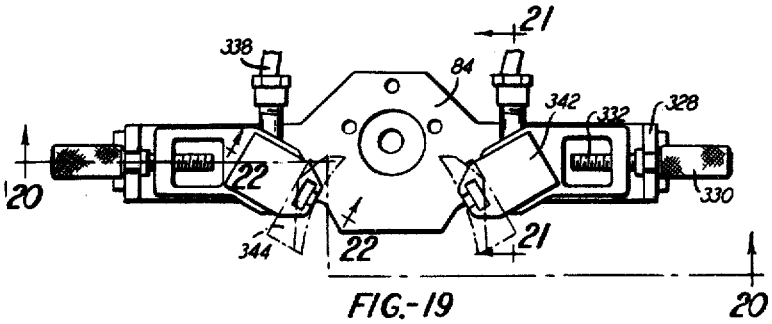
FIGURE 19 is a plan view of the side retarders.
Figure 20:
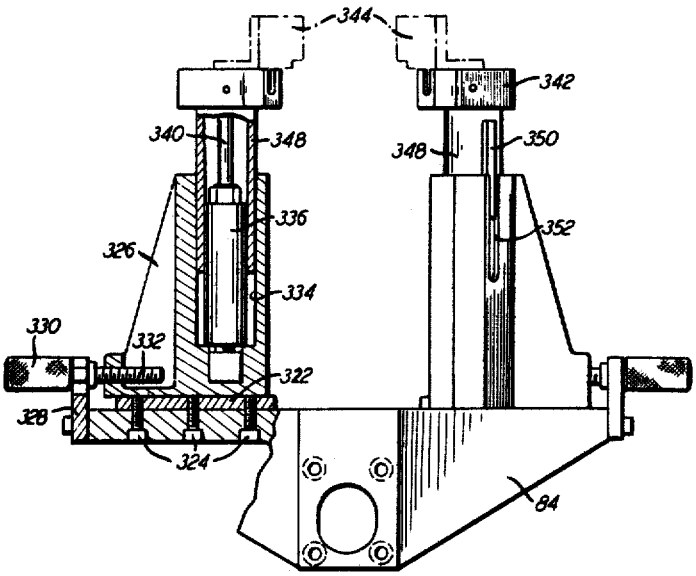
FIGURE 20 is a view taken on the line 20—20 of FIGURE 19.
Figure 21:
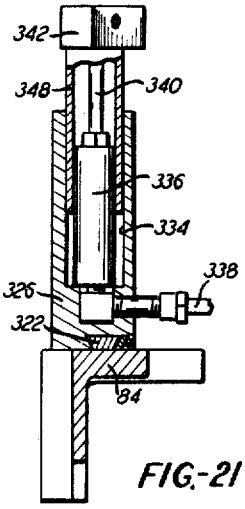
FIGURE 21 is a view taken on the line 21—21 of FIGURE 19.
Figure 53:
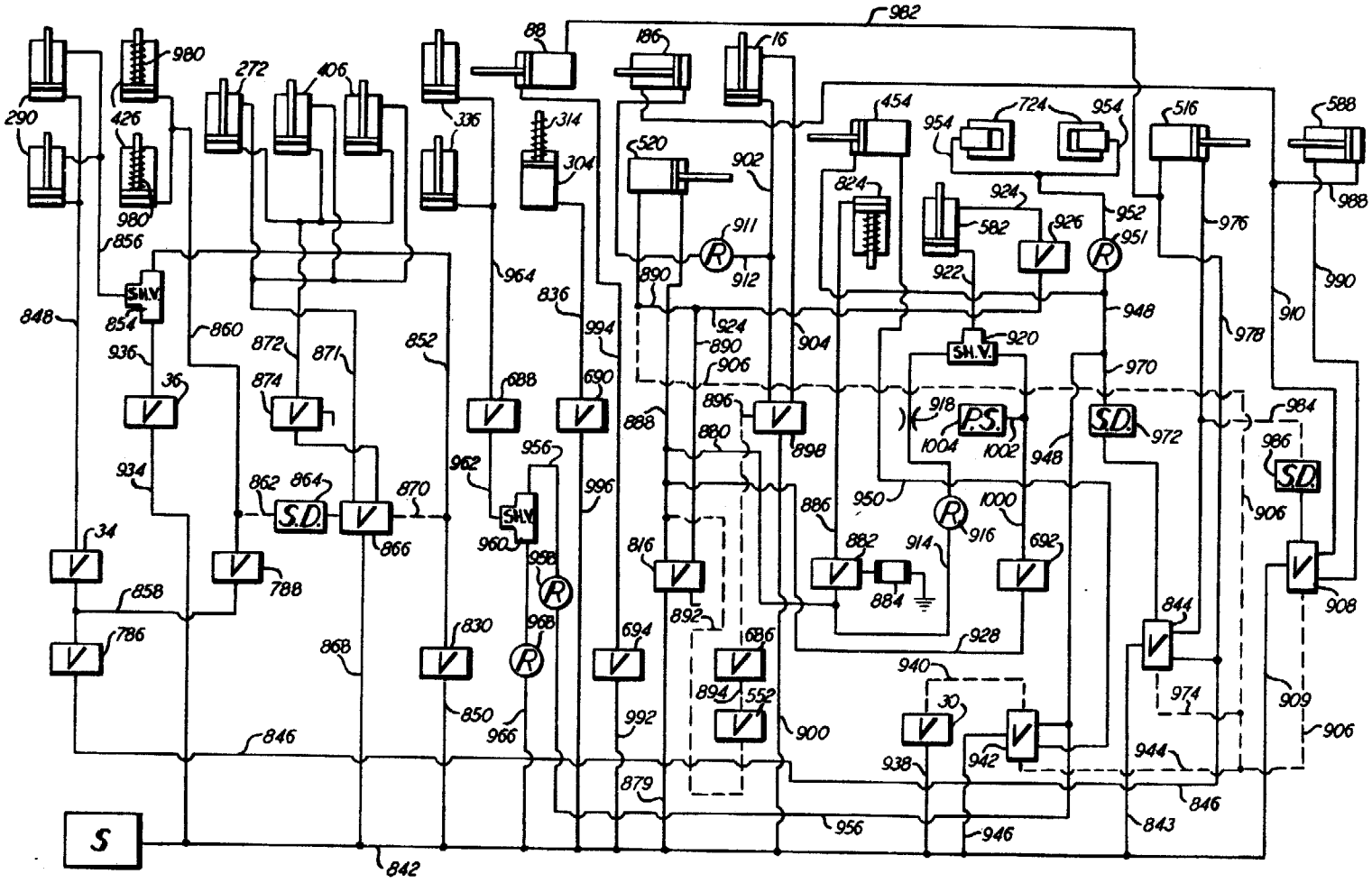
FIGURE 53 is a schematic diagram of the control circuit of the machine.

The control system for the machine is shown in the schematic circuit diagram of FIGURE 53. The control system includes shuttle valves that are conventional items that have two inlet ports and one exit port. The shuttle valves are so constructed that air of different pressures may enter the two inlet ports and the air emanating from the exit port will have the pressure of the higher of the two pressures entering the inlet ports. The control system also includes sequencing devices that are conventional items so constructed as to offer resistance to the passage of air therethrough so that the air will follow an alternative path other than through the sequencing device if one is available. When such an alternative path is not available or is blocked, the air will go through the sequencing device.

The operator now depresses the platform 774 an amount sufficient to cause the shoulder 796 on the cam 792 to shift the valve 786 to open it and to enable the actuating member 832 of the valve 830 to rise above the Plate 768 an amount sufficient to close the valve 830. Referring to the schematic circuit diagram of FIGURE 53, wherein the source of air for the pneumatic system is designated as S, the pressure lines are drawn in solid lines and the pilot lines are drawn in dotted lines, the opening of the valve 786 causes pressurized air to pass from the source through a line 842, a line 843, a valve 844, a line 846, the valve 786, the normally open valve 34 and a line 848 to the motors 290 to actuate these motors to close the jaws of the pincers 286 on the toe end portion of the upper margin. In the idle condition of the machine, air had entered the motors 290 to maintain the pincers 286 open from the line 842, a line 850, the valve 830, a line 852, a shuttle valve 854 and a line 856. During the actuation of the motors 290 to close the jaws of the pincers 286, the air above the pistons of these motors egresses therefrom through the line 856, shuttle valve 854, line 852 and the valve 830 and is exhausted to atmosphere from the valve 830.

The opening of the valve 786 also causes pressurized air to pass through this valve and a line 858 to the now closed valve 788.

If the operator is not satisfied with the way the pincers 286 have grasped the upper, he may take his foot off the platform 774 to thereby open the pincers' jaws.

Assuming that he is satisfied with the closure of the pincers 286 on the upper 840, the operator now depresses the platform 774 further to cause the shoulder 798 on the cam 790 to shift the valve 788 to oepn it while the valve 786 remains shitfed. The bolt head 806 is so located as to be engaged by the bar 773 at the time the cam 790 shifts the valve 788 so that the operator can feel when the valve 788 is shifted by the resistance to movement of the bar offered by the spring 804. This causes pressurized air to pass from the line 858, through the valve 788 and a line 860 to the motors 526 to actuate these motors to raise the cones 448 to first lower the jaws 436 and then raise the jaws 438 and thereby cause the side pincers 432 to grip the forepart portions of the upper margin. At the same time pressurized air passes from the line 860 and a pilot line 862 to a sequencing device 864 to shift a valve 860 after the actuation of the motors 426. The valve 866 had been maintained in its initial position by pressurized air passing from the valve 830 through a pilot line 870 to the valve 866. The closure of the valve 830 had allowed the air in the line 870 to be exhausted to atmosphere through this valve. The shifting of the valve 866 enables pressurized air to pass from the line 842 through a line 868, the valve 866 and a line 871 to the motors 272 and 406 to actuate these motors. Prior to the shifting of the valve 866, pressurized air had passed to the motors 272 and 406 from the valve 866 and a line 872 to maintain these motors in their idle condition. The air egressing from the motors 272 and 406 in response to the shifting of the valve 866 is vented to atmosphere through the line 872 and a quick exhaust valve 874. The actuation of the motor 272 causes the front pincers 286 to move downwardly and rearwardly away from the last to thereby stretch the toe potrion of the upper margin about the toe end of the last and the actuation of the motors 406 causes these motors to move the side pincers 432 downwardly to stretch the forepart portions of the upper margin about the last. The machine now comes to a stop with the shoe assembly engaging parts in the position shown in FIGURES 55, 55A and 55B.

Figure 55B:
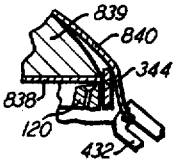
FIGURE 55B is a view taken on the line 55B—55B of FIGURE 55A.
Figure 55:
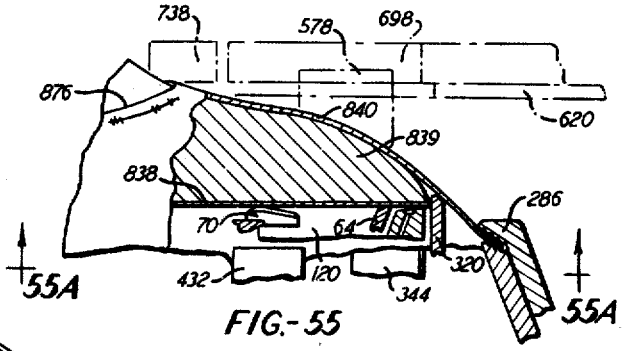
FIGURE 55 is a representation of the shoe assembly as it appears in the machine after the upper has been stretched about the last by the front and side pincers.
Figure 55A:
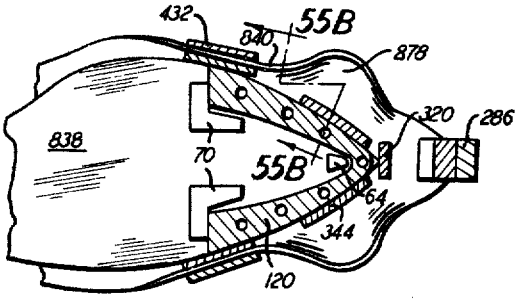
FIGURE 55A is a view taken on the line 55A—55A of FIGURE 55.

Referring to FIGURES 55, 55A and 55B, the aforesaid downward and rearward movement of the front pincers 286 causes the upper 840 to be pulled and stretched about the toe end of the last and also in a heel to toe direction with the upper dragging about the front retarder blade 320, the angle of the plane of movement of the front pincers 286 and the initial horizontal distance between the front pincers and the retarder blade being determined by the setting of the cam 264. The downward movement of the side pincers 432 causes the upper at the forepart to be stretched tightly about the last 839 with the upper dragging about the side retarders 344. The universal joints 404 enable the motors 406 and the side pincers 432 carried thereby to swing rearwardly towards the toe of the shoe assembly and inwardly of the shoe assembly during the downward movement of the side pincers. Due to the inclination from the vertical of the motors 406 as shown in FIGURE 1, these motors and the side pincers are normally tilted from the vertical to a position where the set screws 410 engage the stop plates 378, and the set screws ride off the stop plates during the toeward movement of the motors 406 and side pincers 432. The bases 422 of the motors 406 ride off the cams 414 during the inward movement of the motors 406 and side pincers 432. These toward and inward movements are occasioned by the direction of pull of the front pincers 286, and the mounting of the side pincers 432 that permits their toeward and inward movement prevents the side pincers from fighting against the toe pincers during their upper stretching movements. The result of the aforesaid pincers movements is a tight stretching of the upper and about the toe and forepart of the last with the topline 876 (FIGURE 55) of the upper stretched tightly on the last. During the movement of the pincers 286 and 432, the toe end portion of the upper 840 is forced about the front retarder 320 (FIGURE 55) and forces the front retarder down to some extent against the yieldable force provided by the pressurized air in the cylinder 304, and the forepart portions of the upper are forced about the side retarders 344 (FIGURE 55B) and force the side retarders down to some extent against the yieldable force provided by the pressurized air in the motors 336. The front retarder 320, by engaging the toe end of the last, prevents rearward or toeward movement of the shoe assembly during the stretching movement of the front pincers 286, and the side retarders 344, by engaging the sides of the last, prevent lateral movement of the shoe assembly during the stretching movement of the side pincers 432. Since the front pincers 286 and side pincers 432 are driven in their stretching movements by yieldable forces created by air under pressure, they terminate these movements when the stretching forces are equalized by the resistance to stretching of the upper. The portions of the stretched upper margin between the front and side pincers are outspread into dog ears 878 (FIGURE 55A).

Figure 24:
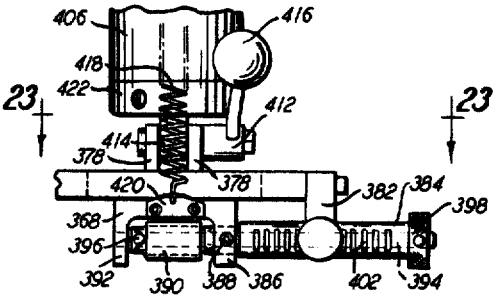
FIGURE 24 is a view taken on the line 24—24 of FIGURE 23.

As stated above, the upper is dragged about the front retarder 320 and the side retarders 344 during the stretching movement of the pincers 286 and 432. This precludes the upper from dragging along the marginal edges of the insole 838 during its stretching movement. Since the insole is usually tacked to the last bottom in locations that are inward of the insole marginal edges, the dragging of the upper along the insole marginal edges would tend to force the insole marginal edges away from the last bottom which would be undesirable during the subsequently performed wiping operation. The pincers 286 and 432 should initially be located close enough to the last 839 in a horizontal direction to enable them, in their stretching movement, to stretch the upper about the last as described above. However, if the pincers are initially located too close to the last for the particular thickness of upper material used and for the particular resistance to sliding movement or coefficient of friction of upper material used, the upper would grab unduly against the retarders during the stretching of the upper about the last by the pincers. In order to set the initial horizontal distance of the pincers with respect to the retarders for the particular types and thickness of upper utilized, the initial position of the front pincers 286 may be adjusted by manipulating the cam 264 (FIGURE 16) and the initial positions of the side pincers 432 may be adjusted by manipulating the cams 414 (FIGURE 24).

As stated above, when the shoe assembly was placed in the machine, the applicator 120 was resiliently urged above the level of the insole rests 64, 70 by the springs 106, this causing the insole 838 to be located above the insole rests. The downward pulling action of the pincers 286 and 432 causes the applicator to move downwardly against the forces of the springs 106 until the insole 838 comes into engagement with the insole rests. Due to the fact that the applicator is connected by the pin and slot connections 114 to the three prongs 102, 104 the applicator is capable of having limited universal tilting movement with respect to a horizontal plane during its downward movement about the fulcrums formed by the connections 114, so that at the end of its downward movement it will conform to and bear snugly against the insole regardless of the fact that the insole bottom does not lie in a true horizontal plane. At the end of the downward movement of the applicator, the insole is therefore supported at its margin by the applicator, which prevents the insole margin from dropping downwardly of the last, and is supported interiorly of its margin by the insole rests 64, 70.

At this time the operator may release the platform 774 to thereby close the [vales] *valves* 786 and 788 and open the valve 830 and return the machine parts to their idle positions. The operator may decide to do this if the upper is not being pulled over properly. The machine may also include mechanism (not shown) similar to that shown in [pending application Ser. No. 231,756 filed Oct. 19, 1962] *Patent No. 3,233,261* for individually and selectively increasing or decreasing the downwardly directed forces of the front pincers 286 and side pincers 432 to thereby relocate the upper 840 on the last 839 if he is not satisfied with its position when the parts are in the FIGURES 55, 55A and 55B position.

The operator may now further depress the platform 774 against the force of the spring 804 to thereby further raise the bar 773 and cause the cap 784 of the plate 780 to shift the valve 816 while the valves 786 and 788 remain shifted. The stud 810 is so positioned as to stop the movement of the bar 773 when the valve spool 818 has been shifted an amount sufficient to enable the succeeding operations to take place. The opening of the valve 816 causes pressurized air to pass from the line 842, through a line 879, the valve 816, a line 880, a normally open valve 882 controlled by a solenoid 884 and a line 886 to the motor 824 to actuate this motor to force its piston rod 826 and the button 828 downwardly against the plate 768 so as to maintain the bar 773 in the position the operator had placed it with the valve 816 opened. The operator may now take his foot off the platform 774 for the rest of the machine cycle.

The shifting of the valve 816 also enables pressurized air to pass through this valve and a line 888 to the motor 520 to actuate this motor to cause the piston rod 522 through the above described linkage shown in FIGURES 35–37, to move the slide plate 546 from its rearward out-of-the-way position to a forward working position. Prior to the shifting of the valve 816 the motor 520 had kept the slide plate 546 in its idle out-of-the-way position by pressurized air passing from the line 879 through the valve 816 and a line 890 to the motor 520, and upon actuation of this motor, the air in it is exhausted to atmosphere through the line 890 and the valve 816. The pressurized air entering the line 888 in response to the shifting of the valve 816 had also passed through a pilot line 892 to the normally closed valve 552. Toward the end of the forward movement of the slide plate 546, the cam 550 opens the valve 552 to direct the pressurized air through the valve 552, a pilot line 894, the normally open valve 686 and a pilot line 896 to shift a valve 898. The shifting *of* the valve 898 causes pressurized air to pass from the line 842 through a line 900, the valve 898 and a line 902 to the motor 16 to actuate this motor to raise the post 20 and the parts carried thereby until the tangs 252 engage the lugs 250 (FIGURE 5). Prior to *the* shifting of the valve 898, the motor 16 *had* been maintained in its idle position by pressurized air passing from the valve 898 through a line 904 to the motor 16.

Prior to the shifting of the valve 816, there had been no pressurized air in the motor 186 so that the aforementioned manipulation of the handle 194 could take place when the machine was in its idle condition due to the pressurized air in the line 890 passing through a pilot line 906 to a valve 908 to maintain this valve in a position wherein pressurized air could not pass from this valve through a line 910 to the motor 186. The shifting of the valve 816 cut off the flow of pressurized air into the line 906, thus enabling the valve 908 to be shifted later in the machine cycle to enable pressurized air to flow from the valve 908 to the motor 186 as described below. Upon shifting of the valve 816, the pressurized air in the line 906 is exhausted to atmosphere through the line 890 and the valve 816. The shifting of the valve 898 also causes pressurized air under relatively low pressure from the line 902 to pass through a self relieving low pressure regulator 911 and a line 912 to the motor 186 to actuate this motor to move the plunger 206 forwardly an amount determined by the position of the stud 190 with respect to the block 180 and thereby extrude a predetermined amount of molten cement through the holes 128 and groove 126 of the applicator 120 against the bottom of the margin of the insole 838 that is equal to the volume of cement displaced by the plunger 206 during its forward movement. The pressures generated during the forward movement of the plunger 206 unseats the valve 224 to allow the cement to pass from the bore 208, through the adapter 220, to the applicator 120 and also forces the ball 216 upwardly from the pin 218 against the ferrule 210 to block the passage 212 and thus cut off the flow of molten cement from the compartment 232 into the bore 208. The subsequent rearward movement of the plunger 206, described below, enables the valve 224 to be reseated and the passage 214 to reopen.

The shifting of the valve 816 also causes pressurized air to pass from the valve 816, through the line 880, a line 914, a low pressure regulator 916, a flow control valve 918, a shuttle valve 920 and a line 922 to the motor 582 to actuate this motor under relatively low pressure to thereby force the hold-down 578 against the top of the forepart of the rising shoe under relatively low pressure. Prior to the shifting of the valve 816, the motor 582 had been maintained in its idle condition by pressurized air passing from the valve 816 through a line 924 to this motor. Upon actuation of the motor 582, the pressurized air that had passed into it from the line 924 is exhausted to atmosphere through the line 924 and a quick exhaust valve 926.

The shifting of the valve 816 also causes pressurized air to flow from the valve 816, through a line 928 to the now closed valve 692.

Figure 56:
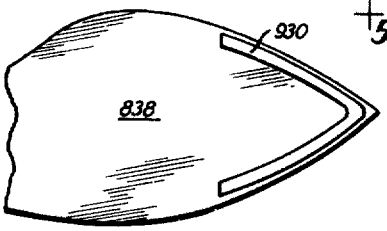
FIGURE 56 is a representation of the bottom of the insole with cement applied thereto.

To recapitulate upon shifting of the valve 816, the plunger 828 is forced against the plate 768 so that the operator may take his foot off the platform 774 for the rest of the machine cycle. In addition, the slide plate 546 is brought from its out-of-the-way position to its forward working position. The forward movement of the slide plate 546 brings the wipers 620 and the yoke 698 and bumpers 738 to a position where they can act on the shoe assembly as indicated in phantom in FIGURE 55. When the slide plate 546 has completed its forward movement, the post 20 is caused to rise to raise the applicator 120, the insole rests 64, 70, the pincers 286 and 432 and the retarders 320 and 344 until the tangs 252 engage the lugs 250, the elevation of the lugs 250 being such that the shoe assembly terminates its rise when the insole bottom is above the level of the tops of the wipers 620 an amount that is approximately equal to the thickness of the margin of the upper 840. At about the beginning of the rise of the applicator 120, a predetermined quantity of cement is extruded from the applicator 120 onto the margin of the insole 838 to coat the insole with the ribbon of cement 930 indicated in FIGURE 56. Shortly after the shoe assembly has started its rise, the hold-down pad 580 of the hold-down 578 comes into engagement with the top of the forepart of the shoe assembly under relatively light pressure as indicated in phantom in FIGURE 55 and rides upwardly with the shoe assembly under this relatively light pressure during the rise of the shoe assembly. It is desirable to keep the wipers 620, the yoke 698, the bumpers 738 and the hold-down 578 in an out-of-the-way position prior to the rise of the shoe assembly so that they will not interfere with the placement of the shoe assembly in the machine and the operation of the above-described pulling over operation and so that the operator will be able to see if the pulling over operation is being properly performed.

Figure 57:
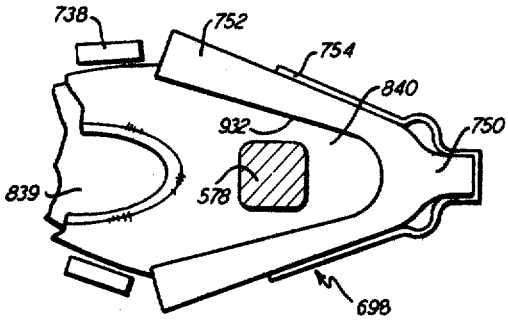
FIGURE 57 is a representation of the shoe assembly, shoe conforming yoke and bumpers during the rise of the shoe assembly through the yoke.

The shoe assembly was initially so placed on the applicator 120 that when the yoke 698 was moved to its forward working position the edges of the last 839 overlapped the inner wall 932 of the yoke 698 as indicated in FIGURE 57. When the shoe assembly is forced upwardly by the motor 16, the yoke wall 932 is initially compressed. When the wall can no longer be compressed, the bight 750 of the yoke flexes rearwardly against the pressure exerted by the spring 714 and the yoke legs 752 flex outwardly against the pressures exerted by the springs 754. After this, the support arms 758 and the spring arms 764 swing outwardly about the pins 766 and move the pins 744 outwardly in the slots 742 against the yieldable forces exerted by the springs 748 with the brackets 746 moving away from the mounts 739. The yieldable pressures exerted by the springs 714, 748, and 754 and the spring arms 764 cause the yoke 698 to snugly engage the upper 840 and cause the upper to snugly conform to the shape of the last 839 during the rise of the shoe assembly. The bearing of the hold-down 578 against the top of the forepart of the shoe assembly under the aforementioned relatively light pressure during the rise of the shoe assembly prevents the shoe assembly from shifting with respect to the applicator 120 and insole rests 64, 70 during its upward movement into the yoke 698.

The parts are so constructed that the raising of the side retarder blades 344 during the rise of the post 20 causes the side retarders to press the dog ears 878 against the bottoms of the wipers 620 with the relatively light resilient force afforded by the motors 336, and the raising of the front retarder blade 320 during the rise of the post 20 causes the front retarder to press the portion of the upper stretched by the front pincers 286 against the bottoms of the wipers 620 immediately to the rear of the vertex 624 of the wipers under the force exerted by the pressurized air in the cylinder 304. During the final increment of the rising movement of the toe post 20, after the retarders 320 and 344 have pressed the upper margin against the wiper bottoms, the upper is further stretched about the last, and when the upper can no longer be stretched the pressed margin portions slip between the wiper bottoms and the retarders.

At or near the end of the rise of the toe post 20 and at or near the time that the front retarder 320 has forced the upper margin against the wiper bottoms, the cam 40 closes the valve 34 and the cam 42 opens the valve 36. The closing of the valve 34 shuts off the flow of pressurized air passing through this valve and the line 848 to the motors 290 enabling this air to exhaust from these motors and the line 848 to atmosphere through the valve 34. The opening of the valve 36 enables pressurized air to pass from the line 842, through a line 934, the valve 36, a line 936, the shuttle valve 854 and the line 856 to the motors 290. As a result, in response to the closing of the valve 34 and the opening of the valve 36, the motors 290 are actuated to open the front pincers 286 to release the toe end portion of the upper margin and the pincers 286 can now be moved downwardly and rearwardly to its lowermost position by the motor 272. This arrangement permits the front pincers to be lowered before it can interfere with the wipers and enables the front retarder 320 to engage the upper margin wtihout losing any of the stretch in the upper that had been provided by the front pincers 286.

At or near the end of the rise of the toe post 20, the cam 32 opens the normally closed valve 30 which enables pressurized air to pass from the line 842 through a line 938, the valve 30 and a pilot line 940 to the top of a valve 942 as seen in FIGURE 53 to open the valve 942. The valve 942 had initially been maintained in a closed position by pressurized air passing from the line 906, through a line 944, to this valve. As described above, the shifting of the valve 816 had enabled the pressurized air in the line 906 to be exhausted to atmosphere which enables the valve 942 to shift in response to pressurized air entering it through the line 940.

The shifting of the valve 942 enables pressurized air to pass from the line 842 through a line 946, the valve 942 and a line 948 to the motor 454 to actuate this motor to move the bars 462 rearwardly and thereby bring the clamping pad 490 of the heel clamp 486 to bear against the heel of the shoe assembly. Prior to the shifting of the valve 942, pressurized air had flowed from the line 946 through the valve 942 and a line 950 to the motor 454 to maintain this motor in its idle condition.

The shifting of the valve 942 also causes pressurized air to pass through this valve, the line 948, a regulator 951, a line 952 and lines 954 to the motors 724 to move the cylinders 728 inwardly of the pistons 722 against the pressures of the springs 736 and 748 to thereby force the inner wall 932 of the yoke 698 against the toe and forepart of the shoe assembly under higher pressure than had heretofore been exerted by the springs 748 and to force the bumpers 738 inwardly against the foreparts of the upper in regions that are rearward of the yoke 698. The bumpers, in engaging the upper, can swing about the pins 740 to accommodate themselves to the curvature of the last.

The shifting of the valve 942 also causes pressurized air to pass through this valve, a line 956, a high pressure regulator 958, a shuttle valve 960, a line 962, to normally open valve 688, and a line 964 to the motors 336 to cause these motors to force the side retarders 334 upwardly under relatively high pressure and thereby press the dog ears 878 of the upper 840 against the bottoms of the wipers 620 under relatively high pressure. Up to this time, the side retarders had been forced upwardly under relatively low pressure by pressurized air passing from the line 842 through a line 966, a low pressure regulator 968, the shuttle valve 960, the line 962, the valve 688 and the line 964 to the motors 366.

After the aforementioned operations have taken place in response to the shifting of the valve 942, pressurized air passes from the line 948 through a line 970 and a sequencing device 972 to the top of valve 844 as seen in FIGURE 53 to shift this valve. The valve 844 had been maintained in its original position by pressurized air passing from the line 906 into the bottom of the valve by way of a line 974. This air in the valve 844 had been bled to atmosphere through the lines 974, 906 and 890 and the valve 816 when the valve 816 was shifted, but this bleeding did not effect any shifting of the valve 844.

The shifting of the valve 844 causes pressurized air to pass from the line 843 through the valve 844 and a line 976 to the motor 516 to actuate this motor to retract the piston rod 518 into the cylinder 514 and thus apply the brakes 494 against the bars 462 to lock the heel clamp 486 in position. Prior to the shifting of the valve 844, pressurized air had passed from the valve 844 through a line 978 to the motor 516 to maintain this motor in its idle condition with the brakes 494 open.

The shifting of the valve 844 also cuts off the flow of pressurized air to the motors 426 from the valve 844 through the line 846, the valve 786, the line 858, the valve 788 and the line 860 so that the air in these motors can now bleed through these lines and valves back to the valve 844 and there be exhausted to atmosphere. This enables the springs 980 (FIGURES 28A and 53) of the motors 426 to lower the piston rods 450 so that the jaws of the side pincers 432 may open under the influence of the elastic bands 442 and thus release the forepart portions of the upper margin that had been gripped by the pincers 432. After the pincers 432 release the upper margin they are lowered by further downward movement of the piston rods 424 of the motors 406.

Prior to the shifting of the valve 844 pressurized air had entered the motor 88 to maintain the applicator 120 in its upper position by pressurized air passing through the valve 844, the line 978 and a line 982 to the motor 88. The shifting of the valve 844 causes the air in the motor 88 to be exhausted through the lines 982 and 978 and the valve 844. This does not result in the lowering of the applicator 120 at this time due to the toggle links 94, 96 tending to remain in the position shown in FIGURE 6.

After the completion of the above mentioned operations in response to the shifting of the valve 844, the shifting of the valve 844 enables pressurized air to pass from this valve through the line 976, a pilot line 984 and a sequencing device 986 to shift the valve 908 to provide the results set forth below. At this time the parts assume the position shown in FIGURES 58, 58A and 58B.

To recapitulate the events taking place at or near the end of the rise of the shoe assembly, the closing of the valve 34 and the opening of the valve 36 causes the front pincers 286 to release the toe end of the upper margin and be moved downwardly away from the shoe assembly whereupon the toe end portion of the upper margin is pressed against the bottoms of the wipers 620 at or near the wiper vertex 624 by the front retarder 320. The opening of the valve 30, at about the same time as the valves 34 and 36 are actuated, causes the heel clamp 486 to be forced against the heel of the shoe assembly, the inner wall 932 of the yoke 698 to be forced against the toe and forepart of the shoe assembly under higher pressure, the bumpers 738 to be forced against the forepart of the upper rearwardly of the yoke 698 and the side retarders 344 to force the dog ears 878 of the upper against the wiper bottoms under higher pressure than had heretofore been employed. The opening of the valve 30 then causes the heel clamp to be locked in position and the side pincers 432 to release the forepart portions of the upper margin and be moved downwardly away from the shoe assembly.

Prior to the raising of the shoe assembly, the upper was stretched about the last to the desired extent. The upper is maintained in this stretched condition at the completion of the rise of the shoe assembly preparatory to the below described wiping operation by the pressing of the margin of the upper against the bottoms of the wipers by the retarders 320 and 344 and by the pressing of the bumpers 738 against the foreparts of the upper. During the rise of the shoe assembly the pressure of the retarders against the wiper bottoms must be sufficiently light as to enable the upper margin to slip to some extent between the retarders and the wiper bottoms so that the upper will not be stretched any further. At the completion of the rise of the shoe assembly the side retarders 344 are pressed against the wiper bottoms with a greater force to hold the upper margin more firmly against the wiper bottoms for the wiping operation as described below. The portions of the upper margin stretched about the last by the side pincers 432 are, at the completion of the rise of the shoe assembly, held in place by the bumpers 738. With this arrangement the pincers 286 and 432 are released from the upper margin when the wipers 620 are actuated as described below and the pincers will not interfere with the wipers, but nevertheless, the upper is maintained in the stretched condition about the last that had been caused by the pincers 286 and 432.

The aforementioned shifting of the valve 908 by pressurized air flowing through the pilot line 984 and sequencing device 986 enables pressurized air to flow from the line 842 through a line 909 through the valve 908 and the line 910 to the motor 186 at full line pressure to overcome the low pressure air entering this motor through the line 912 and thereby actuate this motor to return the plunger 206 to its idle position. The low pressure air in the motor 186 is now exhausted to atmosphere through the line 912 and the self-relieving regulator 911.

The shifting of the valve 908 enables pressurized air to pass from this valve through the line 910 and a line 988 to the motor 588 to actuate this motor to move the wipers 620 in their wiping stroke. Prior to the shifting of the valve 908, pressurized air had entered the motor 588 through the valve 908 and a line 990 to maintain the wipers in their retracted position.

The aforesaid actuation of the motor 588, through the housing 594, block 598 and links 618 causes the wiper cams 608 and the wipers 620 carried thereby to move with respect to the block 610 with the pins 612 riding in the cam tracks 614 and 616 in a path determined by the configuration of the cam tracks. The configuration of the cam tracks is such that when the pins 612 are at the forward or left end (FIGURE 41) of the cam tracks and have relative movement toward the rear or right end the wipers are first swung toward each other about the vertex 624 in an intial closing movement through an arc of about 4 degrees for each wiper or a total of 8 degrees. This is followed by a compound movement comprising a concomitant forward translatory movement of the wipers and inward swinging movement of the wipers about the vertex. This is followed, at the conclusion of the wiper stroke, by a forward translation of the wipers without swinging movement. In setting up the machine for the particular size and shape of shoe assembly to be operated on, the knob 606 is rotated to shift the block 598 along the gibs 596 and thus swing the wipers 620 about the vertex 624 within the initial closing movement range permitted by the above described cam track configuraton so that the divergent wiper surfaces 622 will be spaced close to the sides of the shoe assembly when the wipers are positioned to start their wiping stroke, thereby enabling the wipers to move only a short distance in their wiping stroke before engaging the upper, as indicated in FIGURE 59. The stop nut 628 is so located as to limit the extent that the block 598 may be moved forwardly of the housing 594 to an amount that corresponds to the maximum closure of the initial closing movement range. The concomitant forward translation and inward swinging of the wipers causes them to engage the upper margin while the upper is stretched tightly about the last, to wipe or fold the upper margin against the insole 838 and to bond the upper margin to the insole by means of the ribbon of cement 930 on the insole. During the compound movement, there is a greater inward swinging movement of the wipers than a forward translation so as to enable the wiper surfaces 622 to move inwardly of the last edge a greater distance along the sides of the last than the distance traversed by the vertex 624 along the extreme tip end of the last. After the surfaces 622 have crossed over the last sides of sufficient amount to fold the upper margin against the insole, the final exclusively translatory movement causes the vertex 624 to move across the tip of the last to wipe the tip of the upper margin against the insole. It has been found that this sequence of movements, especially in sharp or pointed toe shoes, ensures that the extreme toe end of the upper where the greatest stresses are created is firmly wiped against the insole.

At the beginning of the wiper stroke, the knife edge 640 is located rearwardly of the vertex 624. The inward swinging movement of the wipe cams 608 about the vertex 624 causes the links 655 to drag the knife 636 forwardly with respect to the wipers along the block 610 and projects its edge 640 forwardly of the vertex at about the time or shortly after the vertex crosses under the insole due to the pivots 659 moving forwardly a lesser distance than the pivots 657. The knife edge 640 therefore cuts into the pleated material gathered by the wipers at the toe end of the shoe by the inward movement of the wipers to relieve the stress therein.

As the wipers perform their wiping stroke, the connection between the limb 660 and the shaft 672 (FIGURES 29 and 41) causes the shaft 672 to rotate and cause the cams 676, 678, 680, 682 and 684 to respectively actuate the valves 686, 688, 690, 692 and 694.

First the normally closed valve 694 is opened to enable pressurized air to pass from the line 842 through a line 992, the valve 694 and a line 994 to the motor 88 to actuate this motor to lower the applicator 120 out of the path of the wipers.

After the actuation of the valve 694, the normally open valves 688 and 690 are closed. The closing of the valve 688 shuts off the flow of pressurized air to the motors 336 so as to terminate the application of pressure by the side retarders 344 of the upper margin against the wiper bottoms. The closing of the valve 690 cuts off the flow of pressurized air that had heretofore flowed to the cylinder 304 from the line 842 through a line 996, the valve 690 and the heretofore mentioned line 836 so that the spring 314 can lower the front retarder 320 away from the wiper bottoms with the pressurized air in the cylinder 304 venting to atmosphere through the line 836 and the valve 690.

After the closing of the valves 688 and 690, the normally open valve 686 is closed to shut off the flow of pressurized air passing from the valve 686 through the pilot line 896 to the valve 898. This enables a conventional return spring in the valve 898 to shift this valve so as to cause pressurized air to pass from the line 900 through the valve 898 and the line 904 to the motor 16 to actuate this motor to lower the insole rests 64, 70 out of the path of the wipers.

After the closing of the valve 686, the normally closed valve 692 is opened. This enables air under full line pressure to pass from the line 928 through the valve 692, a line 1000, the shuttle valve 920 and the line 922 to the motor 582 to actuate this motor to force the hold-down 578 downwardly against the forepart of the shoe assembly under greater pressure than had heretofore been provided by the pressurized air entering the shuttle valve 920 through the line 914. The opening of the valve 692 also caues the pressurized air passing therethrough into the line 1000 to pass from the line 1000 through a line 1002 to close a pressure operated electric switch 1004.

Referring to FIGURE 53A, the machine includes an electric control circuit that is controlled from a source of power labelled L1, L2 and that includes a timer 1005. The timer is a commercial item that includes a motor 1006 that is so connected to a normally open switch 1008 that the switch 1008 is caused to close a predetermined time after the motor 1006 is energized. The closing of the switch 1008 causes electric current to pass through terminal a of a single pole double throw switch 1010 to energize the solenoid 884 of the valve 882. The opening of the switch 1004 deenergizes the motor 1006 and causes the opening of the switch 1008. The closing of the pressure actuated switch 1004 therefore, after a predetermined time interval, causes the closing of the switch 1008 to energize the solenoid 884 and thereby close the valve 882. The closing of the valve 882 shuts off the pressurized air to the motor 824 so that the spring in this motor may retract the piston rod 826 and plunger 828, thereby allowing the bar 773 to lower. The lowering of the bar 773 causes the valves 786, 788, 816 and 830 to return to their original positions so that all of the machine parts return to their idle conditions and the machine cycle is completed. The return of the valve 816 to its original condition causes pressurized air to pass through the valve 816, the line 890 and the pilot line 906 to shift the valve 908 to its idle condition whereby pressurized air passes through the valve 908 and the line 990 to the motor 588 to cause this motor to retract the wipers and the air that had previouly entered the motor 588 through the line 988 is exhausted to atmosphere through the line 988, the line 910 and the valve 908. In addition, the shifting of the valve 908 enables the air in the motor 186 to be vented to atmosphere through the line 910 and the valve 908 so that in the idle condition of the machine there is no pressurized air entering the motor 186 and the handle 194 may be manipulated to manually reciprocate the plunger 206 without having to overcome the force of pressurized air in the motor 186.

Thus, during the wiper stroke the applicator 120 is first lowered out of the path of the oncoming wipers. After this, the pressures applied by the front retarder 320 and the side retarders 344 forcing the upper margin against the wiper bottoms is relieved, the timing being such that this takes place after the wipers have crossed under the insole and have started to wipe the upper margin against the insole so that the stretching of the upper about the last that had been maintained by the retarders is taken over by the wipers with the result that the stretching of the upper about the last is maintained during the wiping stroke. This is aided by the fact that the yoke 698 and the bumpers 738 are being forced against the shoe assembly under relatively high pressure. This is followed by the lowering of the insole rests 64, 70 out of the path of the oncoming wipers so that the shoe assembly is supported on its bottom solely by the wipers thus enabling the hold-down 578 to press the shoe assembly downwardly directly against the wipers and provide an overwiping pressure. Toward the end of the wiper stroke the hold-down is forced downwardly under relatively heavy pressure for a predetermined length of time to iron the now wiped upper margin against the insole and to enable the cement 930 that is between the wiper upper margin and insole to bond the upper margin to the insole. At the end of this predetermined length of time, the machine parts are returned to their idle positions and the shoe is released.

If it is desired to eliminate the automatic maintenance, during the machine cycle, of the bar 773 in its upper position by the motor 824 forcing the plunger 828 against the base 768 and the automatic raising of the plunger at the end of the machine cycle through the timer 1005, the switch 1010 is moved to its terminal b. This causes the timer to be bypassed and the solenoid 884 to be continuously energized so that the bar 773 is raised throughout the machine cycle by the operator stepping on the platform 774 and is lowered to terminate the machine cycle by the operator stepping off the platform 774.

To summarize the operation of a machine cycle with the switch 1004 in its terminal a position, the shoe assembly is placed bottom down on the applicator 120 with the last bearing against the retarders 320 and 344, the toe end of the upper margin between the open jaws of the front pincers 286 and the forepart portions of the upper margin between the open jaws of the side pincers 432. The operator now actuates the control to cause the machine to go through the pulling over portion of its cycle. This first causes the front pincers 286 to close on the toe end portion of the upper margin and then causes the side pincers 432 to close on the forepart portions of the upper margin. After this the front pincers 286 is moved downwardly and rearwardly away from the last and the side pincers 432 are moved downwardly with respect to the last to stretch the toe portion of the upper about the last with the upper margin dragging about the retarders 320 and 344 and to force the applicator 120 downwardly until the insole bears against the insole rests 64 and 70. The stretching action of the pincers 286 and 344 causes the portions of the upper margin between the pincers to be outspread into dog ears 878. After this the slide plate 546, together with the wipers 620, yoke 698, bumpers 738 and hold-down 578, are moved forwardly from their out-of-the-way position to a working position. In response to the completion of the forward movement of the slide plate 578, the toe post 20 is raised to raise the shoe assembly to a level that brings the bottom of the insole slightly higher than the level of the bottoms of the wipers and a predetermined quantity of cement is applied through the applicator 120 against the insole during the early portion of the rise of the shoe assembly. During the rise of the shoe assembly, the hold-down 578 is forced against the forepart of the shoe assembly under relatively light pressure while the shoe assembly is forced through the yoke 698, the toe end portion of the upper margin is pressed against the wiper bottoms by the front retarder 320 and the dog ears 878 of the upper margin are pressed against the wiper bottoms by the side retarders 344. Near the end of the rise of the shoe assembly the front pincers 286 release the upper margin and move downwardly away from the wipers so that the toe end portion of the upper margin is maintained in its stretched condition solely by its being pressed against the wiper bottoms by the front retarder 320, the heel clamp 486 is forced against the heel of the shoe assembly and is then locked in place, the yoke 698 is forced against the shoe assembly under greater pressure than had heretofore been applied, the bumpers 738 are forced against the forepart of the upper rearwardly of the yoke 698, the side retarders 334 are forced against the dog ears 878 under greater pressure than had heretofore been applied and the side pincers 432 are released from and move downwardly away from the shoe assembly. Now the wipers are caused to move through their wiping stroke and wipe the margin of the upper against the insole and bond it thereto by means of the cement that had been deposited on the insole. During the wiper stroke the applicator 120 is lowered out of the path of the oncoming wipers, the pressure applied by the retarders 320 and 344 forcing the upper margin against the wiper bottoms is relieved and the insole rests 64, 70 are lowered out of the path of the oncoming wipers, so that the shoe assembly is supported on its bottom solely by the wipers with the hold-down 578 pressing the shoe assembly downwardly directly against the wipers to provide an overwiping pressure. Toward the end of the wiper stroke the hold-down is forced downwardly under heavier pressure than had heretofore been applied for a predetermined length of time to iron the now wiped upper margin against the insole and to enable the cement to bond the wiped upper margin to the insole. At the end of the predetermined time, the machine parts are returned to their original positions to complete the machine cycle.

The upper surface of the extruding-support section 124 is inclined inwardly as indicated in FIGURE 6 to enable it to conform to the insole bottom, and due to the machine being inclined as aforesaid, the applicator is inclined downwardly from right to left as seen in FIGURE 6. Therefore, any surplusage of molten cement that is applied to the insole during each machine cycle will gravitationally flow inwardly of the upper surface of the section 124, down its interior side walls and onto the upper surface of the base section 122 and from the base section into the gutters 154 and 156 and then onto the deflector plate 152.

Since the sections 124 and 120 are heated by the heating element 148 and the deflector arrangement 151 is not, the molten cement will not solidify until it strikes the relatively cool deflector arrangement and will accumulate thereon. The upper surface of the deflector arrangement is preferably coated with a material from which the solid accumulation of cement may be readily peeled such as Teflon.

Figure 58:
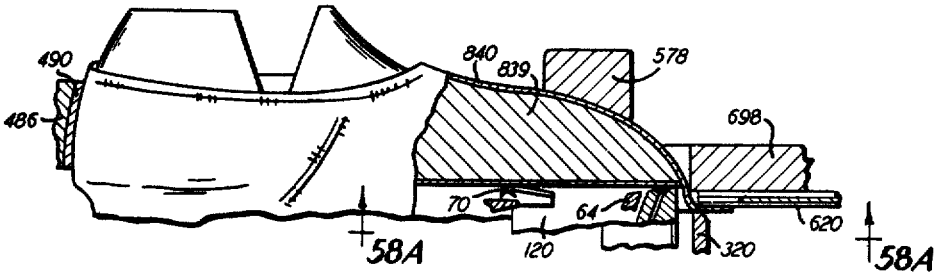
FIGURE 58 is a representation of the shoe assembly as it appears in the machine after the shoe assembly has risen to a level wherein the insole bottom is slightly higher than the level of the tops of the wipers.
Figure 58A:
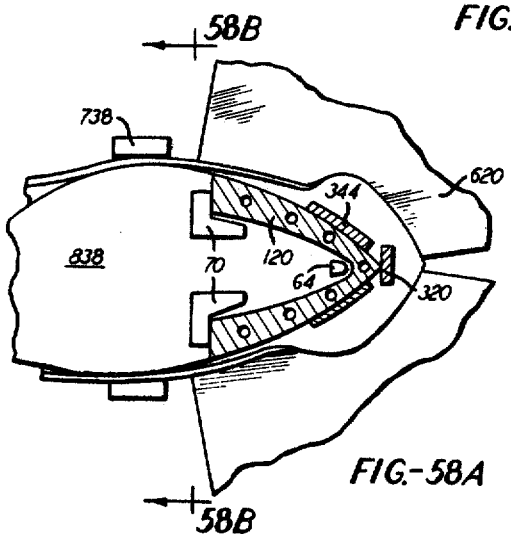
FIGURE 58A is a view taken on the line 58A—58A of FIGURE 58.
Figure 58B:
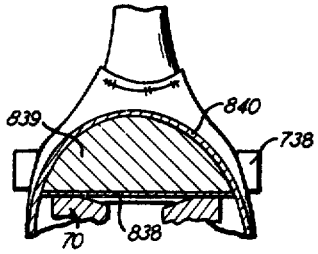
FIGURE 58B is a view taken on the line 58B—58B of FIGURE 58A.

By manipulating the bolts 558 and the rod 560 (FIGURES 35 and 41), the position of the block 521 in the machine may be adjusted and thus the position of the wiper vertex 624 at the beginning of the wiping stroke may be adjusted so as to ensure that the vertex is located in proper position above the front retarder 320. If the vertex is located too far forward, the wipers 620 would overlap the last and upper and interfere with the last and upper during the rise of the shoe assembly from the FIGURE 55 position to the FIGURE 58 position. If the vertex is located too far to the rear, then the front retarder 320 will not be effective to press the margin of the upper against the wiper bottoms, as shown in FIGURE 58. The rod 560 bearing against the transverse wall 566 absorbs the thrust of the parts shown in FIGURE 35 during the operation of the motor 520 to move the plate 546 forwardly from its out-of-the-way position to its working position.

It should be understood that the present disclosure is for the purpose of illustration only and that this invention includes all modifications and equivalents that fall within the scope of the appended claims.

Terms in the claims indicating positions and paths of movement such as "downwardly," "raising" and "forwardly" have been employed primarily to define the relative positions and paths of movements of the parts and should be construed accordingly so that organizations which have equivalent relative positions and functional relationships between the parts as are defined in the claims are considered to fall within the scope of the claims regardless of whether the parts literally have the defined positions and paths of movements.

Terms in the claims indicating relative movement of one part with respect to another part have been employed to define this relative movement regardless of which of the two parts literally moves [and should be construed accordingly so that organizations which have a movement of either one of the defined parts with respect to the other defined part for performing the same result are considered to fall within the scope of the claims].

We claim:

1. A support arrangement for supporting bottom-down a last having an upper mounted thereon and an insole located on its bottom comprising: a bracket; a support that includes a base section and a support section that extends upwardly of the base section; means for detachably securing the base section to the bracket; an insole rest located inwardly of the support section and normally positioned in a prone position to overlie the base section; [and] *a bar;* means mounting the insole rest for movement from said prone position to an upright position so as to provide clearance to enable the support to be removed from the bracket*; and spring means cooperative with the insole rest so constructed as to yieldably retain the insole rest in its prone and upright positions.*

[2. The arrangement as defined in claim 1 wherein the insole rest mounting means comprises: a bar; means mounting the insole rest for swinging movement on the bar; and spring means cooperative with the insole rest so constructed as to yieldably retain the insole rest in its prone and upright positions.]

[3. The arrangement as defined in claim 1 wherein the means for detachably securing the base section to the bracket comprises: a ferrule extending upwardly of the bracket through the base section; and a fastening member mounted on the ferrule and bearing against the base section.]

4. A support arrangement for supporting bottom-down a last having an upper mounted thereon and an insole located on its bottom comprising: a bar; a first leg and a second leg pivotally mounted on the bar for heightwise movement; a first and a second insole rest that are respectively on the first and second leg; spring means mounted on the bar and cooperative with the legs for yieldably urging each leg downwardly; a ledge on the bar cooperative with the first leg for limiting the extent that the first leg may move downwardly under the influence of the spring means; a stop member extending upwardly of the bar cooperative with the second leg for limiting the extent that the second leg may move downwardly under the influence of the spring means; and means mounting the stop member for heightwise adjustment in the bar whereby to adjust the heightwise position of the second insole rest with respect to the first insole rest.

5. A pulling over mechanism for stretching a selected portion of an upper about the corresponding portion of a last preparatory of wiping the margin of said upper portion against the corresponding portion of an insole located on the last bottom comprising: a support for supporting the last bottom-down with the upper mounted thereon and the insole located on its bottom; a retarder, engageable with said last portion, located outwardly of the support and extending upwardly of the support; a housing; a bracket pivotally mounted on the housing for swinging inward and outward movement about an axis located intermediate the upper and lower ends of the bracket; a gripping means mounted in the bracket for heightwise movement from an upper position adjacent the retarder and above said axis to a lower position; means for causing the gripping means, when in its upper position, to grip said margin; means for thereafter causing the gripping means to move downwardly with the gripped margin dragging about the retarder to thereby stretch said upper portion about said last portion, the dragging of the margin about the retarder precluding the upper from dragging said insole portion downwardly of the last bottom; means for yieldably urging the portion of the bracket above said axis inwardly; and relatively adjustable cooperative stop elements on the housing and bracket for adjusting the extent that said bracket portion may swing inwardly so as to enable the horizontal spacing between the gripping means in its upper position and the retarder to be adjusted to thereby accommodate the gripping means to the particular thickness and resistance to sliding of the upper material utilized.

6. A pulling over mechanism for stretching a selected portion of an upper about the corresponding portion of a last preparatory to wiping the margin of said upper portion against the corresponding portion of an insole located on the last bottom comprising: a support for supporting the last bottom-down with the upper mounted thereon and the insole located on its bottom; a housing; a retarder, engageable with said last portion, mounted in the housing and located outwardly of the support; resilient means in the housing for yieldably urging the retarder upwardly to extend upwardly of the support; a bracket mounted on the housing for swinging inward and outward movement about an axis located intermediate the upper and lower ends of the bracket; a gripping means mounted in the bracket for heightwise movement from an upper position adjacent the retarder and above said axis to a lower position; means for causing the gripping means, when in its upper position, to grip said margin; means for thereafter causing the gripping means to move downwardly with the gripped margin dragging about the retarder to thereby stretch said upper portion about said last portion, the dragging of the margin about the retarder precluding the upper from dragging said insole portion downwardly of the last bottom; a spring interposed between the housing and bracket below said axis for yieldably urging the portion of the bracket above said axis inwardly; a first stop element mounted on the housing above said axis; a second stop element mounted on the bracket in registration with the first stop element and adapted to engage the first stop element under the influence of the spring; and means for adjusting one of said stop elements with respect to the other stop element so as to enable the horizontal spacing between the gripping means in its upper position and the retarder to be adjusted to thereby accommodate the gripping means to the particular thickness and resistance to sliding of the upper material utilized.

7. A lasting machine for wiping a selected portion of the margin of a shoe upper against the corresponding portion of a shoe insole comprising; a post mounted for heightwise movement; a shoe support on the post for supporting bottom-down a shoe assembly that includes a last having the upper mounted thereon and the insole located on its bottom; wiping means mounted for forward movement in a wiping stroke; a tang extending laterally of the post; a column; a collar mounted on the column for heightwise position of the collar on the column; a lug on the collar extending outwardly thereof in registry with the tang; means for initially locating the post in a lowered position such that the bottom of the insole is below the top of the wiping means and the lug is above the tang; a yieldable drive means connected to the post; means for actuating the drive means to raise the post until the tang engages the lug whereby the shoe assembly is raised an amount sufficient to bring the bottom of the insole of least to the top of the wiping means regardless of the thickness of the insole or the height of the last; means for constraining said selected portion of the upper to the shape of the last during the rise of the shoe assembly; and means for imparting a wiping stroke to the wiping means to wipe said margin portion against said insole portion.

8. The machine as defined in claim 7 wherein the means mounting the collar on the column and for adjusting the heightwise position of the collar on the column comprises; a knob located above the collar; means mounting the knob on the column for heightwise adjustment; and spring means on the column for yieldably urging the collar upwardly against the knob.

9. A positioning arrangement comprising: a post mounted for heightwise movement; a tang extending laterally of the post; a column; a collar mounted on the column for heightwise movement; means for adjusting the heightwise position of the collar on the column; a lug on the collar extending outwardly thereof in registry with the tang; means for initially locating the post in a lowered position such that the lug is above the tang; a yieldable drive means connected to the post; and means for actuating the drive means to raise the post until the tang engages the lug.

10. The arrangement as defined in claim 9 wherein the means mounting the collar on the column and for adjusting the heightwise position of the collar on the column comprises; a knob located above the collar; means mounting the knob on the column for heightwise adjustment; and spring means on the column for yieldably urging the collar upwardly against the knob.

11. A machine for wiping a selected portion of the margin of a shoe upper against the corresponding portion of a shoe insole comprising: wiping means mounted for movement in a wiping stroke from a retracted to an advanced position; a shoe support for supporting bottom-down a shoe assembly that includes a last having the upper mounted thereon and the insole located on its bottom with said upper and insole portions facing the wiping means; means mounting the support for heightwise movement from a lower position wherein the bottom of said insole portion is below the level of the top of the wiping means to an upper position wherein the bottom of said insole portion is at least as high as the top of the wiping means; a shoe conforming means located above the wiping means for engaging the shoe assembly and snugly conforming said upper portion to the shape of the last during the rise of the shoe assembly; a hold-down, located above the support, mounted for heightwise movement toward and away from the shoe assembly; a yieldable drive means connected to the hold-down for moving it downwardly under a yieldable force; means for raising the support from its lower to its upper position; means for actuating the drive means to cause the hold-down to bear against the top of the shoe assembly under said yieldable force during the rise of the shoe assembly to prevent the shoe assembly from shifting with respect to the support under the influence of the action of the conforming means on the shoe assembly; and means for moving the wiping means through its wiping stroke when the shoe assembly has completed its rise to wipe said margin portion against said insole portion.

12. A machine for wiping a selected portion of the margin of a shoe upper against the corresponding portion of a shoe insole comprising: a frame; a slide movably mounted in the frame for forward and rearward movement; wiping means connected to the slide for movement in unison therewith and mounted for movement with respect to the slide in a wiping stroke from a retracted to an advanced position; a shoe support for supporting bottom-down a shoe assembly that includes a last having the upper mounted thereon and the insole located on its bottom with said upper and insole portions facing the wiping means; means mounting the support for heightwise movement from a lower position wherein the bottom of said insole portion is below the level of the top of the wiping means to an upper position wherein the bottom of said insole portion is at least as high as the top of the wiping means; a shoe conforming means mounted on the slide above the wiping means for engaging the shoe assembly and snugly conforming said upper portion to the shape of the last during the rise of the shoe assembly; a hold-down, located above the support, mounted on the slide for heightwise movement toward and away from the shoe assembly; a yieldably drive means connected to the hold-down and actuable to move it downwardly under a yieldable force; means for initially maintaining the slide tokether with the wiping means, shoe conforming means and hold-down in a rearward out-of-the-way position; means for initially maintaining the wiping means in its retracted position with respect to the slide; means for initially maintaining the hold-down in an upper position; means for initially maintaining the support in its lower position; means for stretching said upper portion about the last while the support is in its lower position; means for thereafter moving the slide forwardly from its out-of-the-way position to a working position; means for thereafter raising the support from its lower to its upper position; means for actuating the drive means to cause the hold-down to move downwardly and bear against the top of the shoe assembly under said yieldable force during the rise of the shoe assembly to prevent the shoe assembly from shifting with respect to the support under the influence of the action of the conforming means on the shoe assembly; and means for moving the wiping means through its wiping stroke when the shoe assembly has completed its rise to wipe said margin portion against said insole portion.

13. A machine for wiping a selected portion of the margin of a shoe upper against the corresponding portion of a shoe insole comprising: a frame; a slide movably mounted in the frame for forward and rearward movement; wiping means connected to the slide for movement in unison therewith and mounted for movement with respect to the slide in a wiping stroke from a retracted to an advanced position; a shoe support for supporting bottom-down a shoe assembly that includes a last having the upper mounted thereon and the insole located on its bottom with said upper and insole portions facing the wiping means; means mounting the support for heightwise movement from a lower position wherein the bottom of said insole portion is below the level of the top of the wiping means to an upper position wherein the bottom of said insole portion is at least as high as the top of the wiping means; a shoe conforming means mounted on the slide above the wiping means for engaging the shoe assembly and snugly conforming said upper portion to the shape of the last during the rise of the shoe assembly; a hold-down located above the support; a lever pivotally mounted on the slide; means connecting the hold-down to the lever whereby the hold-down is mounted on the slide for heightwise movement toward and away from the shoe assembly; a motor pivoted on the frame having a drive member that is movable under a yieldable force in response to actuation of the motor; means pivotally connecting the drive member to the lever; means for initially maintaining the slide together with the wiping means, shoe conforming means and hold-down in a rearward out-of-the-way position; means for initially maintaining the wiping means in its retracted position with respect to the slide; means for initially maintaining the motor in such condition as to maintain the hold-down in an upper position; means for initially maintaining the support in its lower position; means for stretching said upper portion about the last while the support is in its lower position; means for thereafter moving the slide forwardly from its out-of-the-way position to a working position; means for thereafter raising the support from its lower position to its upper position; means for actuating the motor to cause the hold-down to move downwardly and bear against the top of the shoe assembly under said yieldable force during the rise of the shoe assembly to prevent the shoe assembly from shifting with respect to the support under the influence of the action of the conforming means on the shoe assembly; and means for moving the wiping means through its wiping stroke when the shoe assembly has completed its rise to wipe said margin portion against said insole portion.

14. A pulling over and lasting machine for stretching the toe and forepart portion of an upper about the corresponding portion of a last and wiping the margin of said upper portion against the corresponding portion of an insole comprising: a shoe support for supporting bottom-down a shoe assembly that includes a last having said upper portion draped about said last portion and tthe insole portion located on its bottom; a pair of wipers having edges that diverge forwardly from a vertex; means mounting the wipers for horizontal movement in a wiping stroke from a retracted position wherein said wiper edges are relatively open in a contour corresponding to the contour of the periphery of said last portion to an advanced position wherein said wiper edges move forwardly and move inwardly about said vertex; means for initially maintaining the wipers in their retracted position; means mounting the shoe support for vertical movement from a lower position wherein the insole bottom is below the level of the wiper bottoms to an upper postiion wherein the insole bottom is at least as high as the level of the wiper tops; means for initially maintaining the support in its lower position with the toe and forepart position of the shoe assembly facing the wipers and the periphery of said last portion lying in a vertical plane that is adjacent to and forwardly and inwardly of said wiper edges; a front retarder, mounted for vertical movement in unison with the support, located rearwardly of the support in vertical registry with the wipers in an area proximate to said vertex; means for yieldably urging the front retarder upwardly with respect to the support to a position that is below the wiper bottoms in contiguous relation to the toe end extremity of the last; a side [retarded] *retarder*, mounted for vertical movement in unison with the support, located forwardly of the front retarder on each side thereof in vertical registry with a wiper in an area that is proximate to the wiper's edge; means for yieldably urging each of the side retarders upwardly with respect to the support to a position that is below its associated wiper bottom in contiguous relation to the periphery of a side of tthe last; a front gripping means located proximate to the front retarder and mounted for movement in unison with the support and for heightwise movement with respect to the support in a path that is rearward of the front retarder; means for initially maintaining the front gripping means in an upper position with respect to the support; a side gripping means located on each side of the front gripping means and forwardly of the side retarders, each of said side gripping means being mounted for movement in unison with the support and for heightwise movement with respect to the support; means for initially maintaining each of the side gripping means in an upper position with respect to the support; a yoke located above the wipers having a bight and a leg on each side of the bight extending forwardly of the bight; means for yieldably urging the yoke bight forwardly and the yoke legs inwardly so that the inner periphery of the yoke is inward of the outer periphery of said last portion; a bumper located forwardly of and at substantially the same level as each yoke leg, each bumper being mounted for inward and outward movement; means for initially maintaining each bumper in a position that is outward of the inner periphery of its associated yoke leg; means for causing the front gripping means to grip the toe [and] *end* extremity of the upper margin; means for causing each of the side gripping means to grip a forepart of the upper margin; means for thereafter moving all of the gripping means downwardly with respect to the support to stretch said upper portion about the last and create dog ears between the gripped upper parts that are outspread from the last; means for thereafter raising the shoe support to raise the shoe assembly from its lower to its upper position with each of the gripping means rising in unison with the shoe support at least at the beginning of the rise of the shoe support, said yoke causing said upper portion to snugly conform to the shape of the last during the rise of the shoe support, said front retarder being operative during the rise of the shoe support to yieldably press the toe end extremity of the upper margin against the wiper bottoms and each of said side retarders being operative during the rise of the shoe support to yieldably press a dog ear against a wiper bottom; means operative during the rise of the shoe support to cause the front gripping means to release the toe end extremity of the upper margin and move downwardly with respect to the support when the front retarder is effective to press the toe end extremity of the upper margin against the wiper bottoms; means operative after the completion of the rise of the shoe support to force said bumpers inwardly against the shoe assembly; means for thereafter causing each of said side gripping means to release the forepart portions of the upper margin and move downwardly with respect to the support; and means for thereafter imparting a wiping stroke to the wipers to wipe said upper portion against said insole portion.

15. A pulling over and lasting machine for stretching the toe and forepart portion of an upper about the corresponding portion of a last and wiping the margin of said upper portion against the corresponding portion of an insole comprising: a shoe support for supporting bottom-down a shoe assembly that includes a last having said upper portion draped about said last portion and the insole portion located on its bottom; a pair of wipers having edges that diverge forwardly from a vertex; means mounting the wipers for horizontal movement in a wiping stroke from a retracted position wherein said wiper edges are relatively open in a contour corresponding to the contour of the periphery of said last portion to an advanced position wherein said wiper edges move forwardly and inwardly about said vertex; means for initially maintaining the wipers in their retracted position; means mounting the shoe support for vertical movement from a lower position wherein the insole bottom is below the level of the wiper bottoms to an upper position wherein the insole bottom is at least as high as the level of the wiper tops; means for initially maintaining the support in its lower position witth the toe and forepart portion of the shoe assembly facing the wipers and the periphery of said last portion lying in a vertical plane that is adjacent to and forwardly and inwardly of said wiper edges; a front retarder, mounted for vertical movement in unison with the support, located rearwardly of the support in vertical registry with the wipers in an area proximate to said vertex; means for yieldably urging the front retarder upwardly with respect to the support to a position that is below the wiper bottoms in contiguous relation to the toe [and] *end* extremity of the last; a side retarder, mounted for vertical movement in unison with the support, located forwardly of the front retarder on each side thereof in vertical registry with a wiper in an area that is proximate to the wiper's edge; means for yieldably urging each of the side retarders upwardly with respect to the support under a first pressure to a position that is below its associated wiper bottom in contiguous relation to the periphery of a side of the last; a front gripping means located proximate to the front retarder and mounted for movement in unison with the support and for heightwise movement with respect to the support in a path that is rearward of the front retarder; means for initially maintaining the front gripping means in an upper position with respect to the support; a side gripping means located on each side of the front pincers and forwardly of the side retarders, each of said side gripping means being mounted for movement in unison with the support and for heightwise movement with respect to the support; means for initially maintaining each of the side gripping means in an upper position with respect to the support; a yoke located above the wipers having a bight and a leg on each side of the bight extending forwardly of the bight; means for yieldably urging the yoke bight forwardly and the yoke legs inwardly so that the inner periphery of the yoke is inward of the outer periphery of said last portion; a bumper located forwardly of and at substantially the same level as each yoke leg, each bumper being mounted for inward and outward movement; means for initially maintaining each bumper in a position that is outward of the inner periphery of its associated yoke leg; means for causing the front gripping means to grip the toe end extremity of the upper margin; means for causing each of the side gripping means to grip a forepart of the upper margin; means for thereafter moving all of the gripping means downwardly with respect to the support to stretch said upper portion about the last and create dog ears between the gripped upper parts that are outspread from the last; means for thereafter raising the shoe support to raise the shoe assembly from its lower to its upper position with each of the gripping means rising in unison with the shoe support at least at the beginning of the rise of the shoe support, said yoke causing said upper portion to snugly conform to the shape of the last during the rise of the shoe support, said front retarder being operative during the rise of the shoe support to yieldably press the toe end extremity of the upper margin against the wiper bottoms and each of said side retarders being operative during the rise of the shoe support to yieldably press a dog ear against a wiper bottom under said first pressure; means operative during the rise of the shoe support to cause the front gripping means to release the toe end extremity of the upper margin and move downwardly with respect to the support when the front retarder is effective to press the toe end extremity of the upper margin against the wiper bottoms; means operative after the completion of the rise of the shoe support to force said bumpers inwardly against the shoe assembly and to force the side retarders upwardly to press the dog ears against the wiper bottoms under a second pressure that is higher than said first pressure; means for thereafter causing each of said side gripping means to release the forepart portions of the upper margin and move downwardly with respect to the support; and means for thereafter imparting a wiping stroke to the wipers to wipe said upper portion against said insole portion.

16. The machine as defined in claim 15 further comprising: means for releasing the upwardly directed pressures of the retarders after the wipers have commenced their wiping stroke.

17. A pulling over and lasting machine for stretching the toe and forepart portion of an upper about the corresponding portion of a last and wiping the margin of said upper portion against the corresponding portion of an insole comprising: a shoe support for supporting bottom-down a shoe assembly that includes a last having said upper portion draped about said last portion and the insole portion located on its bottom; a pair of wipers having edges that diverge forwardly from a vertex; means mounting the wipers for horizontal movement in a wiping stroke from a retracted position wherein said wiper edges are relatively open in a contour corresponding to the contour of the periphery of said last portion to an advanced position wherein said wiper edges move forwardly and inwardly about said vertex; means for initially maintaining the wipers in their retracted position; means mounting the shoe support for vertical movement from a lower position wherein the insole bottom is below the level of the wiper bottoms to an upper position wherein the insole bottom is at least as high as the level of the wiper tops; means for initially maintaining the support in its lower position with the toe and forepart portion of the shoe assembly facing the wipers and the periphery of said last portion lying in a vertical plane that is adjacent to and forwardly and inwardly of said wiper edges; a front retarder, mounted for vertical movement in unison with the support, located rearwardly of the support in vertical registry with the wipers in an area proximate to said vetex; means for yieldably urging the front retarder upwardly with respect to the support to a position that is below the wiper bottoms in contiguous relation to the toe end extremity of the last; a side retarder, mounted for vertical movement in unison with the support, located forwardly of the front retarder on each side thereof in vertical registry with a wiper in an area that is proximate to the wiper's edge; means for yieldably urging each of the side retarders upwardly with respect to the support to a position that is below its associated wiper bottom in contiguous relation to the periphery of a side of the last; a front gripping means located proximate to the front retarder and mounted for movement in unison with the support and for heightwise movement with respect to the support in a path that is rearward of the front retarder; means for initially maintaining the front gripping means in an upper position with respect to the support; a side gripping means located on each side of the front gripping means and forwardly of the side retarders, each of said side gripping means being mounted for movement in unison with the support and for heightwise movement with respect to the support; means for initially maintaining each of the side gripping means in an upper position with respect to the support; a yoke located above the wipers having a bight and a leg on each side of the bight extending forwardly of the bight; means for yieldably urging the yoke bight forwardly and means for urging the yoke legs inwardly under a first pressure so that inner periphery of the yoke is inward of the outer periphery of said last portion; a bumper located forwardly of and at substantially the same level as each yoke leg, each bumper being mounted for inward and outward movement; means for initially maintaining each bumper in a position that is outward of the inner periphery of its associated yoke leg; means for causing the front gripping means to grip the toe end extremity of the upper margin; means for causing each of the side gripping means to grip a forepart of the upper margin; means for thereafter moving all of the gripping means downwardly with respect to the support to stretch said upper portion about the last and create dog ears between the gripped upper parts that are outspread from the last; means for thereafter raising the shoe support to raise the shoe assembly from its lower to its upper position with each of the gripping means rising in unison with the shoe support at least at the beginning of the rise of the shoe support, said yoke causing said upper portion to snugly conform to the shape of the last during the rise of the shoe support, said front retarder being operative during the rise of the shoe support to yieldably press the toe end extremity of the upper margin against the wiper bottoms and each of said side retarders being operative during the rise of the shoe support to yieldably press a dog ear against a wiper bottom; means operative during the rise of the shoe support to cause the front gripping means to release the toe and extremity of the upper margin and move downwardly with respect to the support when the front retarder is effective to press the toe end extremity of the upper margin against the wiper bottoms; means operative after the completion of the rise of the shoe support to force said bumpers inwardly against the shoe assembly and to urge the yoke legs inwardly against the shoe assembly under a second pressure that is higher than said first pressure; means for thereafter causing each of said side gripping means to release the forepart portions of the upper margin and move downwardly with respect to the support; and means for thereafter imparting a wiping stroke to the wipers to wipe said upper portion against said insole portion.

18. A pulling over and lasting machine for stretching the toe and forepart portion of an upper about the corresponding portion of a last and wiping the margin of said upper portion against the corresponding portion of an insole comprising: a shoe support for supporting bottom-down a shoe assembly that includes a last having said upper portion draped about said last portion and the insole portion located on its bottom; a pair of wipers having edges that diverge forwardly from a vertex; means mounting the wipers for horizontal movement in a wiping stroke from a retracted position wherein said wiper edges are relatively open in a contour corresponding to the contour of the periphery of said last portion to an advanced position wherein said wiper edges move forwardly and inwardly about said vertex; means for initially maintaining the wipers in their retracted positions; means mounting the shoe support for vertical movement from a lower position wherein the insole bottom is below the level of the wiper bottoms to an upper position wherein the insole bottom is at least as high as the level of the wiper tops; means for initially maintaining the support in its lower position with the toe and forepart portion of the shoe assembly facing the wipers and the periphery of said last portion lying in a vertical plane that is adjacent to and forwardly and inwardly of said wiper edges; a front retarder, mounted for vertical movement in unison with the support, located rearwardly of the support in vertical registry with the wipers in an area proximate to said vertex; means for yieldably urging the front retarder upwardly with respect to the support to a position that is below the wiper bottoms in contiguous relation to the toe end extremity of the last; a side retarder, mounted for vertical movement in unison with the support, located forwardly of the front retarder on each side thereof in vertical registry with a wiper in an area that is proximate to the wiper's edge; means for yieldably urging each of the side retarders upwardly with respect to the support under a first retarder pressure to a position that is below its associated wiper bottom in contiguous relation to the periphery of a side of the last; a front gripping means located proximate to the front retarder and mounted for movement in unison with the support and for heightwise movement with respect to the support in a path that is rearward of the front retarder; means for initially maintaining the front gripping means in an upper position with respect to the support; a side gripping means located on each side of the front [pincers] *gripping means* and forwardly of the side retarders, each of said side gripping means being mounted for movement in unison with the support and for heightwise movement with respect to the support; means for initially maintaining each of the side gripping means in an upper position with respect to the support; a yoke located above the wipers having a bight and a leg on each side of the bight extending forwardly of the bight; means for yieldably urging the yoke bight forwardly and means for urging the yoke legs inwardly under a first yoke pressure so that the inner periphery of the yoke is inward of the outer periphery of said last portion; a bumper located forwardly of and at substantially the same level as each yoke leg, each bumper being mounted inward and outward movement; means for initially maintaining each bumper in a position that is outward of the inner periphery of its associated yoke leg; means for causing the front gripping means to grip the toe end extremity of the upper margin; means for causing each of the side gripping means to grip a forepart of the upper margin; means for thereafter moving all of the gripping means downwardly wi.h respect to the support to stretch said upper portion about the last and create dog ears between the gripping upper parts that are outspread from the last; means for thereafter raising the shoe support to raise the shoe assembly from its lower to its upper position with each of the gripping means rising in unison with the shoe support at least at the beginning of the rise of the shoe support, said yoke causing said upper portion to snugly conform to the shape of the last during the rise of the shoe support, said front retarder being operative during the rise of the shoe support to yieldably press the toe end extremity of the upper margin against the wiper bottoms and each of said side retarders being operative during the rise of the shoe support to yieldably press a dog ear against a wiper bottom under said first retarder pressure; means operative during the rise of the shoe support to cause the front gripping means to release the toe end extremity of the upper margin and move downwardly with respect to the support when the front retarder is effective to press the toe end extremity of the upper margin against the wiper bottoms; means operative after the completion of the rise of the shoe support to force said bumpers inwardly against the shoe assembly, to urge the yoke legs inwardly against the shoe assembly under a second yoke pressure that is higher than said first yoke pressure and to force the side retarders upwardly to press the dog ears against the wiper bottoms under a second retarder pressure that is higher than said first retarder pressure; means for thereafter causing each of said side gripping means to release the forepart portions of the upper margin and move downwardly with respect to the support; and means for thereafter imparting a wiping stroke to the wipers to wipe said upper portion against said insole portion.

19. The machine as defined in claim 18 further comprising; means for releasing the upwardly directed presures of the retarders after the wipers have commenced their wiping stroke.

20. A pulling over and lasting machine for stretching the toe and forepart portions of an upper about the corresponding portion of a last and wiping the margin of said upper portion against the corresponding portion of an insole comprising: a shoe support for supporting bottom-down a shoe assembly that includes a last having said upper portion draped about said last portion and the insole portion located on its bottom; a pair of wipers having edges that diverge forwardly from a vertex; means mounting the wipers for horizontal movement in a wiping stroke from a retracted position wherein said wiper edges are relatively open in a contour corresponding to the contour of the periphery of said last portion to an advanced position wherein said wiper edges move forwardly and move inwardly about said vertex; means for initially maintaining the wipers in their retracted position; means mounting the shoe support for vertical movement from a lower position wherein the insole bottom is below the level of the wiper bottoms to an upper position wherein the insole bottom is at least as high as the level of the wiper tops; means for initially maintaining the support in its lower position with the toe and forepart portion of the shoe assembly facing the wipers and the periphery of said last portion lying in a vertical plane that is adjacent to and forwardly and inwardly of said wiper edges; a front retarder, mounted for vertical movement in unison wi h the support, located rearwardly of the support in vertical registry with the wipers in an area proximate to said vertex; means for yieldably urging the front retarder upwardly with respect to the support to a position that is below the wiper bottoms in contiguous relation to the toe and extremity of the last; a side retarder, mounted for vertical movement in unison with the support, located forwardly of the front retarder on each side thereof in vertical registry with a wiper in an area that is proximate to the wiper's edge; means for yieldably urging each of the side retarders upwardly with respect to the support to a position that is below its associated wiper bottom in contiguous relation to the periphery of a side of the last; a front gripping means located proximate to the front retarder and mounted for movement in unison with the support and for heightwise movement with respect to the support in a path that is rearward of the front retarder; means for initially maintaining the front gripping means in an upper position with respect to the support; a side gripping means located on each side of the front gripping means and forwardly of the side retarders, each of said side gripping means being mounted for movement in unison with the support and for heightwise movement with respect to the support; means for initially maintaining each of said side gripping means in an upper position with respect to the support; means for causing the front gripping means to grip the toe and extremity of the upper margin; means for causing each of the side gripping means to grip a forepart of the upper margin; means for thereafter moving all of the gripping means downwardly with respect to the support to pull over and stretch said upper portion about the last and create dog ears between the gripped upper parts that are outspread from the last; means for thereafter raising the shoe support to raise the shoe assembly from its lower to its upper position with each of the gripping means rising in unison with the shoe support at least at the beginning of the rise of the shoe support, said front retarder being operative during the rise of the shoe support to yieldably press the toe end extremity of the upper margin against the wiper bottoms and each of said side retarders being operative during the rise of the shoe support to yieldably press a dog ear against a wiper bottom; means operative during the rise of the shoe support to cause the front gripping means to release the toe end extremity of the upper margin and move downwardly with respect to the support when the front retarder is effective to press the toe end extremity of the upper margin against the wiper bottoms; means operative after the completion of the rise of the shoe support to cause each of said side gripping means to release the forepart portions of the upper margin and move downwardly with respect to the support; a bumper located outwardly of the shoe assembly above the shoe support in its upper position and proximate to each side gripping means; means for forcing the bumpers inwardly against the shoe assembly after the completion of the rise of the shoe support and prior to the release of the forepart of the upper margin by the side gripping means; and means for thereafter imparting a wiping stroke to the wipers to wipe said upper portion against said insole portion; whereby the gripping means will not interfere with the wipers during the wiping stroke and said upper portion is maintained in pulled over and stretched condition at the commencement of the wiping stroke by the retarders and exclusively of the gripping means.

21. A method of stretching the toe and forepart portion of an upper about the corresponding portion of a last and wiping the margin of said upper portion against the corresponding portion of an insole comprising: supporting bottom-down a shoe assembly that includes a last having said upper portion draped about said last portion and the insole portion located on its bottom; locating a pair of wipers, having edges that diverge forwardly from a vertex, in such a position that the insole bottom is below the level of the wiper bottoms, the toe and forepart portion of the shoe assembly faces the wipers and the periphery of said last portion lies in a vertical plane that is adjacent to and forwardly and inwardly of said wiper edges; locating a yoke, having a bight and a leg on each side of the bight extending forwardly of the bight, above the wipers in such a position that the inner periphery of the yoke is inward of the outer periphery of said last portion with the yoke bight yieldably urged forwardly and the yoke legs yieldably urged inwardly; causing a front gripping means to grip the toe and extremity of the upper margin; causing a side gripping means to grip a forepart portion of the upper margin; moving all of the gripping means downwardly with respect to the shoe assembly to stretch said upper portion about the last and create dog ears between the gripped upper parts that are outspread from the last; thereafter raising the shoe assembly vertically at least an amount sufficient to bring the insole bottom to the level of the tops of the wipers with the gripping means rising in unison with the shoe assembly at least at the beginning of the rise of the shoe assembly, said yoke causing said upper portion to snugly conform to the shape of the last during the rise of the shoe assembly; yieldably pressing the toe end extremity of the upper margin against the wiper bottoms during the rise of the shoe assembly; yieldably pressing each dog ear against a wiper bottom during the rise of the shoe assembly; during the rise of the shoe assembly and when the toe end extremity of the upper margin is pressed against the wiper bottoms, causing the front gripping means to release the toe end extremity of the upper margin and move downwardly with respect to the shoe assembly; after the completion of the rise of the shoe assembly, forcing bumpers inwardly against the upper to press the upper against the last regions that are forwardly of and at substantially the same level as each yoke leg; thereafter causing each of the side gripping means to release the forepart portions of the upper margins and move downwardly with respect to the shoe assembly; and thereafter imparting horizontal movement to the wipers so that the wiper edges move forwardly and move inwardly about the vertex to wipe said margin portion against said insole portion.

22. A method of stretching the toe and forepart portion of an upper about the corresponding portion of a last and wiping the margin of said upper portion against the corresponding portion of an insole comprising: supporting bottom-down a shoe assembly that includes a last having said upper portion draped about said last portion and the insole portion located on its bottom; locating a pair of wipers having edges that diverge forwardly from a vertex in such a position that the insole bottom is below the level of the wiper bottoms, the toe and forepart portion of the shoe assembly faces the wipers and the periphery of said last portion lies in a vertical plane that is adjacent to and forwardly and inwardly of said wiper edges; locating a yoke, having a bight and a leg on each side of the bight extending forwardly of the bight, above the wipers in such a position that the inner periphery of the yoke is inward of the outer periphery of said last portion with the yoke bight yieldably urged forwardly and the yoke legs yieldably urged inwardly; causing a front gripping means to grip the toe and extremity of the upper margin; causing a side gripping means to grip a forepart portion of the upper margin; moving all of the gripping means downwardly with respect to the shoe assembly to stretch said upper portion about the last and create dog ears between the gripped upper parts that are outspread from the last; thereafter raising the shoe assembly vertically at least an amount sufficient to bring the insole bottom to the level of the tops of the wipers with the gripping means rising in unison with the shoe assembly at least at the beginning of the rise of the shoe assembly, said yoke causing said upper portion to snugly conform to the shape of the last during the rise of the shoe assembly; yieldably pressing the toe end extremity of the upper margin against the wiper bottoms during the rise of the shoe assembly; yieldably pressing each dog ear against a wiper bottom under a first pressure during the rise of the shoe assembly; during the rise of the shoe assembly and when the toe end extremity of the upper margin is pressed against the wiper bottoms, causing the front gripping means to release the toe end extremity of the upper margin and move downwardly with respect to the shoe assembly; after the completion of the rise of the shoe assembly, forcing bumpers inwardly against the upper to press the upper against the last in regions that are forwardly of and at substantially the same level as each yoke leg and pressing each dog ear against a wiper bottom under a second pressure that is higher than said first pressure; thereafter causing each of the side gripping means to release the forepart portions of the upper margins and move downwardly with respect to the shoe assembly; and thereafter imparting horizontal movement to the wipers so that the wiper edges move forwardly and move inwardly about the vertex to wipe said margin portion against said insole portion.

23. The method as defined in claim 22 further comprising: releasing the pressure of the dog ears against the wiper bottoms after the wipers have commenced their movement.

24. A method of stretching the toe and forepart portion of an upper about the corresponding portion of a last and wiping the margin of said upper portion against the corresponding portion of an insole comprising: supporting bottom-down a shoe assembly that includes a last having said upper portion draped about said last portion and the insole portion located on its bottom; locating a pair of wipers having edges that diverge forwardly from a vertex in such a position that the insole bottom is below the level of the wiper bottoms, the toe and forepart portion of the shoe assembly faces the wipers and the periphery of said last portion lies in a vertical plane that is adjacent to and forwardly and inwardly of said wiper edges; locating a yoke, having a bight and a leg on each side of the bight extending forwardly of the bight, above the wipers in such a position that the inner periphery of the yoke is inward of the outer periphery of said last portion with the yoke bight yieldably urged forwardly and the yoke legs yieldably urged inwardly under a first pressure; causing a front gripping means to grip the toe end extremity of the upper margin; causing a side gripping means to grip a forepart portion of the upper margin; moving all of the gripping means downwardly with respect to the shoe assembly to stretch said upper portion about the last and create dog ears between the gripped upper parts that are outspread from the last; thereafter raising the shoe assembly vertically at least an amount sufficient to bring the insole bottom to the level of the tops of the wipers with the gripping means rising in unison with the shoe assembly at least at the beginning of the rise of the shoe assembly, said yoke causing said upper portion to snugly conform to the shape of the last during the rise of the shoe assembly; yieldably pressing the toe end extremity of the upper margin against the wiper bottoms during the rise of the shoe assembly; yieldably pressing each dog ear against a wiper bottom during the rise of the shoe assembly; during the rise of the shoe assembly and when the toe end extremity of the upper margin is pressed against the wiper bottoms, causing the front gripping means to release the toe end extremity of the upper margin and move downwardly with respect to the shoe assembly; after the completion of the rise of the shoe assembly, forcing bumpers inwardly against the last in regions that are forwardly of and at substantially the same level as each yoke leg and urging the yoke legs inwardly under a second pressure that is higher than said first pressure; thereafter causing each of the side gripping means to release the forepart portions of the upper margins and move downwardly with respect to the shoe assembly; and thereafter imparting horizontal movement to the wipers so that the wiper edges move forwardly and move inwardly about the vertex to wipe said margin portion against said insole portion.

25. A method of stretching the toe and forepart portion of an upper about the corresponding portion of a last and wiping the margin of said upper portion against the corresponding portion of an insole comprising: supporting bottom-down a shoe assembly that includes a last having said upper portion draped about said last portion and the insole portion located on its bottom; locating a pair of wipers having edges that diverge forwardly from a vertex in such a position that the insole bottom is below the level of the wiper bottoms, the toe and forepart portion of the shoe assembly faces the wipers and the periphery of said last portion lies in a vertical plane that is adjacent to and forwardly and inwardly of said wiper edges; locating a yoke, having a bight and a leg on each side of the bight extending forwardly of the bight, above the wipers in such a position that the inner periphery of the yoke in inward of the outer periphery of said last portion with the yoke bight yieldably urged forwardly and the yoke legs yieldably urged inwardly under a first yoke pressure; causing a front gripping means to grip the toe end extremity of the upper margin; causing a side gripping means to grip a forepart portion of the upper margin; moving all of the gripping means downwardly with respect to the shoe assembly to stretch said upper portion about the last and create dog ears between the gripped upper parts that are outspread from the last; thereafter raising the shoe assembly vertically at least an amount sufficient to bring the insole bottom to the level of the tops of the wipers with the gripping means rising in unison with the shoe assembly at least at the beginning of the rise of the shoe assembly, said yoke causing said upper portion to snugly conform to the shape of the last during the rise of the shoe assembly; yieldably pressing the toe end extremity of the upper margin against the wiper bottoms during the rise of the shoe assembly; yieldably pressing each dog ear against a wiper bottom under a first retarder pressure dring the rise of the shoe assembly; during the rise of the shoe assembly and when the toe end extremity of the upper margin is pressed against the wiper bottoms, causing the front gripping means to release the toe end extremity of the upper margin and move downwardly with respect to the shoe assembly, after the completion of the rise of the shoe assembly, forcing bumpers inwardly against the upper to press the upper against the last in regions that are forwardly of and at substantially the same level as each yoke leg; urging the yoke legs inwardly under a second yoke pressure that is higher than said first yoke pressure and pressing each dog ear against a wiper bottom under a second retarder pressure that is higher than said first retarder pressure; thereafter causing each of the side gripping means to release the forepart portions of the upper margins and move downwardly with respect to the shoe assembly; and thereafter imparting horizontal movement to the wipers so that the wiper edges move forwardly and move inwardly about the vertex to wipe said margin portion against said insole portion.

26. The method as defined in claim 25 further comprising: releasing the pressure of the dog ears against the wiper bottoms after the wipers have commenced their movement.

27. A method of stretching the toe and forepart portion of an upper about the corresponding portion of a last and wiping the margin of said upper portion against the corresponding portion of an insole comprising; supporting bottom-down a shoe assembly that includes a last having said upper portion draped about said last portion and the insole portion located on its bottom; locating a pair of wipers, having edges that diverge forwardly from a vertex, in such a position that the insole bottom is below the level of the wiper bottoms, the toe and forepart portion of the shoe assembly faces the wipers and the periphery of said last portion lies in a vertical plane that is adjacent to and inwardly of said wiper edges; causing a front gripping means to grip the toe end extremity of the upper margin; causing a side gripping means to grip aforepart part of the upper margin; moving all the gripping means downwardly with respect to the shoe assembly to pull over and stretch said upper portion about the last and create dog ears between the gripped upper parts that are outspread from the last; thereafter raising the shoe assembly vertically at least an amount sufficient to bring the insole bottom to the level of the tops of the wipers with the gripping means rising in unison with the shoe assembly at least at the beginning of the rise of the shoe assembly; causing a front retarder to yieldably press the toe end extremity of the upper margin against the wiper bottoms during the rise of the shoe assembly; causing a side retarder to yieldably press each dog ear against a wiper bottom during the rise of the shoe assembly; during the rise of the shoe assembly and when the toe end extremity of the upper margin is pressed against the wiper bottoms, causing the front gripping means to release the toe end extremity of the upper margin and move downwardly with respect to the shoe assembly; after the completion of the rise of the shoe assembly, causing each of the side gripping means to release the forepart parts of the upper margin and move downwardly with respect to the shoe assembly; after the completion of the rise of the shoe assembly and prior to the release of the forepart parts of the upper margin by the side gripping means, forcing bumpers inwardly against the upper and last on each side of the shoe assembly in regions that are proximate to the forepart parts of the upper margin that are gripped by the side gripping means; and thereafter imparting horizontal movement to the wipers so that the wiper edges move forwardly and move inwardly about the vertex to wipe said margin portion against said insole portion, whereby the gripping means will not interfere with the wipers during the movement of the wipers and said upper portion is maintained in pulled over and stretched condition at the commencement of the movement of the wipers by the retarders and exclusively of the gripping means.

28. A shoe lasting machine, for conforming a selected portion of a shoe upper to the shape of the corresponding portion of a last and wiping the margin of said upper portion against the corresponding portion of a shoe insole, comprising: wiping means mounted for inward movement from a retracted to an advanced position; a shoe support, mounted for heightwise movement, for supporting bottom-down a shoe assembly that includes the last having said upper portion draped thereon and the insole located on its bottom; a shoe conforming pad positioned above the wiping means and outwardly of the shoe support; a bumper located alongside of and at substantially the same level as the shoe conforming pad; means mounting the bumper for inward and outward movement; means for initially positioning the shoe support so that the insole is below the top of the wiping means; means for initially yieldably urging the pad inwardly against said last portion under relatively light pressure; means for initially maintaining the bumper in an outer position that is outward of the inner periphery of the pad; means for raising the shoe support at least an amount sufficient to bring the insole bottom to the level of the top of the wiping means whereby the pad snugly conforms said upper portion to the shape of said last portion; means operative subsequent to the rise of the shoe support to yieldably urge the pad inwardly against said last portion under relatively heavy pressure and to force the bumper inwardly against the shoe assembly to clamp said upper portion against said last portion; and means for thereafter advancing the wiping means inwardly from its retracted position across the bottom of the insole to wipe said margin against the insole.

29. A toe lasting machine, for conforming the toe of a shoe upper to the toe of a last and wiping the margin of the toe of the upper against a shoe insole, comprising: wiping means mounted for movement from a retracted to an advanced position; a shoe support, mounted for heightwise movement, for supporting bottom-down a shoe assembly that includes the last having the upper draped about its toe and the insole located on its bottom; a shoe conforming yoke, positioned above the wiping means and outwardly of the shoe support, having a bight and a pair of legs extending forwardly and divergently of the bight; a bumper located forwardly of and at substantially the same level as each yoke leg, each bumper being mounted for inward and outward movement; means for initially positioning the shoe support so that the insole is below the top of the wiping means; means for initially yieldably urging the yoke legs inwardly against the last under relatively light pressure; means for initially maintaining each bumper in a position that is outward of the inner periphery of its associated yoke leg; means for raising the shoe support at least an amount sufficient to bring the insole bottom to the level of the top of the wiping means whereby the yoke snugly conforms the toe of the upper to the shape of the toe of the last; means operative subsequent to the rise of the shoe support to yieldably urge the yoke legs inwardly under relatively heavy pressure and to force said bumpers inwardly against the shoe assembly to clamp the toe of the upper against the last; and means for thereafter advancing the wiping means from its retracted position across the bottom of the insole to wipe the margin of the toe of the upper against the insole.

30. A toe lasting machine, for conforming the toe of a shoe upper to the toe of a last and wiping the margin of the toe of the upper against a shoe insole, comprising: wiping means mounted for forward movement from a retracted to an advanced position; a shoe support, mounted for heightwise movement, for supporting bottom-down a shoe assembly that includes the last having the upper draped about its toe and the insole located on its bottom; means for initially positioning the shoe support so that the insole is below the top of the wiping means; a shoe conforming yoke, positioned above the wiping means and outwardly of the shoe support, having a bight and a pair of legs extending forwardly and divergently of the bight; a bar located forwardly of each yoke leg and extending in a direction that is transverse to the longitudinal center line of the yoke; a bracket connected to each yoke leg and mounted on each bar for limited inward and outward movement; a first urging means associated with each bar for yieldably urging each bracket inwardly on each bar to an inner position under a relatively light pressure to thereby initially urge the yoke legs inwardly under said relatively light pressure; a bumper mounted on each bar inwardly of its associated bracket in an initial position that is outward of the inner periphery of its associated yoke leg; a second urging means associated with each bar that is initially inoperative and that is actuable to force the bars inwardly under relatively heavy pressure and thereby force the bumpers inwardly from their initial positions; means for raising the shoe support at least an amount sufficient to bring the insole bottom to the level of the top of the wiping means whereby the yoke snugly conforms the toe of the upper to the shape of the toe of the last with the brackets moving outwardly on the bars against the pressures of said first urging means; means operative subsequent to the rise of the shoe support to actuate the second urging means whereby the yoke legs are forced inwardly under said relatively heavy pressures and the bumpers are forced inwardly against the shoe assembly to thereby clamp the toe of the upper against the last; and means for thereafter advancing the wiping means from its retracted position across the bottom of the insole to wipe the toe of the upper against the insole.

31. A shoe conforming and clamping mechanism comprising: a yoke having a bight and a pair of legs extending forwardly and divergently of the bight; a bar located forwardly of each yoke leg and extending in a direction that is transverse to the longitudinal center line of the yoke; a bracket connected to each yoke leg and mounted on each bar for limited inward and outward movement; a first urging means associated with each bar for yieldably urging each bracket inwardly on each bar to an inner position under a relatively light pressure to thereby initially urge the yoke legs inwardly under said relatively light pressure; a bumper mounted on each bar inwardly of its associated bracket in an initial position that is outward of the inner periphery of its associated yoke leg; and a second urging means associated with each bar that is actuable to force the bars inwardly under relatively heavy pressure and thereby force the bumpers inwardly from their initial positions.

32. A shoe conforming and clamping mechanism comprising: a yoke having a bight and a pair of legs extending forwardly and divergently of the bight; a bar located forwardly of each yoke leg and extending in a direction that is transverse to the longitudinal center line of the yoke; means for yieldably urging each bar outwardly; a bracket connected to each yoke leg and mounted on each bar for limited inward and outward movement; a spring bearing against each bracket, so constructed as to yieldably urge each bracket inwardly on each bar to an inner position under a relatively light pressure to thereby initially urge the yoke legs inwardly under said relatively light pressure; a frame part located on each side of the yoke outwardly of each bar; a fluid actuated motor, mounted on each frame part having a piston member and a cylinder member with a first one of said members being mounted for movement with respect to the other member; means for connecting the outer end of each bar to one of said first members; means for yieldably urging the bars and said movable members outwardly to an intial position with the motors in unactuated condition; a bumper, mounted on each bar inwardly of its associated bracket, so constructed and arranged as to be forward and outward of the inner periphery of its associated yoke leg in an initial position when the bars are in their initial positions; and means for supplying fluid under pressure to the motors to actuate them and cause said first members and bars to move inwardly under relatively heavy pressure and thereby force the yoke legs inwardly under said relatively heavy pressure and force the bumpers inwardly from their initial positions.

33. A shoe conforming and clamping mechanism comprising: a yoke having a bight and a pair of legs extending forwardly and divergently of the bight; an inner and an outer flange located exteriorly of each yoke leg; a fluid actuated motor supported on each outer flange, each motor comprising a piston pivoted to an outer flange and a cylinder movably mounted on a piston; a bar connected to each cylinder and extending inwardly thereof through an inner flange in a direction that is transverse to the longitudinal center line of the yoke; a bracket connected to each yoke leg and mounted on a bar for limited inward and outward movement in a location that is inward of its associated inner flange; a spring mounted on each bar and bearing against each bracket to yieldably urge the brackets inwardly on the bars to an inner position under a relatively light pressure to thereby initially urge the yoke legs inwardly under said relatively light pressure; a spring interposed between each inner flange and its associated cylinder for yieldably urging the bars and the cylinders outwardly to an initial position with the motors in unactuated condition; a bumper, mounted on each bar inwardly of its associated bracket, so constructed and arranged as to be forward and outward of the inner periphery of its associated yoke leg in an initial position when the bars are in their initial positions; and means for supplying fluid under pressure to the motors to actuate them and cause the cylinders and bars to move inwardly under relatively heavy pressure and thereby force the yoke legs inwardly under said relatively heavy pressure and force the bumpers inwardly from their initial position.

34. A lasting machine for operating on a shoe assembly that includes a last having an upper mounted thereon and an insole located on its bottom by wiping a selected portion of the margin of the shoe upper against the corresponding portion of the insole comprising: wiping means mounted for movement in a wiping stroke from a retracted position to an advanced position; means for initially maintaining the wiping means in its retracted position; a plurality of instrumentalities adapted to engage portions of the shoe assembly and hold the shoe assembly in position to have the wiping means wipe said margin portion against said insole portion during the wiping stroke; means enabling said instrumentalities to change their relationship with respect to the shoe assembly; a movably mounted shaft; a plurality of actuating members on the shaft; a plurality of control members so constructed and arranged as to be actuated by the actuating members in a predetermined sequence during the movement of the shaft; wiper drive means actuable to impart a wiping stroke to the wiping means; means responsive to actuation of the wiper drive means and operable during the movement of the wiping means in its wiping stroke to move said shaft and cause the actuating members to actuate the control members in said predetermined sequence; and means responsive to the actuation of the control members in said predetermined sequence to cause the instrumentalities to change their relationship with respect to the shoe assembly in a predetermined sequence.

35. A lasting machine for operating on a shoe assembly that includes a last having an upper mounted thereon and an insole located on its bottom by wiping a selected portion of the margin of the shoe upper against the corresponding portion of the insole comprising: wiping means mounted for movement in a wiping stroke from a retracted position to an advanced position; a housing mounted for movement from a retracted to an advanced position; connections between the housing and the wiping means so constructed and arranged as to move the wiping means through its wiping stroke in response to movement of the housing from its retracted to its advanced position; means for initially maintaining the wiping means and the housing in their retracted positions; a plurality of instrumentalities adapted to engage portions of the shoe assembly and hold the shoe assembly in position to have the wiping means wipe said margin portion against said insole portion during the wiping stroke; means enabling said instrumentalities to change their relationship with respect to the shoe assembly a rotatably mounted shaft; a plurality of actuating members on the shaft; a plurality of control members so constructed and arranged as to be actuated by the actuating members in a predetermined sequence during the rotation of the shaft; drive means actuable to move the housing from its retracted to its advanced position and to thereby impart a wiping stroke to the wiping means; connections between the housing and the shaft so constructed and arranged as to rotate the shaft in response to said movement of the housing and thereby cause the actuating members to actuate the control members in said predetermined sequence; and means responsive to the actuation of the control members in said predetermined sequence to cause the instrumentalities to change their relationship with respect to the shoe assembly in a predetermined sequence.

36. A toe lasting machine for operating on a shoe assembly that includes a last having an upper mounted thereon and an insole located on its bottom by wiping the toe portion of the margin of the shoe upper against the corresponding portion of the insole comprising: a pair of symmetrically disposed wipers mounted for forward and inward movement in a wiping stroke from a retracted position to an advanced position; a housing located rearwardly of the wipers and mounted for forward movement from a retracted to an advanced position; linkage, connected to the wipers and housing, so constructed and arranged as to move the wipers through their wiping stroke in response to movement of the housing from its retracted to its advanced position; means for initially maintaining the wipers and the housing in their retracted positions; a plurality of instrumentalities adapted to engage portions of the shoe assembly and hold the shoe assembly in position to have the wipers wipe said margin portion against said insole portion during the wiping stroke; means enabling said instrumentalities to change their relationship with respect to the shoe assembly; a rotatably mounted shaft; a plurality of cams mounted on the shaft and spaced longitudinally along the shaft; a plurality of control members so constructed and arranged as to be intersected by the cams in a predetermined sequence during the rotation of the shaft; drive means actuable to move the housing from its retracted to its advanced position and to thereby impart a wiping stroke to the wipers; linkage between the housing and the shaft so constructed and arranged as to rotate the shaft in response to said movement of the housing and thereby cause the cams to intersect the control members in said predetermined sequence; and means responsive to the actuation of said control members in said predetermined sequence to cause the instrumentalities to change their relationship with respect to the shoe assembly in a predetermined sequence.

[37. A pulling over and lasting machine for stretching a selected portion of an upper about the corresponding portion of a last and wiping the margin of said upper portion agianst the corresponding portion of an insole comprising: a shoe support for supporting bottom-down a shoe assembly that includes a last having said upper portion draped about said last portion and the insole portion located on its bottom; wiping means comprising at least one wiper having an inwardly facing edge; means mounting the wiping means for horizontal movement in a wiping stroke from a retracted position wherein said wiper edge has a contour corresponding to the contour of the periphery of said last portion to an advanced position wherein said wiper edge moves inwardly; means for initially maintaining the wiping means in its retracted position; means mounting the shoe support and wiping means for relative vertical movement from a first position wherein the insole bottom is below the level of the bottom of the wiping means to a second position wherein the insole bottom is at least as high as the top of the wiping means; means for initially maintaining the support and wiping means in the first position with said portions of the shoe assembly facing the wiping means and the periphery of said last portion lying in a vertical plane that is adjacent to and inwardly of said wiper edge; means for imparting relative rising movement of the support with respect to the wiping means from the first position to the second position; a retarder, located below the wiping means, in vertical registry with the wiping means in an area that is proximate to said wiper edge; means for causing the retarder to press said margin portion against the bottom of said area of the wiping means during said relative rising movement; means for thereafter imparting a wiping stroke to the wiping means to wipe said upper margin portion against said insole portion; and means for adjusting the retracted position of the wiping means toward and away from the advanced position of the wiping means to thereby horizontally adjust said area of the wiping means with respect to the retarder.]

[38. A pulling over and lasting machine for stretching a selected portion of an upper about the corresponding portion of a last and wiping the margin of said upper portion against the corresponding portion of an insole comprising: a shoe support for supporting bottom-down a shoe assembly that includes a last having said upper portion draped about said last portion and the insole portion located on its bottom; wiping means comprising at least one wiper having an inwardly facing edge; means mounting the wiping means for horizontal movement in a wiping stroke from a retracted position wherein said wiper edge has a contour corresponding to the contour of the periphery of said last portion to an advanced position wherein said wiper edge moves inwardly; means for initially maintaining the wiping means in its retracted position; means mounting the shoe support for vertical movement from a lower position wherein the insole bottom is below the level of the bottom of the wiping means to an upper position wherein the insole bottom is at least as high as the top of the wiping means; means for initially maintaining the support in its lower position with said portion of the shoe assembly facing the wiping means and the periphery of said last portion lying in a vertical plane that is adjacent to and inwardly of said wiper edge; a retarder, mounted for vertical movement in unison with the support, located in vertical registry with the wiping means in an area that is proximate to said wiper edge; means for yieldably urging the retarder upwardly with respect to the support to a position that is below the bottom of the wiping means in contiguous relation to the periphery of said portion of the last; means for raising the shoe support to raise the shoe assembly from its lower to its upper position, said retarder being operative during the rise of the shoe support to yieldably press said margin portion against the bottom of the wiping means; means for thereafter imparting a wiping stroke to the wiping means to wipe said upper margin portion against said insole portion; and means for adjusting the retracted position of the wiping means toward and away from the advanced position of the wiping means to thereby horizontally adjust said area of the wiping means with respect to the retarder.]

39. A pulling over and lasting machine for stretching the toe portion of an upper about the toe portion of a last and wiping the margin of said upper portion against the toe portion of an insole comprising: a shoe support for supporting bottom-down a shoe assembly that includes a last having said upper portion draped about said last portion and the insole portion located on its bottom; a plate; a pair of wipers having edges that diverge forwardly from a vertex; means mounting the wipers on the plate for horizontal movement with respect to the plate in a wiping stroke from a retracted position wherein said wiper edges have a contour corresponding to the contour of the periphery of said last portion to an advanced position wherein said wiper edges move forwardly and inwardly; means for initially maintaining the wipers in their retracted position; a frame; a block mounted in the frame; means connecting the block to the plate so that the position of the block in the frame is determinative of the position of the plate; means mounting the shoe support for vertical movement from a lower position wherein the insole bottom is below the level of the bottoms of the wipers to an upper position wherein the insole bottom is at least as high as the tops of the wipers; means for initially maintaining the support in its lower position with the toe portion of the shoe assembly facing the wipers and the periphery of the toe portion of the last lying in a vertical plane that is adjacent to and forwardly and inwardly of said wiper edges; a retarder, mounted for vertical movement in unison with the support, located in vertical registry with the wipers in an area that is proximate to said vertex; means for yieldably urging the retarder upwardly with respect to the support to a position that is below the bottoms of the wipers in contiguous relation to the toe end extremity of the last; means for raising the shoe support to raise the shoe assembly from its lower to its upper position, said retarder being operative during the rise of the shoe support to yieldably press said margin portion against the bottoms of the wipers; means for thereafter imparting a wiping stroke to the wipers to wipe said upper margin portion against said insole portion; and means for horizontally adjusting the position of the block in the frame toward and away from the shoe support to thereby horizontally adjust said area of the wipers with respect to the retarder.

40. A pulling over and lasting machine for stretching the toe portion of an upper about the toe portion of a last and wiping the margin of said upper portion against the toe portion of an insole comprising: a shoe support for supporting bottom-down a shoe assembly that includes a last having said upper portion draped about said last portion and the insole portion located on its bottom; a frame; a plate located rearwardly of the support and mounted in the frame for forward and rearward horizontal movement; a pair of wipers having edges that diverge forwardly from a vertex; means mounting the wipers on the plate for horizontal movement with respect to the plate in a wiping stroke from a retracted position wherein said wiper edges have a contour corresponding to the contour of the periphery of said last portion to an advanced position wherein said wiper edges move forwardly and inwardly; means for initially maintaining the wipers in their retracted position; a block mounted in the frame; powered means secured to the block; connections between the powered means and the plate operative in response to actuation of the powered means to move the plate and the wipers from a rearward out-of-the-way position to a forward working position; means for initially maintaining the plate and wipers in their rearward positions; a transverse wall in the frame located forwardly of the block; a rod, mounted in the block, extending forwardly of the block and bearing against the transverse wall; means mounting the shoe support for vertical movement from a lower position wherein the insole bottom is below the level of the bottoms of the wipers to an upper position wherein the insole bottom is at least as high as the tops of the wipers; means for initially maintaining the support in its lower position with the toe portion of the shoe assembly facing the wipers and the periphery of the toe portion lying in a vertical plane that is adjacent to and forwardly and inwardly of said wiper edges when the wipers are in their working position; a retarder, mounted for vertical movement in unison with the support, located in vertical registry with the wipers in an area that is proximate to said vertex when the wipers are in their working position; means for yieldably urging the retarder upwardly with respect to the support to a position that is below the bottoms of the wipers in contiguous relation to the toe end extremity of the last; means for actuating the powered means to move the wipers to their working position; means for thereafter raising the shoe support to raise the shoe assembly from its lower to its upper position, said retarder being operative during the rise of the shoe support to yieldably press said margin portion against the bottoms of the wipers; means for thereafter imparting a wiping stroke to the wipers to wipe said margin portion again said insole portion; means for horizontally adjusting the position of the block in the frame toward and away from the shoe support to thereby horizontally adjust said area of the wipers with respect to the retarder; and means for horizontally adjusting the position of the rod in the block with respect to said transverse wall so that the rod may continue to bear against said transverse wall after the position of the block in the frame has been adjusted.

[41. A support arrangement for supporting bottom-down a last having an upper mounted thereon and an insole located on its bottom so that a selected portion of the upper margin may be wiped against the corresponding portion of the insole comprising: a mount; a plurality of rods, that are laterally offset from each other, extending upwardly of the mount; spring means yieldably urging each of the rods upwardly of the mount; a support section having an upper surface for supporting the margin of said insole portion; at least one insole rest located inwardly of said support section; and means, connecting each of the rods to the support section, so constructed and arranged as to permit universal tilting movement of the support section with respect to the rods; whereby the support section is yieldably urged upwardly and is capable of having universal tilting movement so that, when the insole bears against the insole rest, the support section may tilt to conform to said portion of the insole and press said portion of the insole against the bottom of the last.]

[42. A support arrangement for supporting bottom-down a last having an upper mounted thereon and an insole located on its bottom so that a selected portion of the upper margin may be stretched about the last and wiped against the corresponding portion of the insole comprising: a mount; a plurality of rods, that are laterally offset from each other, extending upwardly of the mount; spring means yieldably urging each of the rods upwardly of the mount; a support section having an upper surface for supporting the margin of said insole portion; at least one insole rest located inwardly of said support section; and means, connecting each of the rods to the support section, so constructed and arranged as to enable the spring means to yieldably urge the support section to an initial position that is upward of the insole rest and to permit universal tilting movement of the support section with respect to the rods when it is moved downwardly of said initial position; whereby a stretching of said upper margin portion about the last, preparatory to the wiping of said upper margin portion about the last, will cause the support section to move downwardly with respect to the insole rest until the insole bears against the insole rest and cause the support section to tilt to conform to said portion of the insole and press said portion of the insole against the bottom of the last.]

[43. A lasting machine for stretching a selected portion of the margin of an upper, that is mounted on a last, about the last and wiping said margin portion against the corresponding portion of an insole that is located on the last bottom comprising: a mount; a plurality of rods, that are laterally offset from each other, extending upwardly of the mount; spring means yieldably urging each of the rods upwardly of the mount; a support section having an upper surface for supporting the margin of said insole portion; at least one insole rest located inwardly of said support section; means, connecting each of the rods to the support section, so constructed and arranged as to enable the spring means to yieldably urge the support section to an initial position that is upward of the insole rest and to permit universal tilting movement of the support section with respect to the rods when it is moved downwardly of said initial position; gripping means operative to grip said margin portion; means for causing said gripping means to exert a downward force on said gripped margin portion to thereby stretch said margin portion about the last and force the support section downwardly until the insole bears against the insole rest and causes the support section to tilt to conform to said portion of the insole and press said portion of the insole against the bottom of the last; and wiping means operative to wipe said stretched margin portion against said insole portion.]

[44. A lasting machine for stretching a selected portion of the margin of an upper, that is mounted on a last, about the last and wiping said margin portion against the corresponding portion of an insole that is located on the last bottom comprising: a mount; a plurality of rods, that are laterally offset from each other, extending upwardly of the mount; spring means yieldably urging each of the rods upwardly of the mount; a support section having an upper surface for supporting the margin of said insole portion; at least one insole rest located inwardly of said support section; means, connecting each of the rods to the support section, so constructed and arranged as to enable the spring means to yieldably urge the support section to an initial position that is upward of the insole rest and to permit universal tilting movement of the support section with respect to the rods when it is moved downwardly of said initial position; gripping means located outwardly of said support section; means mounting the gripping means for heightwise movement; means for causing the gripping means to grip said margin portion and to then move downwardly to thereby stretch said margin portion about the last and force the support section downwardly with respect to the insole rest until the insole bears against the insole rest and causes the support section to tilt to conform to said portion of the insole and press said portion of the insole against the bottom of the last; wiping means mounted for movement from a position that is outward of said support section through a wiping stroke to intersect said margin portion and wipe it against said insole portion; and means for causing the wiping means to effect its wiping stroke.]

References Cited

UNITED STATES PATENTS

The following references, cited by the Examiner, are of record in the patented file of this patent or the original patent.

| | | | |
|---|---|---|---|
| 2,740,140 | 4/1956 | James | 12—7.8 |
| 2,871,818 | 2/1959 | Jorgensen | 118—600 |
| 2,985,901 | 5/1961 | Actis | 12—38 |
| 3,035,287 | 5/1962 | Vlcek et al. | 12—12.4 |
| 3,039,121 | 6/1962 | Weinschenk | 12—145 X |
| 3,164,852 | 1/1965 | Bowler et al. | 12—10.5 |
| 3,228,047 | 1/1966 | Schwabe | 12—12.4 |
| 3,234,574 | 2/1966 | Becker et al. | 12—14.2 X |
| 3,271,800 | 9/1966 | Allard | 12—12.5 |
| 3,332,096 | 7/1967 | Kambarign et al. | 12—10.5 |

PATRICK D. LAWSON, Primary Examiner

U.S. Cl. X.R.

12—10.5, 14.2, 123